(12) United States Patent
Hiatt et al.

(10) Patent No.: US 10,327,583 B2
(45) Date of Patent: Jun. 25, 2019

(54) AUTOMATIC FOOD PREPARATION APPARATUS

(71) Applicant: Keenwawa, Inc., San Francisco, CA (US)

(72) Inventors: Adam Hiatt, San Francisco, CA (US); David Friedberg, San Francisco, CA (US); Jake Felser, San Francisco, CA (US); Justin Laughland, San Francisco, CA (US); Matt Ambauen, San Francisco, CA (US)

(73) Assignee: Keenwawa, Inc., San Francisco, CA (US)

( * ) Notice: Subject to any disclaimer, the term of this patent is extended or adjusted under 35 U.S.C. 154(b) by 0 days.

(21) Appl. No.: 15/913,661

(22) Filed: Mar. 6, 2018

(65) Prior Publication Data

US 2018/0249861 A1 Sep. 6, 2018

Related U.S. Application Data

(60) Provisional application No. 62/467,726, filed on Mar. 6, 2017, provisional application No. 62/524,951, filed on Jun. 26, 2017.

(51) Int. Cl.
*A47J 39/00* (2006.01)
*A47J 36/00* (2006.01)
(Continued)

(52) U.S. Cl.
CPC .............. *A47J 36/00* (2013.01); *A23L 5/10* (2016.08); *A47J 36/24* (2013.01); *A47J 39/00* (2013.01); *A47J 44/00* (2013.01); *A23V 2002/00* (2013.01)

(58) Field of Classification Search
CPC .... A47J 36/24; A47J 36/2483; A47J 36/2488; A47J 39/00–39/02; A47J 44/00; A23L 5/10; A23V 2002/00
(Continued)

(56) References Cited

U.S. PATENT DOCUMENTS

| 4,801,097 | A | * | 1/1989 | Fitch, Jr. | ................... | A21C 9/04 |
| | | | | | | 222/255 |
| 4,919,950 | A | * | 4/1990 | Mak | ........................ | A47J 27/14 |
| | | | | | | 426/233 |

(Continued)

OTHER PUBLICATIONS

International Searching Authority, "Search Report" in application No. PCT/US18/21192, dated May 21, 2018, 19 pages.
(Continued)

*Primary Examiner* — Drew E Becker
(74) *Attorney, Agent, or Firm* — Hickman Palermo Becker Bingham LLP

(57) ABSTRACT

In an embodiment, an automatic food preparation and serving method comprises: releasing, from one or more magazines in a storage apparatus, a plurality of food canisters, each loaded with a different ingredient of a human consumable dish or meal, onto a canister transportation mechanism under program control by one or more digital electronic processors; transporting, using the canister transportation, the plurality of food canisters to a food dispensing mechanism under program control of the one or more processors; retrieving, using a bowl placement apparatus, a bowl from a bowl dispensing apparatus and placing the bowl on a bowl orientation mechanism below the food dispensing mechanism under program control of the one or more processors; dispensing, using the food dispensing mechanism, the ingredient of the human consumable dish or meal from the plurality of food canisters into the bowl under program control of the one or more processors; removing the plurality
(Continued)

of food canisters using a canister removing apparatus into a bin using gravity.

34 Claims, 39 Drawing Sheets

(51) Int. Cl.
    *A23L 5/10*     (2016.01)
    *A47J 44/00*     (2006.01)
    *A47J 36/24*     (2006.01)

(58) Field of Classification Search
    USPC .................. 426/231–233, 520, 523, 389;
                    99/325–338; 222/1, 52–69, 146.1–146.6
    See application file for complete search history.

(56) References Cited

U.S. PATENT DOCUMENTS

| | | | | |
|---|---|---|---|---|
| 5,564,594 | A * | 10/1996 | Monfredo | G07F 9/105 221/150 A |
| 6,843,166 | B1 | 1/2005 | Li | |
| 9,532,575 | B1 * | 1/2017 | Donisi | A21C 15/002 |
| 2003/0159593 | A1 | 8/2003 | Lutwyler | |
| 2004/0238555 | A1 * | 12/2004 | Parks | G07F 9/105 221/80 |
| 2010/0070776 | A1 * | 3/2010 | Raman | G06F 21/552 713/189 |
| 2013/0101714 | A1 | 4/2013 | Buehler | |
| 2015/0114236 | A1 | 4/2015 | Roy et al. | |
| 2015/0164131 | A1 * | 6/2015 | Vardakostas | A21C 15/002 99/450.4 |
| 2015/0290795 | A1 | 10/2015 | Oleynik | |
| 2016/0027094 | A1 * | 1/2016 | Chamyvelumani | G06Q 50/12 705/15 |
| 2016/0104339 | A1 * | 4/2016 | Saccone, Jr. | G07F 13/00 700/232 |
| 2016/0338545 | A1 * | 11/2016 | Shah | A47J 44/00 |
| 2017/0280763 | A1 * | 10/2017 | Nazarian | A23P 20/12 |
| 2017/0290345 | A1 * | 10/2017 | Garden | A21B 7/00 |
| 2018/0127192 | A1 * | 5/2018 | Cohen | A47J 36/32 |

OTHER PUBLICATIONS

Current Claims in application No. PCT/US2018/021192, dated May 2018, 9 pages.

\* cited by examiner

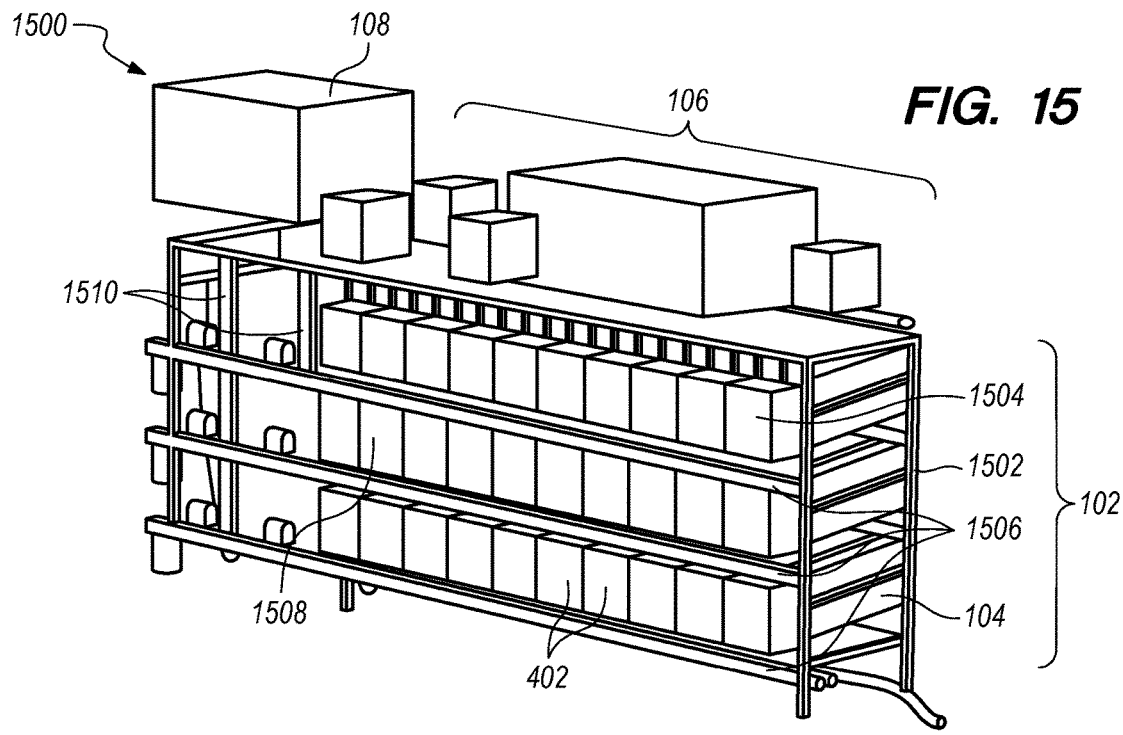
FIG. 15
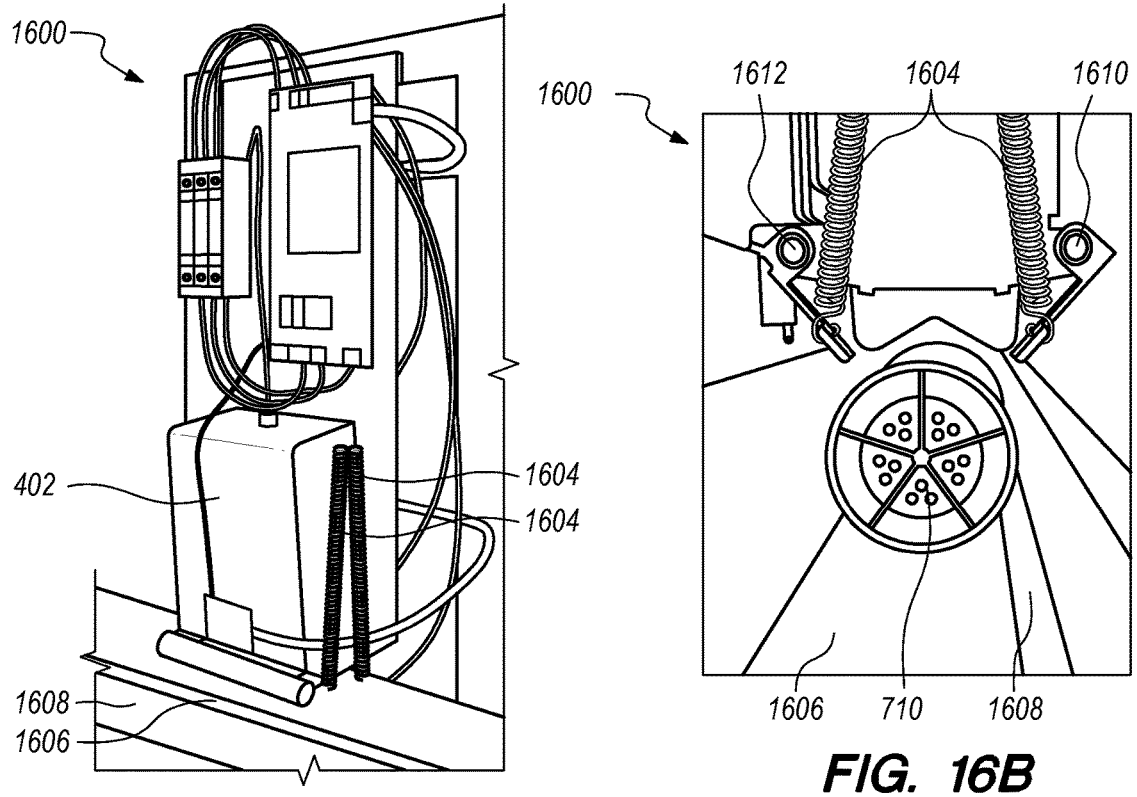
FIG. 16A
FIG. 16B

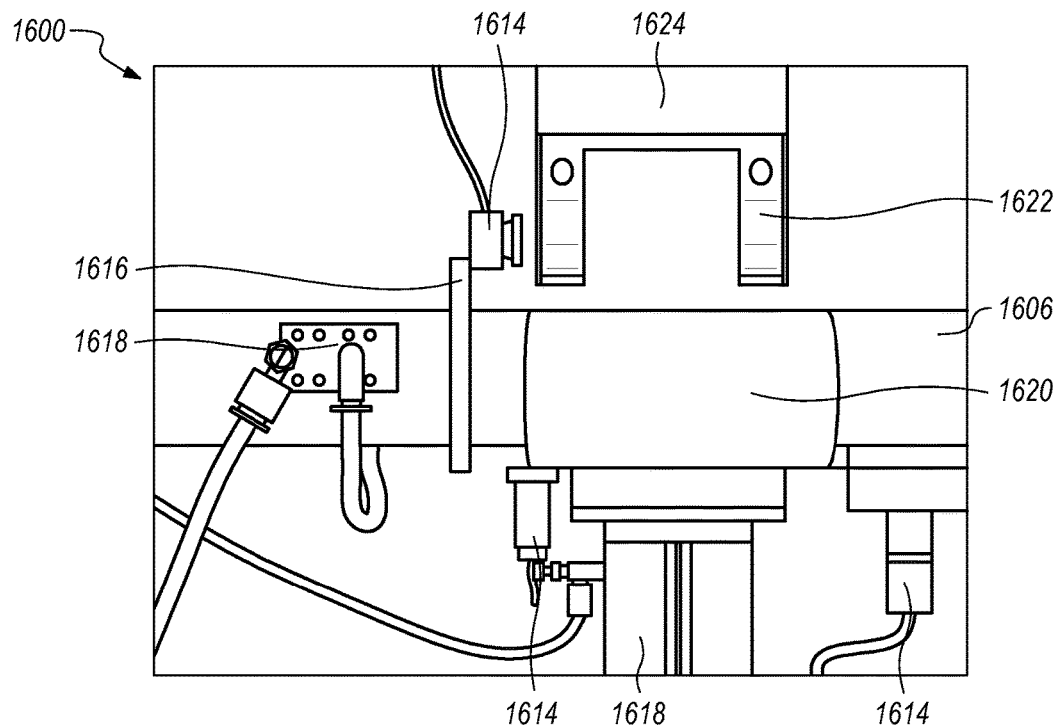
FIG. 16C
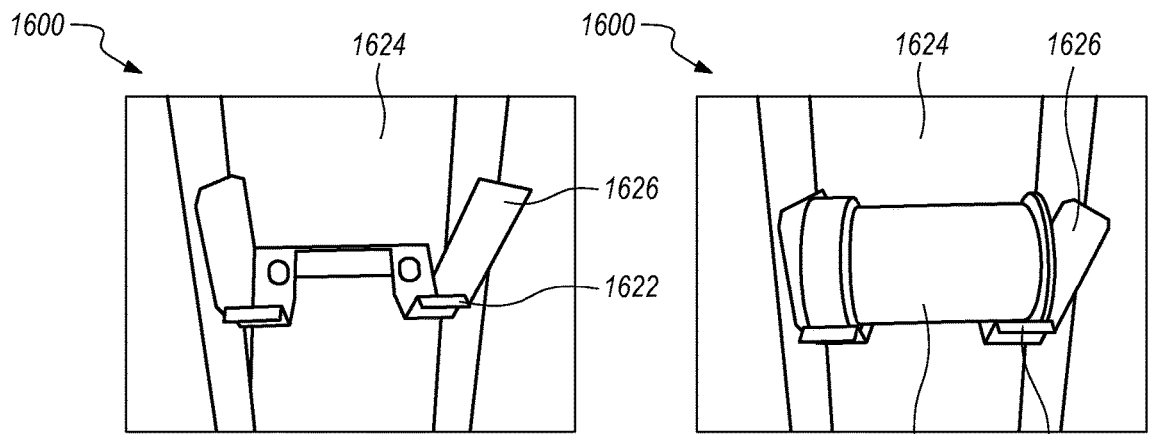
FIG. 16D     FIG. 16E

2200 — 2208

| | | | | 11:12 AM | | | 100% |
|---|---|---|---|---|---|---|---|
| Carrier | | | | | | | |
| 0.1.71 | | ‹ Current Orders | | Devshruti P's Order | | | Feedback |

| | Time | Order # | Name | Comments | Status |
|---|---|---|---|---|---|
| 🍲 Current Orders | 7/25 11:04 | 604 | Devshruti F | 1 Bowls<br>0 Sides<br>0 Bevs | In Cubby 10 |
| 🕓 Past Orders | | | | | |
| ⚠ Kiosk Alerts | | | | | |
| Search | | | | | |

Line A

[Hold] [Email Receipt]  [See Attendant] [Refund Order] [Cancel Order]

Itemized Order $7.84   [Reorder] [Banned] [Banned]

🍲 Warm Quinoa ($6.95)
    ADD Chipotle Black Beans
    ADD Cucumber Raita      [Error]
    ADD Warm Lemon-Herb
    ADD Red Thai Curry
    ADD Saag Paneer
    ADD Pita Bread

Carrier   11:12 AM   100%
Beverages and Sides   🖨

| Order # | Expo # | Time | Item Name | |
|---|---|---|---|---|
| 616 | A | 0:01 | Sparkling Ginger Lime | [Ready] |

2400

2402 RELEASING, FROM ONE OR MORE MAGAZINES IN A STORAGE APPARATUS, A PLURALITY OF FOOD CANISTERS, EACH LOADED WITH A DIFFERENT INGREDIENT OF A HUMAN CONSUMABLE DISH OR MEAL, ONTO A CANISTER TRANSPORTATION MECHANISM UNDER PROGRAM CONTROL BY ONE OR MORE DIGITAL ELECTRONIC PROCESSORS

2404 TRANSPORTING, USING THE CANISTER TRANSPORTATION MECHANISM, THE PLURALITY OF FOOD CANISTERS TO A FOOD DISPENSING MECHANISM UNDER PROGRAM CONTROL OF THE ONE OR MORE PROCESSORS

2406 RETRIEVING, USING A SERVO OPERATED BOWL POSITIONING ARM OF A BOWL PLACEMENT APPARATUS, A BOWL FROM A BOWL DISPENSING APPARATUS AND PLACING THE BOWL ON A BOWL ORIENTATION MECHANISM BELOW THE FOOD DISPENSING MECHANISM UNDER PROGRAM CONTROL OF THE ONE OR MORE PROCESSORS

2408 DISPENSING, USING THE FOOD DISPENSING MECHANISM, THE INGREDIENT OF THE HUMAN CONSUMABLE DISH OR MEAL SERIALLY FROM THE PLURALITY OF FOOD CANISTERS INTO THE BOWL UNDER PROGRAM CONTROL OF THE ONE OR MORE PROCESSORS

2410 REMOVING THE PLURALITY OF FOOD CANISTERS USING A CANISTER REMOVING APPARATUS INTO A BIN USING GRAVITY

US 10,327,583 B2

AUTOMATIC FOOD PREPARATION APPARATUS

PRIORITY/BENEFIT CLAIM

This application claims the benefit under 35 U.S.C. § 119(e) of provisional application 62/467,726, filed Mar. 6, 2017, and of provisional application 62/524,951, filed Jun. 26, 2017, the entire contents of which are hereby incorporated by reference for all purposes as if fully set forth herein.

FIELD OF THE DISCLOSURE

The technical field of this disclosure is an apparatus for automatically preparing and assembling food. The technical field of the disclosure relates more specifically to food canisters, magazines, ingredient storage racks, thermal systems, electrical systems, food bowl assembly apparatuses with ingredient dispensing modules, and other structures that are used in connection with food preparation and assembly.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

Creating an apparatus for fast and efficient automated food preparation while accommodating ingredient customization requests from customers is difficult using presently available techniques. Preparing a food bowl, for example, traditionally has required an employee to select customized ingredients for each order and assemble the food bowl by hand. This traditional approach requires a restaurant to hire employees and train them in food assembly best practices. However, unexpected employee absences, differences in employee training, and other factors often result in food preparation inconsistencies that may cause a loss in business. Thus, a reliable automated food preparation and assembly process without the need for employees is desirable. Other benefits could include reduced labor costs, improving labor shift timing, and improved food safety arising from less human contact with ingredients.

However, automating the food preparation and assembly process presents a unique set of challenges. For example, traditionally, each ingredient is packaged and shipped to a restaurant in different containers which vary from supplier to supplier, creating drastic differences in ingredient storage. Each ingredient may also need to be stored and prepared at different temperatures, which has traditionally required that each ingredient be stored and prepared separately. Thus, for successful automation, there is a need for uniform food containers for easy storage and dispensing, an apparatus that is configured to uniformly dispense and assemble each ingredient, and an apparatus that is configured to store and prepare each ingredient at different temperatures.

BRIEF DESCRIPTION OF DRAWINGS

FIG. 15 is a perspective view of a stationary thermal storage apparatus with canister transport mechanism, in one embodiment.

FIG. 16A is a perspective view of a canister transport mechanism component of FIG. 15, in one embodiment.

FIG. 16B is a side view of the canister transport mechanism component of FIG. 16A, including a conveyor and a canister, in one embodiment.

FIG. 16C is a top view of a horizontal canister transfer apparatus, in one embodiment.

FIG. 16D is a front perspective view of a canister bucket, in one embodiment.

FIG. 16E is a front perspective view of a canister in a canister bucket, in one embodiment.

FIG. 21A, FIG. 21B, FIG. 21C, FIG. 21D, FIG. 21E, FIG. 21F, FIG. 21G, FIG. 21H, FIG. 21I, FIG. 21J, FIG. 21K, FIG. 21L, FIG. 21M illustrate an example sequence of computer display screen images that may be generated and displayed at a kiosk computer under program control as part of a graphical user interface for a consumer.

FIG. 22A, FIG. 22B, FIG. 22C, FIG. 22D, FIG. 22E, FIG. 22F, FIG. 22G, FIG. 22H, FIG. 22I illustrate an example sequence of computer display screen images that may be generated and displayed at a computer under program control as part of a graphical user interface for a kitchen manager or operator at a single store unit.

FIG. 24 illustrates a method or algorithm for using the automatic food preparation apparatus to automatically assemble meals, in an embodiment.

SUMMARY

Figure 1:
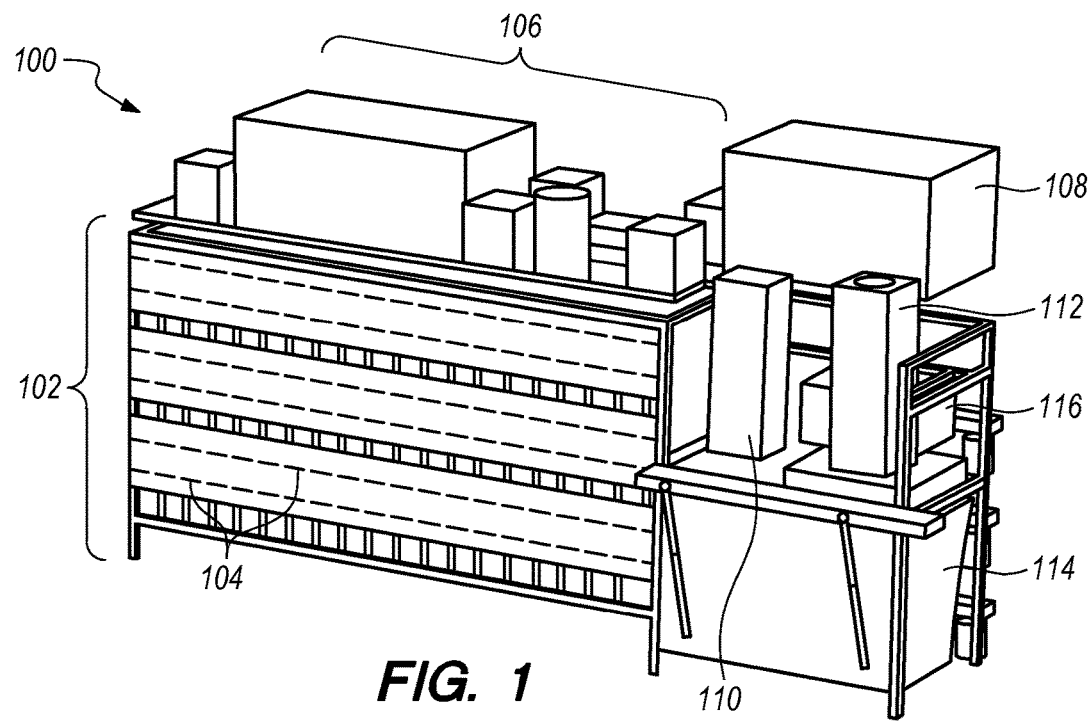
FIG. 1 is a perspective view of an embodiment of an automatic food preparation apparatus, in one embodiment.

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

Certain drawing figures include dimension values. All dimensions in this disclosure are examples for certain embodiments and other embodiments may use different dimensions. The dimensions given are not intended to limit the scope of the disclosure unless the appended claims express a limitation.

Embodiments are described herein in sections according to the following outline:

1.0 GENERAL OVERVIEW
2.0 STRUCTURAL AND FUNCTIONAL OVERVIEW
2.1 AUTOMATIC FOOD PREPARATION APPARATUS
2.2 INGREDIENT STORAGE
2.3 MEAL ASSEMBLY
2.4 CANISTER REMOVAL
2.5 MEAL ORDERING
3.0 PROCEDURAL OVERVIEW
4.0 HARDWARE OVERVIEW 1.0 General Overview In an embodiment, a food service system is structured and operates as follows. A commissary serves as food warehouse space and can support a plurality of assembly kitchens. The commissary functions to handle, as necessary, food preparation activities, including to store raw ingredients, wash ingredients, cook and prepare some ingredients, package ingredients, and store, refrigerate, and freeze ingredients. The commissary also may stock and supply serving items such as bowls and utensils to restaurants or stores.

Each assembly kitchen is structured to facilitate preparation of many meals per hour. An assembly kitchen receives ingredients in bags, canisters, or other containers and performs preparation operations which may include mixing, combining, organization, reheating, or defrosting. Resulting sets of ingredients may be arranged in hotel pans, for example. At an assembly station in the assembly kitchen, ingredients arrive at hot, cold, or ambient temperature. Data displayed on digital display devices under program control provides instructions to assembly staff to assemble a meal or bowl, which is shelved. A quality check is performed. Under program control a printer prints a label that is affixed to a cap on the bowl or meal. The bowl or meal then is delivered to a cubby. To initiate assembly, a consumer provides input at a kiosk computer or a remote computer device (e.g., such as a mobile application or web interface on a mobile handheld device or computer) by selecting a meal from a menu or specifying ingredients. Data from the kiosk or remote computer device is transmitted over a network to an application executed at a computer in or near the assembly station and is transformed under program control to instructions or data for assembly staff.

Operation of such a system may be improved by construction and deployment of an automatic meal assembly apparatus that is structured and programmed to assemble a meal or bowl from ingredients in approximately 20 to 30 seconds without human intervention. The apparatus is structured to deliver product quality comparable to what is produced manually using the foregoing assembly process. In one embodiment, the apparatus is structured and programmed for delivering hundreds to thousands of bowls or meals per hour or more. A goal of one embodiment is to obtain ingredients, which are pre-packaged in canisters, at the right temperature, and use the ingredients rapidly and automatically under digital computer program control to make pleasing, low-cost meals of any type or class.

In an embodiment, the automatic food preparation and serving apparatus comprises a storage apparatus configured to hold one or more magazines, each of the one or more magazines configured to store a plurality of food canisters each loaded with an ingredient of a human consumable dish or meal, the storage apparatus having a digital electronic storage controller configured to dispense a particular food canister under program control by one or more digital electronic processors. The automatic food preparation and serving apparatus may also comprise a canister transport mechanism having a movable belt end adjacent to the storage apparatus and positioned to receive the plurality of food canisters deposited onto the first movable belt, and comprising a first canister controller and a first drive motor configured to drive the movable belt to transport the plurality of food canisters away from the storage apparatus and to a food dispensing mechanism under program control of the one or more processors. Food may be conveyed to a food dispensing mechanism with a series of belts and transport mechanisms, as described in other sections herein; the specific mechanical details are not critical for particular embodiments and may vary in structure and function to convey food canisters to a dispensing location for forming meals from contents of the canisters. The automatic food preparation and serving apparatus may also comprise a bowl placement apparatus having a servo operated bowl positioning arm that is configured to retrieve a bowl from a bowl dispensing apparatus and to place the bowl in a bowl orientation mechanism below the food dispensing mechanism, under program control of the one or more processors.

While certain embodiments herein describe bowls, other food receptacles may be used in place of a bowl. For example, plates, cups, food-based receptacles such as tortillas, or any other type of food receptacles may be used. Moreover, any embodiments of apparatuses related to bowls may be configured to handle any type of food receptacle. For example, the placement apparatus is not limited to bowls and may be a food receptacle placement apparatus that is configured to retrieve any type of food receptacle, such as a tortilla, from a food receptacle dispensing apparatus and place food receptacle in a food receptacle orientation mechanism below the food dispensing mechanism, under program control of the one or more processors. The food receptacle orientation mechanism may be configured to orient the food receptacle and, in some embodiments, wrap or close the food receptacle once all the ingredients have been dispensed.

The automatic food preparation and serving apparatus may also comprise the food dispensing mechanism configured to dispense the ingredient from the plurality of food canisters into the bowl or food receptacle, under program control of the one or more processors. Dispensing may occur serially, in parallel or a combination of ordering steps. The apparatus may comprise a canister removing apparatus configured to remove the plurality of food canisters into a bin using mechanical force and/or gravity. The automatic food preparation and serving apparatus may also comprise a non-transitory computer-readable data storage medium communicatively coupled to the one or more processors and storing one or more sequences of instructions which, when processed using the one or more processors, cause receiving order input for the dish or meal and causing the storage apparatus, the canister transport mechanism, the bowl placement apparatus, the food dispensing mechanism, and the canister discarding apparatus to automatically dispense the dish or meal in accordance with the order input.

In an embodiment, an automatic food preparation and serving method comprises: releasing, from one or more magazines in a storage apparatus, a plurality of food canisters, each loaded with a different ingredient of a human consumable dish or meal, onto a canister transportation mechanism under program control by one or more digital electronic processors; transporting, using the canister transportation mechanism having a first movable belt comprising a first canister controller and a drive motor configured to drive the first movable belt, the plurality of food canisters to a food dispensing mechanism under program control of the one or more processors; retrieving, using a servo operated bowl positioning arm of a bowl placement apparatus, a bowl from a bowl dispensing apparatus and placing the bowl on a bowl orientation mechanism below the food dispensing mechanism under program control of the one or more processors; dispensing, using the food dispensing mechanism, the ingredient of the human consumable dish or meal serially from the plurality of food canisters into the bowl under program control of the one or more processors; and removing the plurality of food canisters using a canister removing apparatus into a bin using gravity and/or mechanical force.

2.0 Structural and Functional Overview

The system disclosed herein is modular in several ways. A single thermal zone and a single bowl line can be considered fundamental blocks for configuring a system. As many or as few thermal zones and bowl lines can be included, and the other subsystems can be resized to fit the apparatus. For example, a system having five thermal zones to accommodate 30 ingredients and one bowl line can be configured as easily as one with 20 thermal zones and 8 bowl lines. Within each bowl line and thermal zone, all subassemblies are modular in mechanical and electrical design. Modularity, in some embodiments, promotes flexibility in configuring the apparatus to meet different performance goals. Thermal fittings, blowers, horizontal belts, vertical belts, magazines and electrical controllers may be identical components even when used in different locations, modules or subsystems of the apparatus thereby reducing the number of spare parts needed for field replacement.

Viewed broadly, in an embodiment, an automatic food preparation apparatus comprises a plurality of food canisters that are organized in magazines. The magazines are organized and held in a magazine transport rack having one or more thermal sections and/or storage sections. Canisters move from these sections via a dropper or ejector through a sequencer to a can movement apparatus. The can movement apparatus provides ingredients to a bowl in a bowl manipulation apparatus. Canisters with ingredients that have been removed then move to a can discard location. The sequencer may comprise a combination of a horizontal transport belt, a kicker, a vertical belt and a selector/diverter. The can movement apparatus may include devices for de-lidding canisters, dispensing ingredients and re-lidding empty canisters. Details of these elements and subassemblies are addressed in other sections herein.

2.1 Automatic Food Preparation Apparatus

Figure 2:
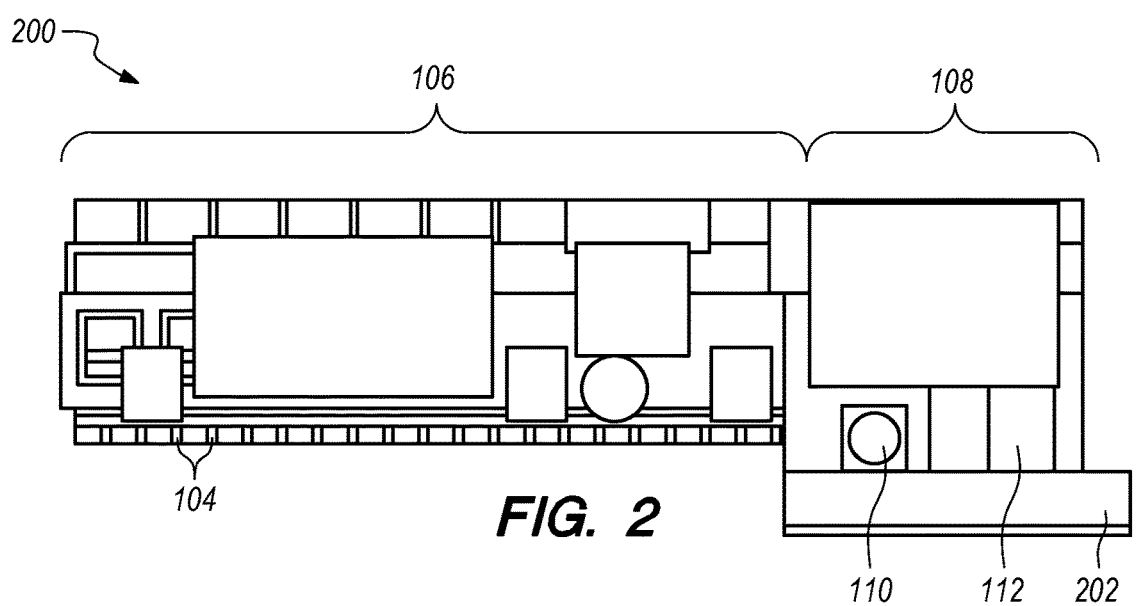
FIG. 2 is a top plan view of the embodiment of the automatic food preparation apparatus of FIG. 1, illustrating example dimensions and components of the automatic food preparation.
Figure 3:
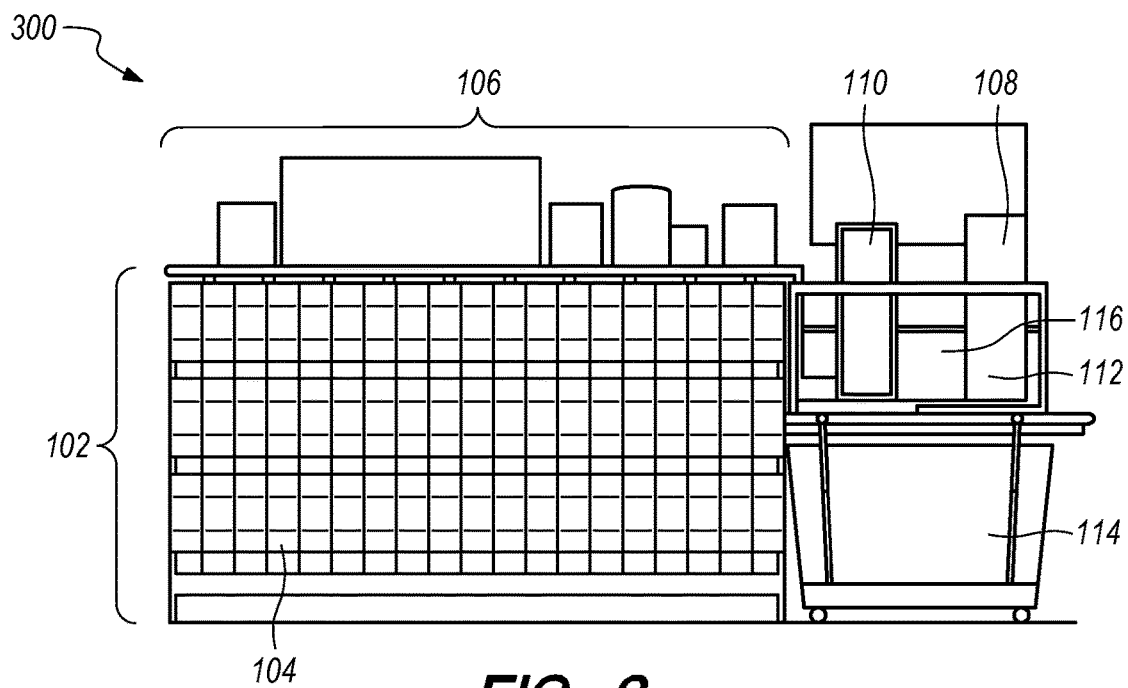
FIG. 3 is a side elevation view of the embodiment of the automatic food preparation apparatus of FIG. 1, FIG. 2.
Figure 4:
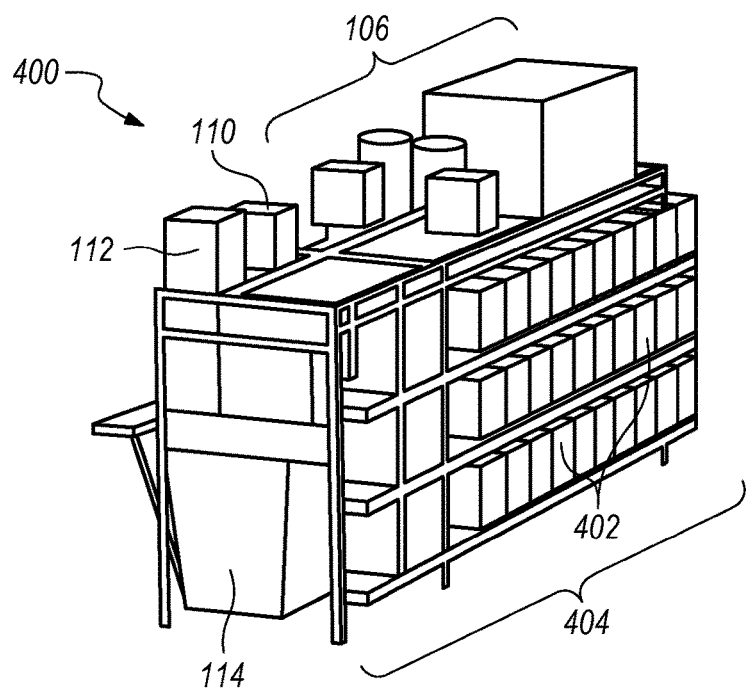
FIG. 4 is an end perspective view of the embodiment of the automatic food preparation apparatus of FIG. 1, FIG. 2, FIG. 3.

FIG. 1 is perspective view of an embodiment of an automatic food preparation apparatus 100. FIG. 2 is a top view of the embodiment of FIG. 1 illustrating example dimensions and components of the automatic food preparation apparatus 100, 200. FIG. 3 is a side view of the embodiment of the automatic food preparation apparatus 100, 200, 300 of FIG. 1 and FIG. 2. FIG. 4 is a rear side elevation view of the embodiment of the automatic food preparation apparatus 100, 200, 300, 400 of FIG. 1, FIG. 2, FIG. 3, and FIG. 4.

Referring first to FIG. 1, the automatic food preparation apparatus 100 may feature a storage rack 102, magazine(s) 104 stored in the storage rack 102, a thermal control system 106, a storage rack 102, an electronics housing unit 108, bowl dispenser(s) 110, 112, an ingredient dispensing mechanism or module (IDM) 116, and a bin 114, in an example embodiment.

The storage rack 102 may be a customizable rack configured to store magazines 104 or individual canisters. Each magazine 104 may store a series of food canisters that hold ingredients for a meal or dish. In an embodiment, and as further described in other sections, each canister may hold a single ingredient type, and can hold either a single serving of that ingredient or a plurality of servings. In one embodiment, all the canisters stored in a single magazine may be the same ingredient for ingredient tracking purposes, but the ingredients may vary from magazine to magazine, and in some embodiments one or more particular single canister(s) may hold multiple different ingredients. In an embodiment, the storage rack 102 may hold at least two magazines of all the available ingredients such that the magazines storing canisters with the same ingredient may be hot-swappable to allow continued food assembly functionality even when a magazine is empty or otherwise needs replacing.

In an embodiment, the storage rack 102 may feature a digital electronic storage controller that tracks the ingredients of each magazine and signals any magazines 104 that are stored in the storage rack 102 to dispense specific food canisters in specific orders under programmed control of one or more digital electronic processors. For example, the electronics housing unit 108 may feature the storage controller. Generally, the electronics housing unit 108 may comprises computers, power supplies and control circuits for signaling or commanding mechanical and/or electromechanical elements. The particular location for these elements is not critical and a modular, flexible placement approach may be supported in an embodiment. In an embodiment, the electronics housing comprises a computer, a data storage device, memory, I/O interfaces including servo control, motor control, actuator control logic, stored programs, and so forth. Other computers and/or microcontrollers may be distributed throughout the system to locally control certain mechanical elements and embodiments do not require a single or centralized location for the computing elements. The programs implement all control logic described in this disclosure for the apparatus of FIG. 1, although other computers and programs may be used for retail store and/or remote computer device order entry, feedback to consumers, management and monitoring, as further described for FIG. 22.

A computer system comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, computer network devices such as gateways, modems, routers, access points, switches, hubs, firewalls, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming language or environment.

One or more bowl dispensers 110, 112 may hold empty bowls in a vertical stack for extraction and loading with ingredients as part of a bowl assembly process. In an embodiment, two bowl dispensers 110, 112 may be associated with two bowl lines for assembly such that bowls may be assembled in parallel, simultaneously. In another embodiment, a single bowl dispenser 110, 112 may dispense bowls into a servo operated arm that transfers the bowls to any number of dispensing locations. In an embodiment, two dispensing locations may be located in each of two bowl lines located on either side of the bowl dispenser 110, 112 for a total of four dispensing locations, as further described herein. However, any number of bowl dispensers 110, 112, bowl lines, and dispensing locations may be used.

An IDM 116 may separate and position each canister for lid removal and ingredient dispensing, as further described herein. A canister recovery bin 114, located at the lower right portion of the apparatus, may provide a way of capturing canisters that are empty of ingredients after the ingredients have been dispensed into a bowl. The canisters may subsequently be cleaned and recycled for storing additional ingredients. In some embodiments, a plurality of canister recovery bins 114 may be provided. In other embodiments, canister recovery may be performed in an area that is separate from the apparatus.

FIG. 2 illustrates a top plan view of the automatic food preparation apparatus 100, 200, featuring the thermal control system 106 and electronics housing unit 108 above the apparatus. The handles of the magazines 104 and bowl dispensers 110, 112 are also visible from the top plan view.

As shown in FIG. 2, in an embodiment, an automatic food preparation apparatus 100, 200 measures approximately 15 feet from end to end, four feet in width and nine feet in height, although other embodiments may use other dimensions and all dimensions set forth herein are merely examples. Ingredients are loaded at the left side of the apparatus by loading magazines 104 into the storage rack 102, while completed meal bowls emerge at the right side. In an embodiment, finished meal bowls may be placed on a conveyor belt 202 for later movement to a cubby or serving location. In other embodiments, finished meal bowls may be placed on one or more bowl pedestals for subsequent transportation to a designated cubby. In other embodiments, the dimensions of the automatic food preparation apparatus 100, 200 can be configured accordingly to the available space requirements of an assembly kitchen.

FIG. 3 is a side elevation view of the embodiment of the automatic food preparation apparatus 100, 200, 300 of FIG. 1 and FIG. 2. As seen in FIG. 3, in an embodiment, a top portion of the automatic food preparation apparatus 100, 200, 300 comprises thermal control system 106 for maintaining ingredients, which are stored in canisters in an ingredient storage location at hot, cold, and ambient or room temperature, and, as required, cooking those ingredients. The ingredient storage location, or storage rack 102 used in relation to the thermal control system 106, may be termed a thermal storage apparatus as further described in other sections. This apparatus may be configured or programmed to perform reheating or rethermalyzing, and/or cooking as appropriate for different meals or ingredients. In an embodiment, the logistics of retherm and/or cooking processes are performed automatically under program control. Rather than require persons to determine when to cook food for optimal freshness, the system is configured and programmed to automatically analyze stocks and heat on a just-in-time basis for use of magazines or canisters.

FIG. 4 illustrates the automatic food preparation apparatus 100, 200, 300, 400 from a perspective opposite that of FIG. 3. In an embodiment, the automatic food preparation apparatus 100, 200, 300, 400 may feature canister ejector(s) 402 connected to the storage rack 102. The canister ejector(s) 402 may cause canisters filled with ingredients to arrive at the IDM 116 of FIG. 1 and FIG. 3 in a correct order or sequence for a meal to be prepared, under program control. In an embodiment, a sequencer apparatus may comprise an electro-mechanical apparatus combining belts, mechanisms and ejectors operable under computer program control to eject a single canister at a time from magazines 104 and drop the canister into a canister transport mechanism that drives the canister towards the bowl assembly area, as further described herein in other sections.

FIG. 4 shows that a plurality of canister ejector(s) 402 are fitted along the back of the storage rack 102, to a rear of the magazines 104. In an embodiment, the canister ejector 402 may have 1½ inches (37 mm) of insulation, but other embodiments may use other thicknesses. In an embodiment, each canister ejector 402 may control the release of canisters from two magazines 104. In the embodiment of FIG. 4, there are three rows of ten canister ejectors 402 for the entirety of the storage rack 102, creating a total of 30 canister ejectors; however, any number of ejectors may be used to control release of canisters from any number of magazines 104.

With this arrangement, a sequencer 404 is configured to transport canisters from the magazines 104 to the bowl assembly lines, in an embodiment. The sequencer 404 may comprise a horizontal belt located below each row of ejectors 402 to transport canisters from a first horizontal belt end towards a second horizontal belt end near an IDM 116, as further described herein. The sequencer 404 may also comprises one or more vertical belts, located at the second horizontal belt end, that transport canisters from the horizontal belt into the IDM 116, as further described herein.

Figure 5:
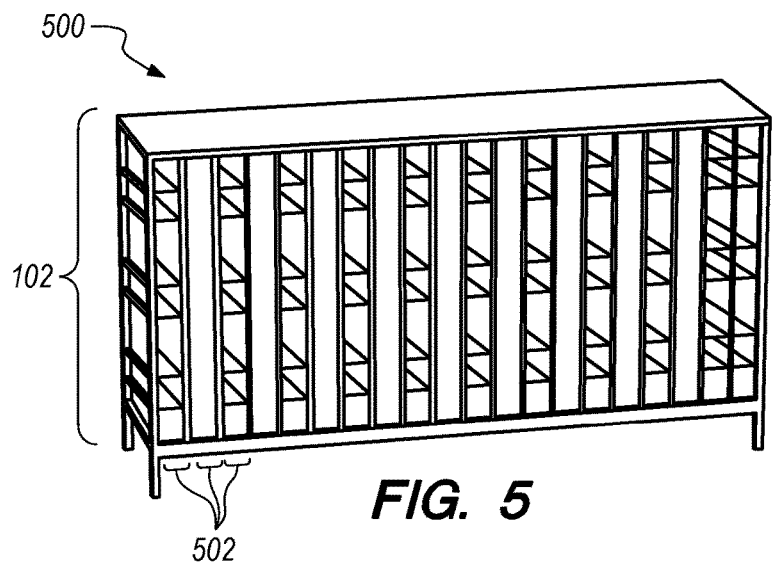
FIG. 5 is a front perspective view of a thermal storage apparatus, in one embodiment.

FIG. 5 is a front elevation view of the storage rack 102, which may be referred to as a thermal storage apparatus 500, in one embodiment. The view of FIG. 5 shows the storage rack 102 on the left side of the apparatus 100 of FIG. 1. Thus, FIG. 5 may be viewed as a partial view of the storage rack 102 on the left side of FIG. 1. In general, the thermal storage apparatus 500 provides storage of magazines 104, each of which contains one or more canisters of a particular ingredient. For example, a cooked chicken magazine may comprise one (1) or more canisters each holding one serving of cooked chicken for later dispensing into a bowl as part of a meal.

In an embodiment, research may be conducted to determine how many magazines 104 featuring which type of ingredients should be placed in the storage rack 102 for meal assembly optimization. For example, research may be conducted into an optimal set of ingredients to permit constructing bowls for a set of 10 cohorts of customers. Thus, the optimal number of canisters and magazines 104, regulated under which temperatures, may be determined. In an embodiment, one or more of the computers of the system may be configured or programmed according to an algorithm to automatically execute the foregoing optimization without user input.

The thermal storage apparatus 500 may comprises a series of rows and columns for storing magazines 104. In the example of FIG. 5, the thermal storage apparatus 500 has 20 columns and six rows of racks for storing magazines 104, however any number of columns and rows may be used. In an embodiment, the six rows may be grouped into three row pairs, where each row pair is separated by a row gap, as seen in FIG. 1 and FIG. 3. For example, the first two columns may feature two magazines 104 in the top row pair, four magazines 104 in the middle row pair, and four magazines 104 in the bottom row pair.

One or multiple columns may belong to thermal zone(s) 502 that are configured to maintain a particular temperature of the ingredients stored within the magazines 104 of those thermal zones 502. For example, the first six columns from the left may be a first thermal zone 502 that is kept at a hot temperature. The next six columns may be a second thermal zone 502 that is kept at an ambient or room temperature. The final eight columns may be a third thermal zone 502 that is kept at a cold, refrigerated temperature. In another embodiment, each column is a stand-alone thermal zone 502 that is individually temperature-regulated, thereby creating 20 different thermal zones 502. In the embodiment of FIG. 5, the thermal storage apparatus 500 comprises ten thermal zones, and each thermal zone comprising two columns of six rows (or three row pairs) of ingredients. Any number of columns or rows may be used to generate any number of thermal zones 502.

In an embodiment, the thermal storage apparatus 500 comprises a plurality of magazine supports formed of metal frame members such as aluminum or steel. Other embodiments may use other materials. External walls are covered with insulation. In one embodiment, an insulation thickness of 1½ inches (37 mm) is used, but other embodiments may use other thicknesses. In an embodiment, thermal zones 502 are formed using walls that separate pairs of columns of ingredients from other pairs and are formed of one inch (25 mm) of insulation as the walls. The frame members are formed using an open grid of spaced-apart frame members, which acts to reduce localized eddies in airflow that otherwise could result in hot spots or cold spots.

The thermal storage apparatus 500 may comprise a thermal control system with a cooling apparatus, a heating apparatus, an ambient temperature apparatus, ducting or piping, valves, and insulated walls that permit maintaining magazines 104 and canisters at different temperatures under automatic program control. In an embodiment, the heating and cooling apparatuses are coupled, ducted, or otherwise connected to the individual thermal zones 502. For example, the apparatus may include a heater or furnace having a duct manifold coupled to a plurality of ducts that are coupled to one or multiple thermal zones 502. Similarly, the apparatus may comprise a chiller, refrigerator or other cooler that is coupled to one to ten of the thermal zones 502, or from one to a number of zones 502 that is equal to ten less the total number of heated zones 502. Other embodiments may use fewer zones or more zones 502.

Figure 6:
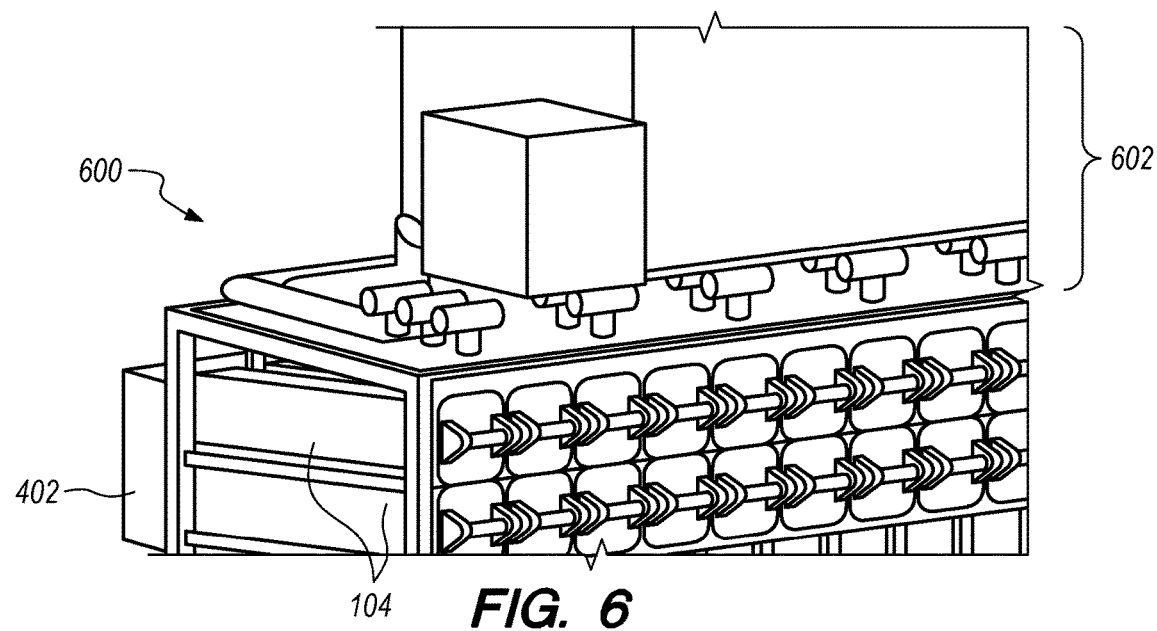
FIG. 6 is an enlarged partial perspective view of the thermal storage apparatus of FIG. 5, in one embodiment.

FIG. 6 is a partial perspective view of the thermal storage apparatus of FIG. 5, in one embodiment. In an embodiment, the thermal storage apparatus includes a rack 500 and utilities 600. FIG. 6 shows that a canister ejector 402 is fitted to a rear of the magazines 104 within the thermal storage apparatus. FIG. 6 also illustrates a partial perspective view of the thermal control system 602 above the thermal storage apparatus, which features three ducts for regulating hot, cold, and ambient temperatures in each of ten thermal zones 502. Three corresponding ducts may be located below the thermal storage apparatus 500, 600 such that air flow is regulated into the top of the apparatus 500, 600 and out the bottom of the apparatus 500, 600. In another embodiment, the air flow may be regulated into the bottom of the apparatus 500, 600 and out the top of the apparatus 500, 600.

Each duct of the three total ducts may feature a plurality of valves that regulate flow of a thermal transfer medium into and out of each of the thermal zones 502 through inlets and outlets. In various embodiments, the thermal transfer medium may comprise air or another gas, or glycol or another liquid. For example, each top duct may have ten valves connected to outlets or inlets corresponding to ten thermal zones 502, and each bottom duct may have another ten valves connected to corresponding inlets or outlets of the ten thermal zones, creating a total of 60 valves when incorporating all three temperature systems. In another embodiment, each top duct may have 20 valves and each bottom duct may have another 20 valves, creating a total of 120 valves, when incorporating all three temperature systems. In an embodiment, each t-value may have open and closed settings such that flow of the thermal transfer medium into and out of each thermal zone may be enabled or disabled, as further described herein.

FIG. 20A, FIG. 20B, FIG. 20C, FIG. 20D illustrate a thermal control system and apparatus 2000, for heating, cooling, and maintaining ambient temperature, in one embodiment. In an embodiment, the thermal control system comprises three systems that act independently to supply the thermal transfer medium to thermal zones 502 within the thermal storage apparatus 500, 600 of the automatic food preparation apparatus 100, 200, 300, 400. In all three systems, the thermal transfer medium is pumped through the selected thermal zones in parallel, using low-pressure, high-flow blowers.

The cooling system uses a commercial refrigeration unit to cool the thermal transfer medium and may use its internal temperature regulation system for closed-loop control. Inlets for cold thermal transfer medium are at the top of the storage, with outlets at the bottom, to take advantage of natural convection of cold thermal transfer medium and thereby mitigating temperature stratification within the ingredient storage. The heating system uses one or more electric resistive heaters with an OTS controller to regulate temperature of the thermal transfer medium. Inlets for warm thermal transfer medium are at the bottom of ingredient storage with outlets at the top, using convection effects inversely to the cooling system. The thermal transfer medium is recirculated throughout both these systems. The room temperature system is a blower with an air filter, drawing ambient temperature air from the room, which is exhausted through the bottom of the apparatus and can be vented to the exterior of a store if desired. In some embodiments, the thermal control system may use a steam heat exchanger and a refrigerated glycol loop. Apparatus for generating and transferring steam to the apparatus, and for refrigerating glycol or another thermal transfer medium and routing cooled medium to the apparatus, may be externally mounted and the particular arrangement of that apparatus is not critical to embodiments of the automatic food preparation apparatus.

In an embodiment, a thermal zone 502 consists of two columns and three row pairs of ingredients such that a total of 12 ingredients can be contained within a single thermal zone. Ten thermal zones can be configured to hold food at any of three temperature states (hot, cold, ambient), through program control and servo or solenoid control of inlet valves and outlet valves on each thermal zone. Each thermal zone 502 may have one inlet and outlet for each thermal system, which can be opened and closed to isolate a given zone to one system. Additionally, these valves may be opened and closed, or throttled, to regulate temperature in a thermal zone 502. Temperature sensors are affixed in each thermal zone and coupled to the computer system to provide temperature monitoring and feedback for each zone. In an embodiment, spiral ducting with a diameter of 1½" to 2" (37 mm to 50 mm) is used, but ducts of any diameter may be used in other embodiments.

In an embodiment, the thermal control system and apparatus 2000 comprises a resistive heating unit 2002, a refrigeration unit 2014, an air filter 2026, a plurality of blowers 2004, 2016, and ducts or pipes 2006, 2010, 2018, 2022, 2028, 2032 having a plurality of inlets 2008, 2024, 2030 and outlets 2012, 2020, 2034.

Figure 20A:
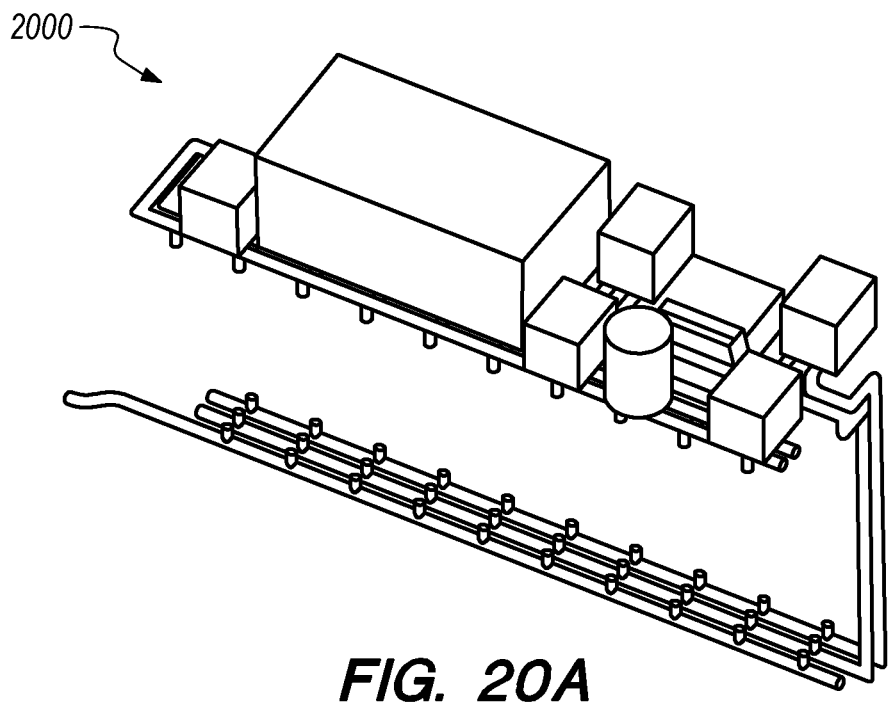
FIG. 20A illustrates a stationary thermal control apparatus, for heating, cooling, and maintaining ambient temperature, in one embodiment.
Figure 20B:
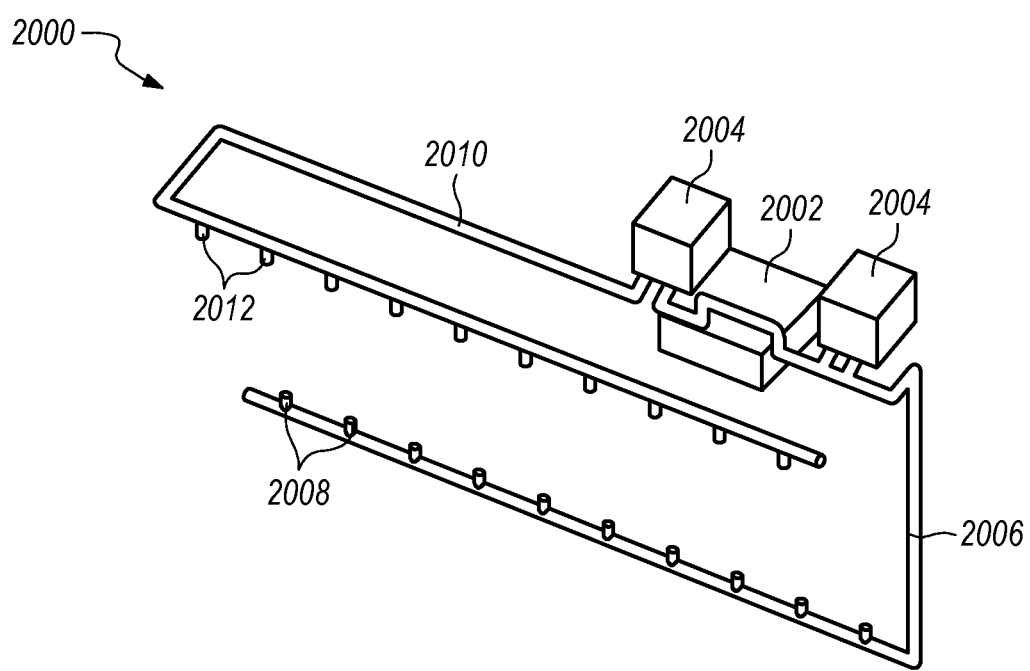
FIG. 20B illustrates a stationary thermal control apparatus, for heating, cooling, and maintaining ambient temperature, in one embodiment.

In an embodiment, as in FIG. 20B, a heating system of the thermal control system and apparatus 2000 comprises a resistive heating unit 2002 featuring a plurality of resistive heating elements coupled to top outlets 2012 through top ducts 2010 and bottom inlets 2008 through bottom ducts 2006. As noted above, a steam generator may be used as an alternative to the resistive heating unit 2002. In this configuration, cooler air is drawn from a lower portion of the apparatus through ducts 2006 and circulated into the resistive heating unit 2002, which produce warmed air for output via the outlets 2012. In an embodiment, two or more blowers 2004 provide directional circulation to direct the warmer air from the resistive heating unit 2002 down into duct 2006, out the bottom inlets 2008 and into one or more thermal zones 502 of the thermal storage apparatus 500, 600. The blowers 2004 also provide direction circulation to direct the cooler air from the thermal storage apparatus 500, 600 out the top outlets 2012 and into the resistive heating unit 2002 for warming.

Figure 20C:
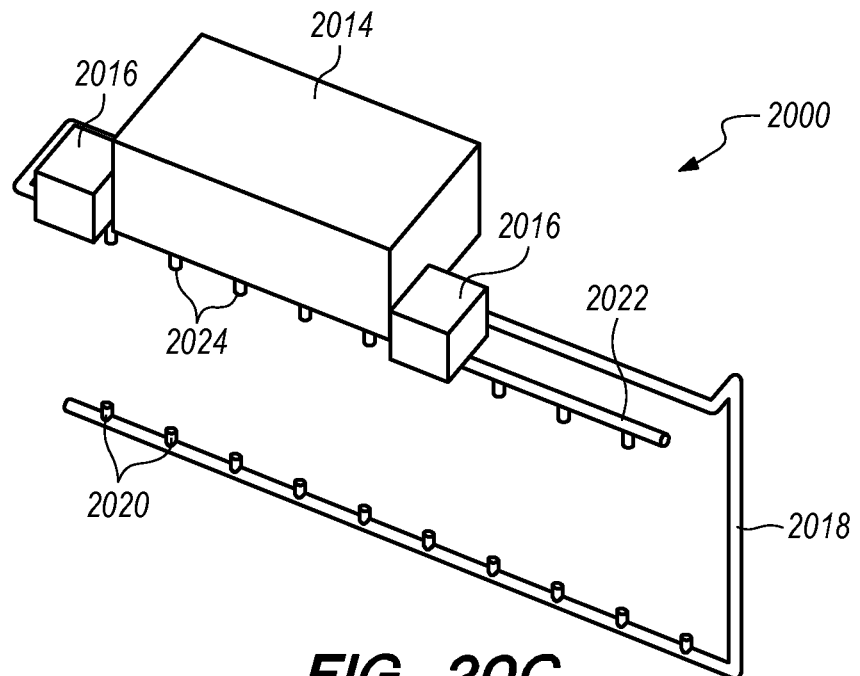
FIG. 20C illustrates a stationary thermal control apparatus, for heating, cooling, and maintaining ambient temperature, in one embodiment.
Figure 20D:
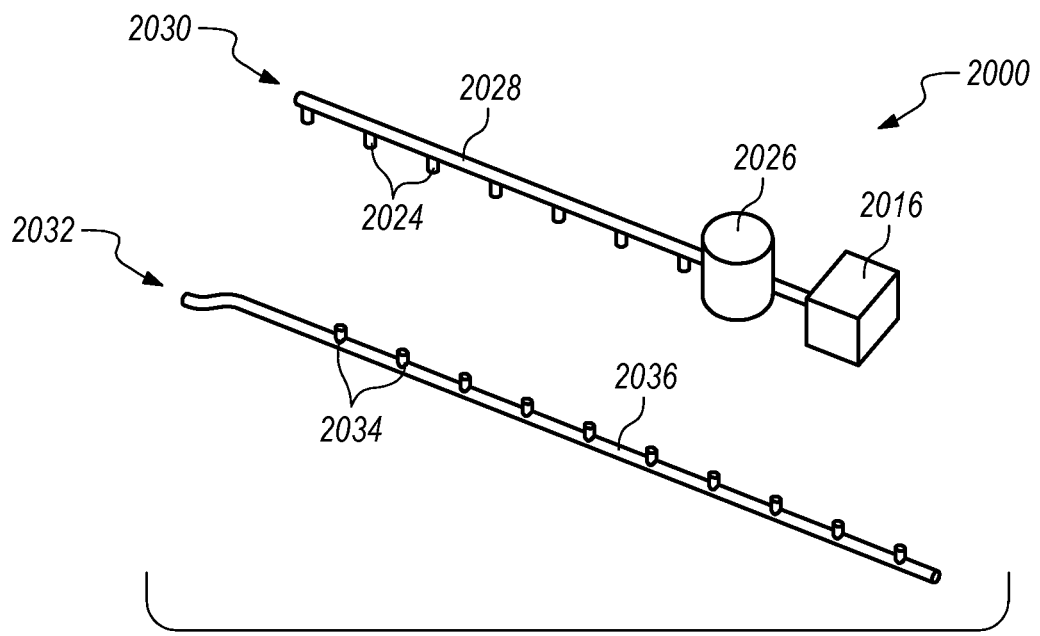
FIG. 20D illustrates a stationary thermal control apparatus, for heating, cooling, and maintaining ambient temperature, in one embodiment.
Figure 21A:
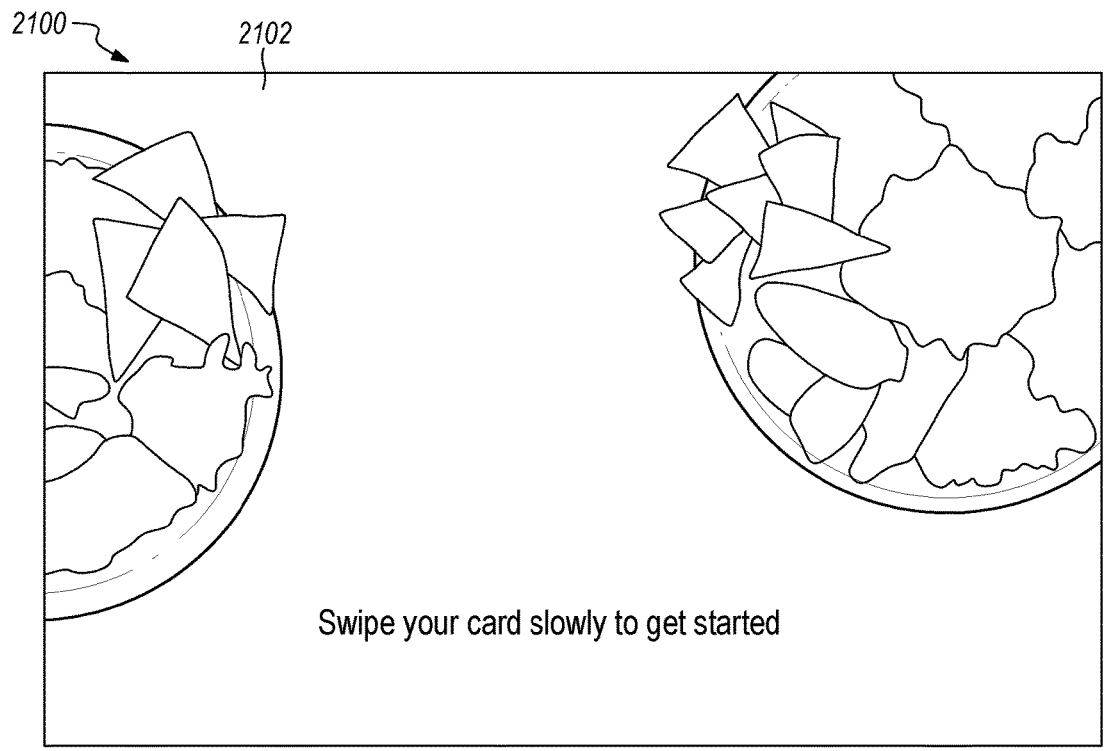
Figure 21B:
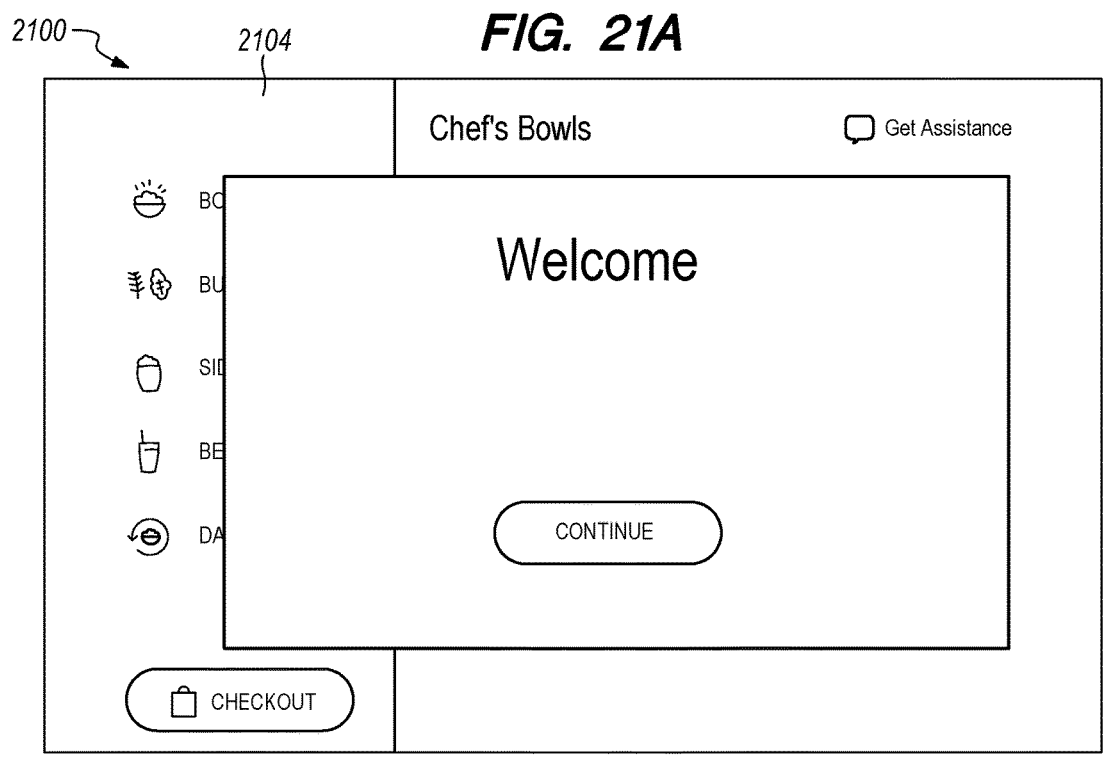
Figure 21C:
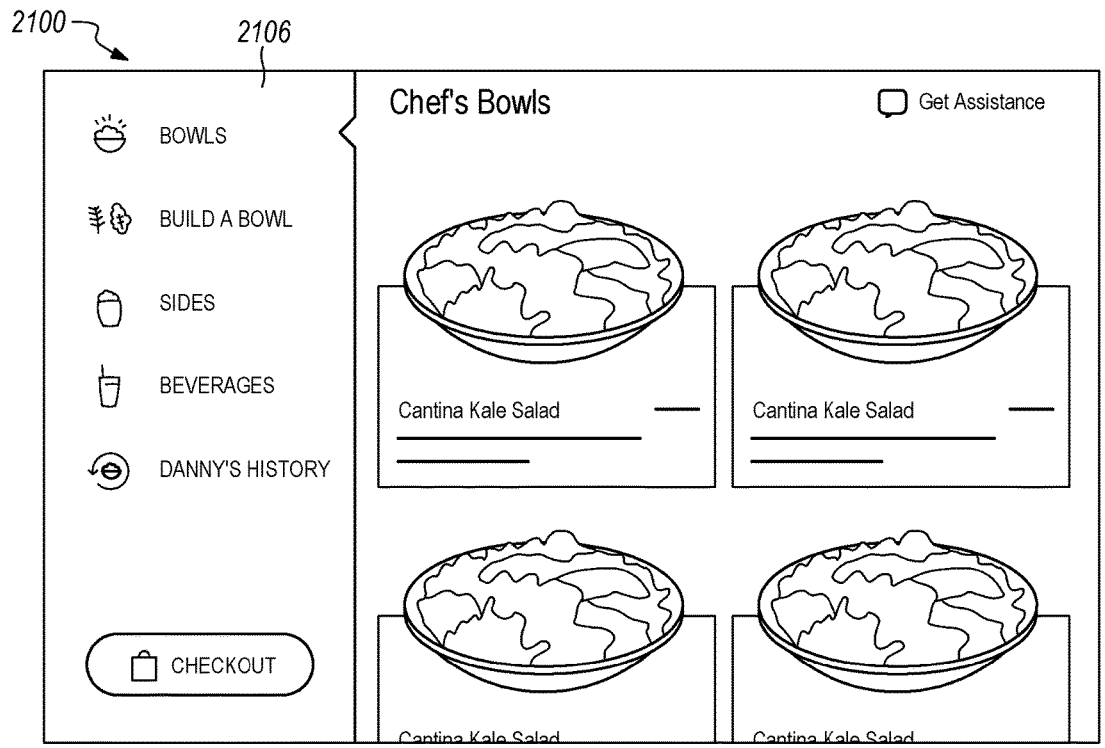
Figure 21D:
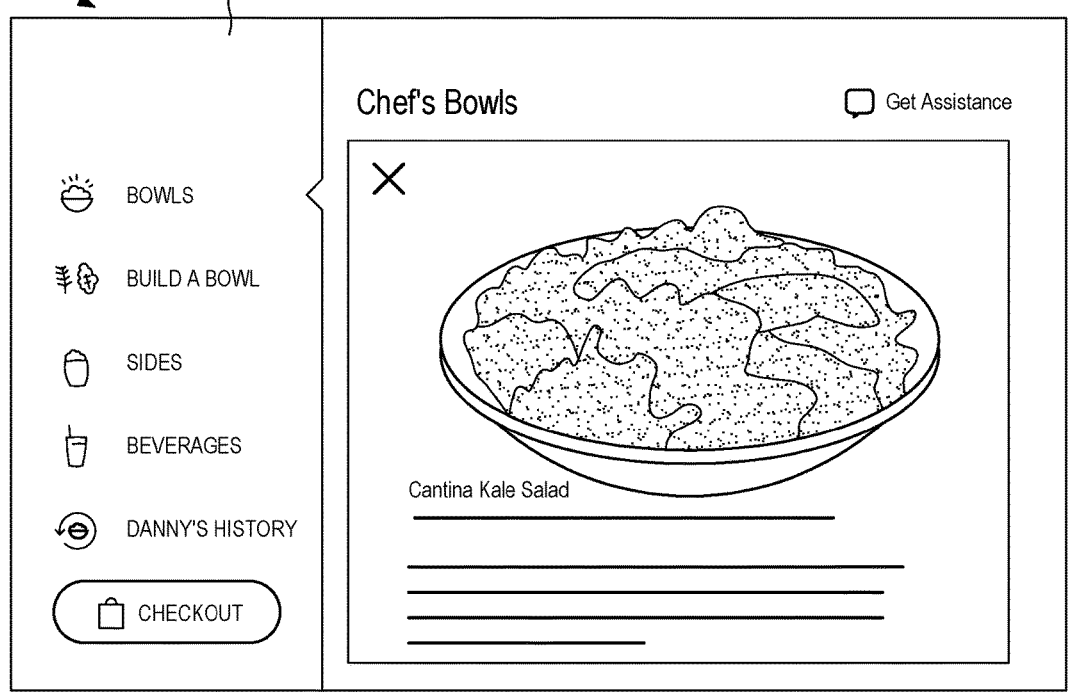
Figure 21E:
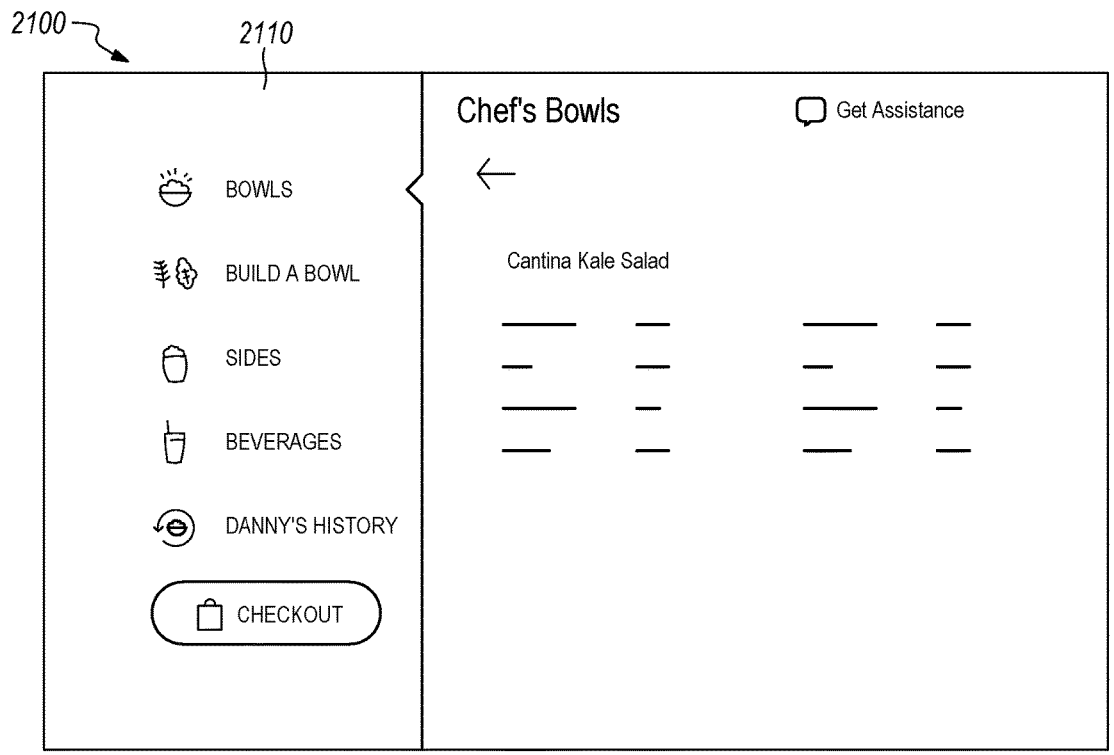
Figure 21F:
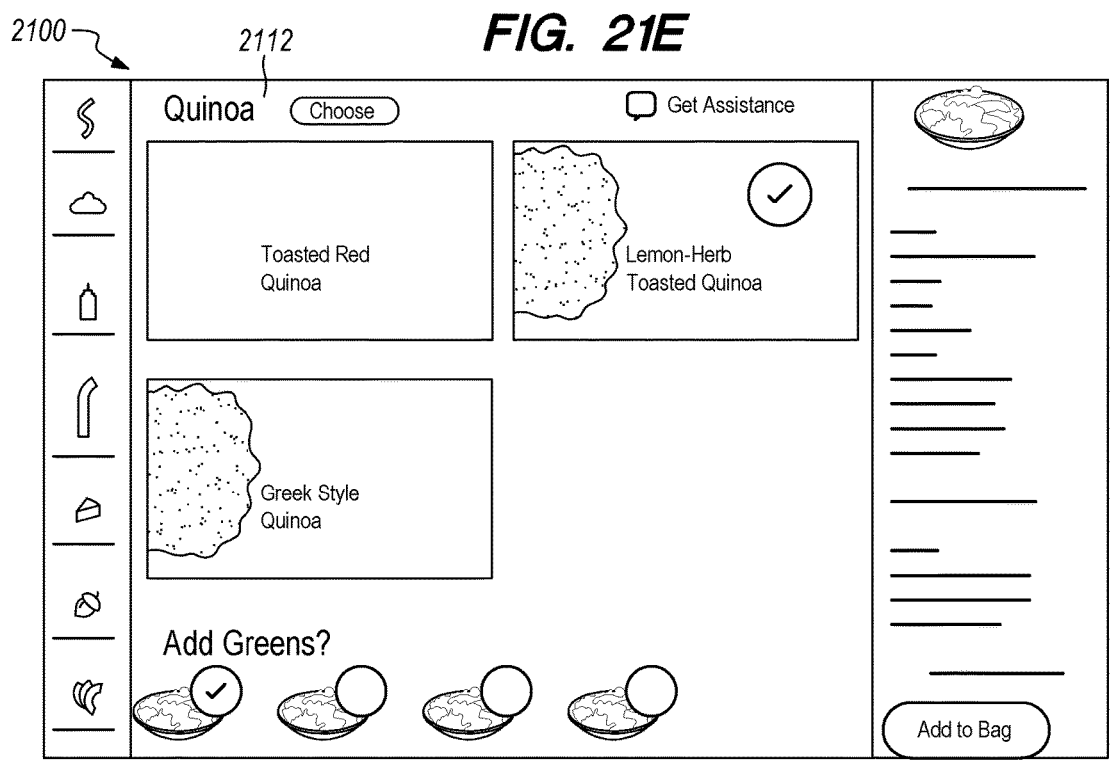
Figure 21G:
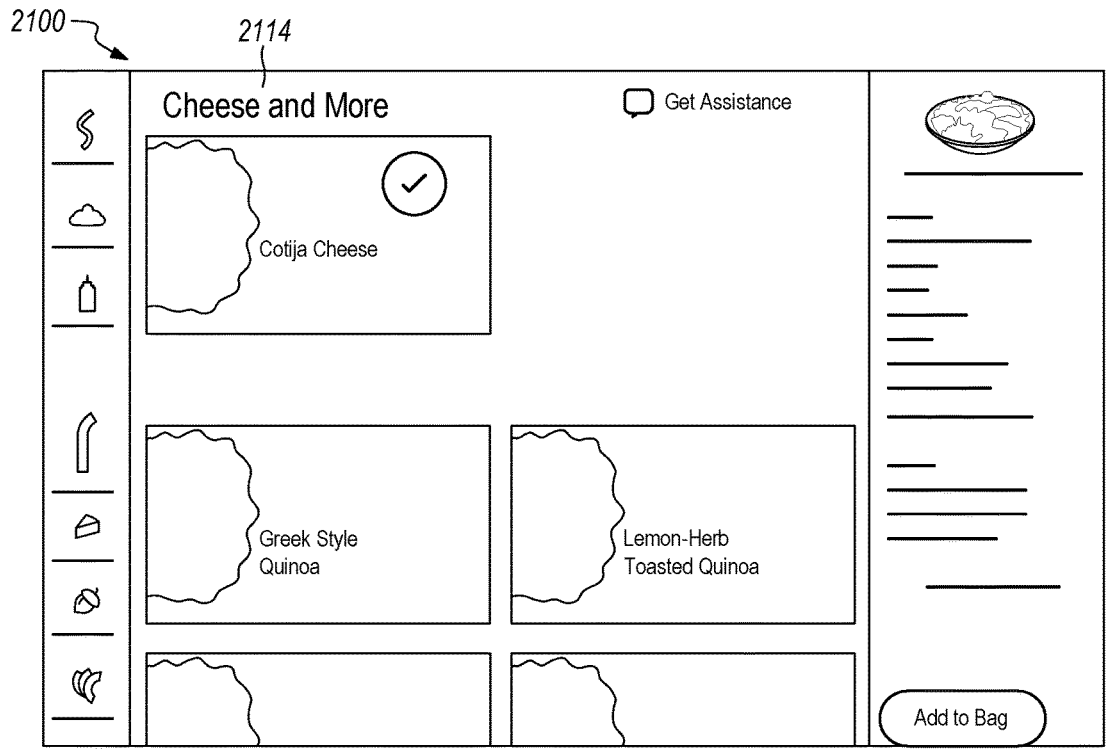
Figure 21H:
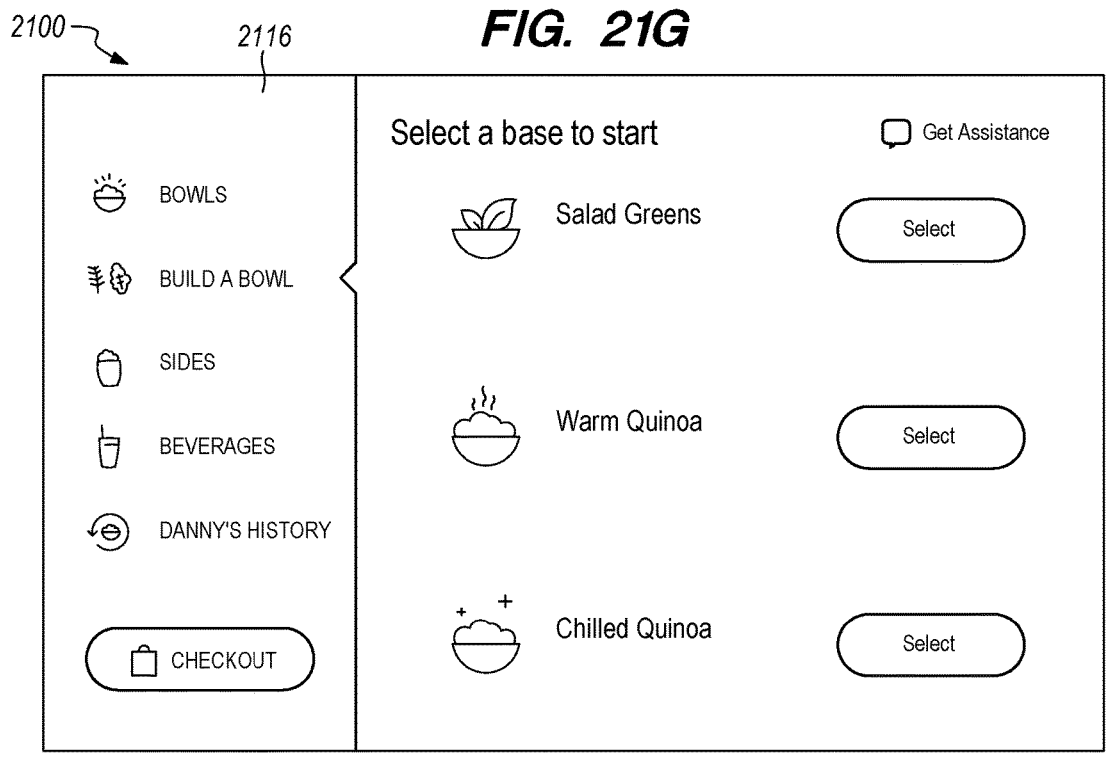
Figure 21I:
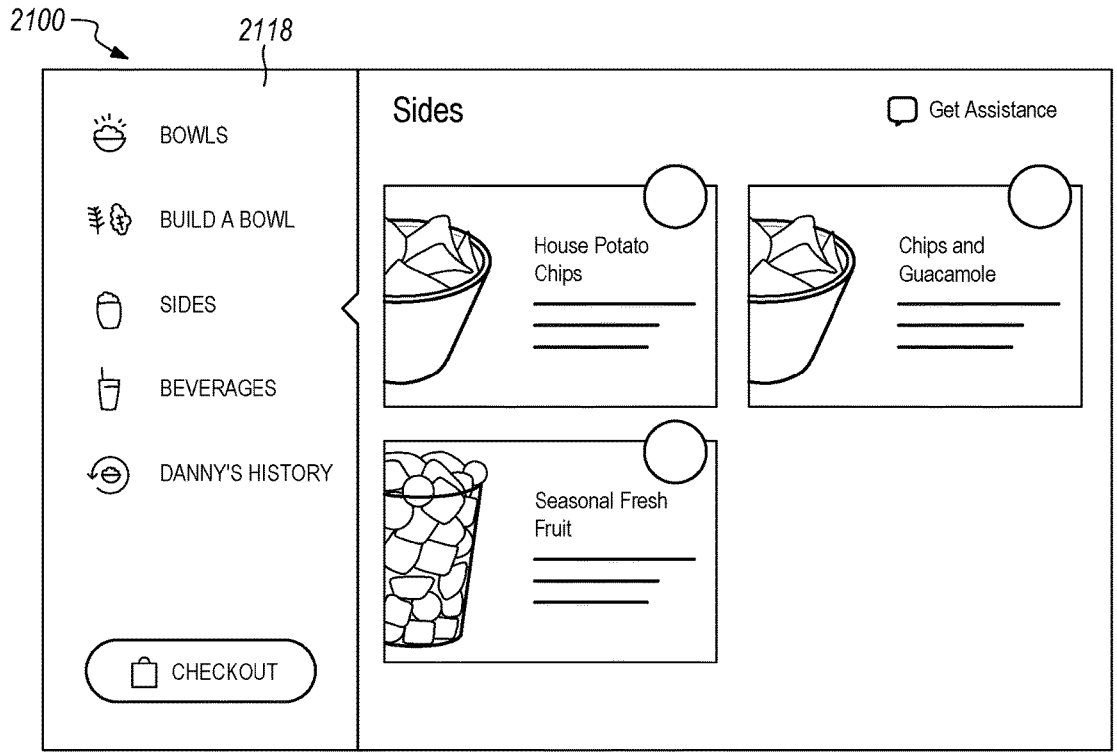
Figure 21J:
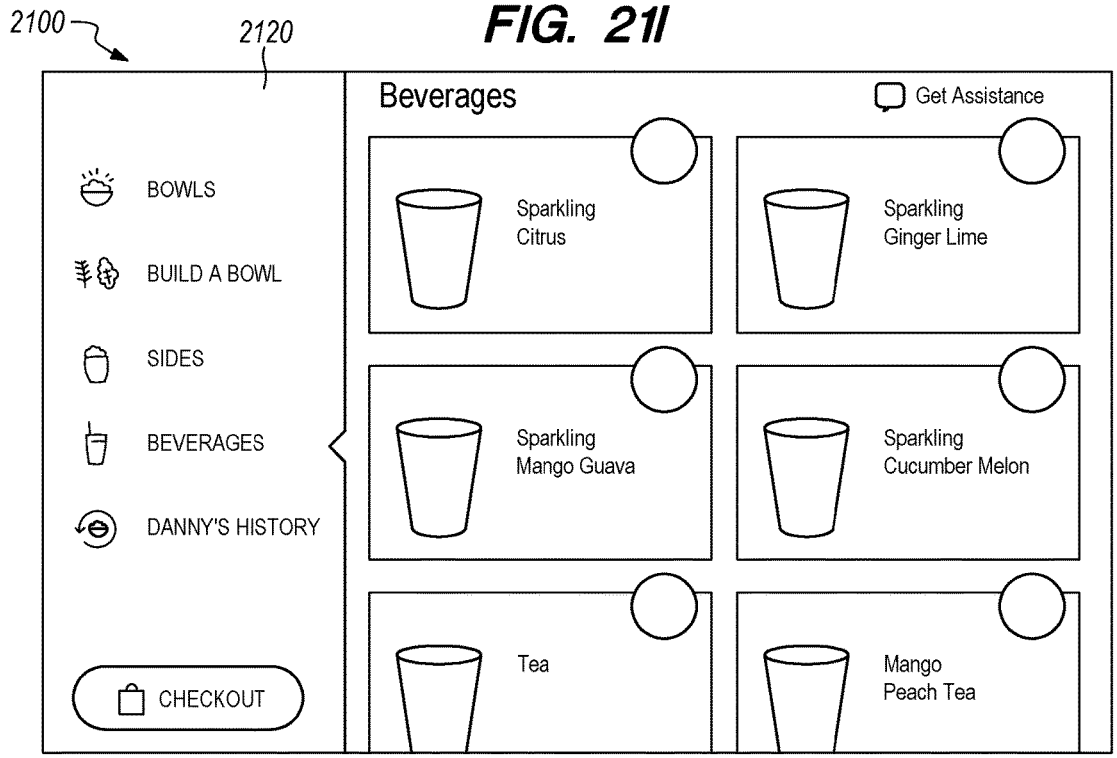
Figure 21K:
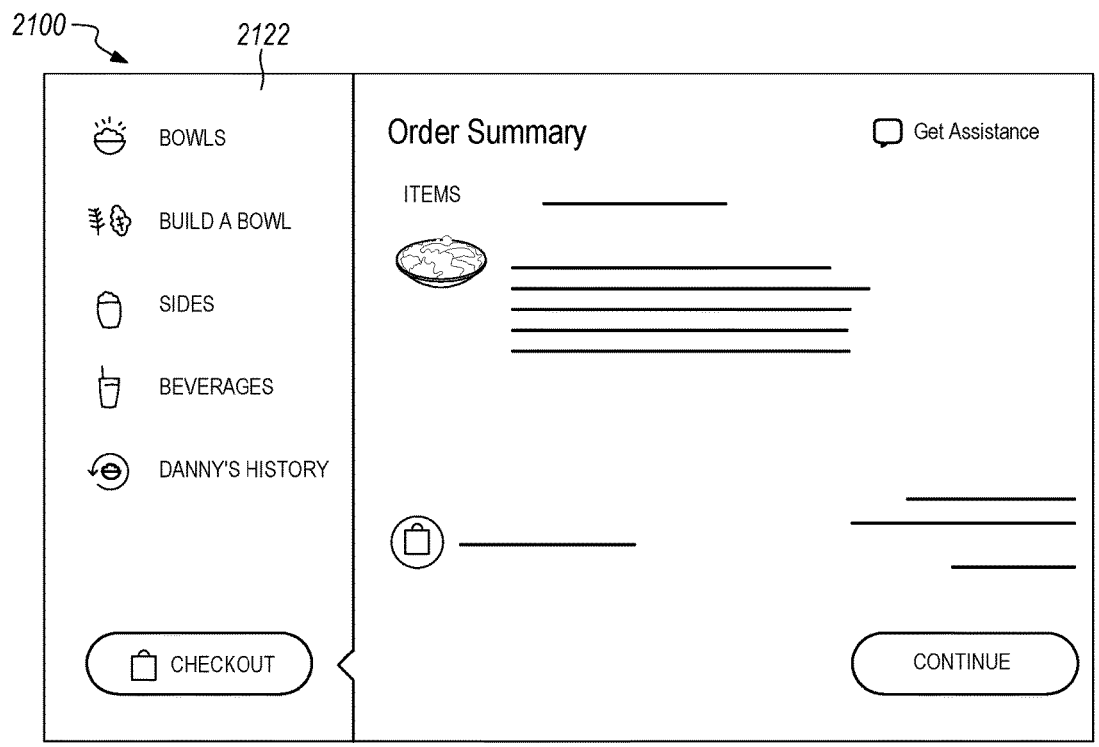
Figure 21L:
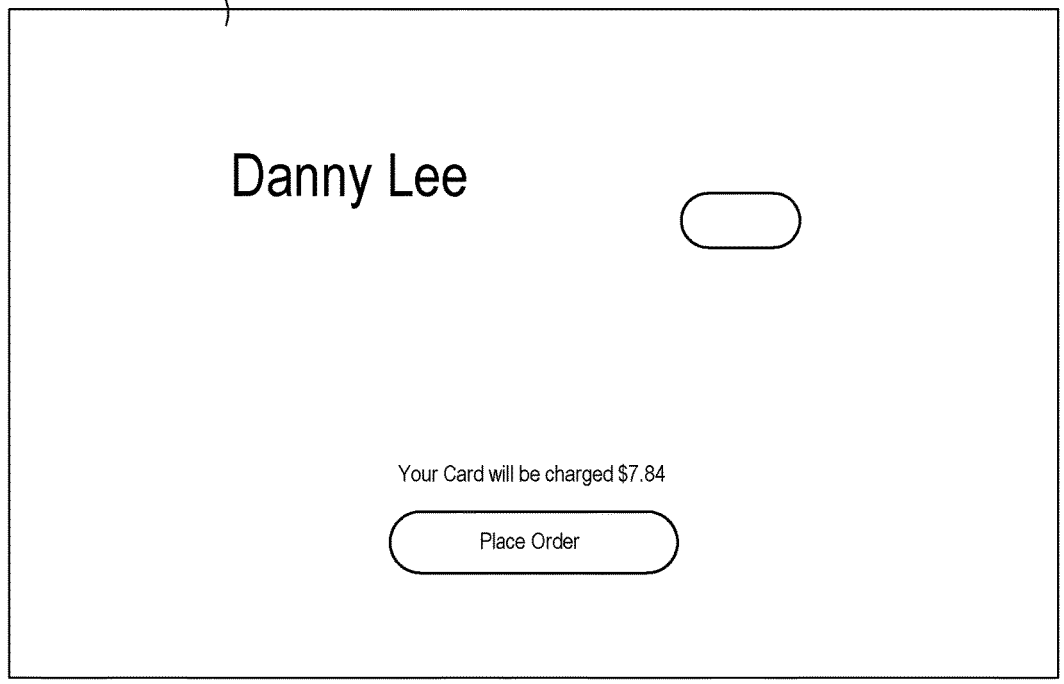
Figures 21M, 22A:
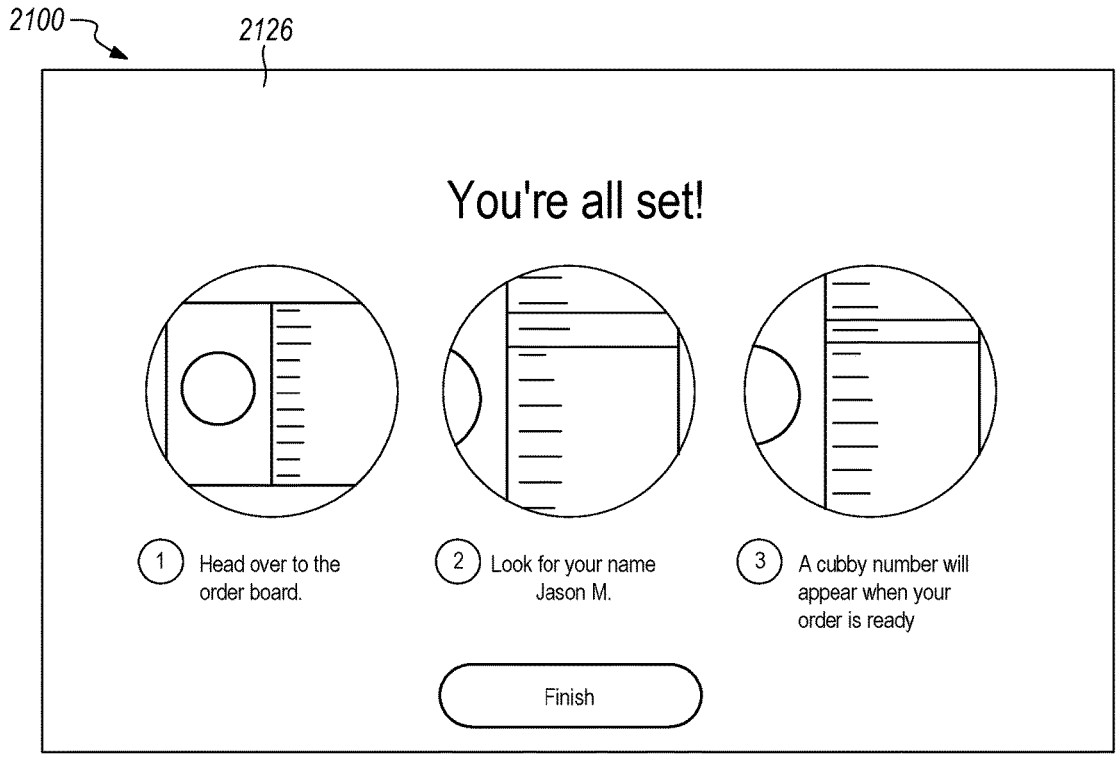
Figure 22B:
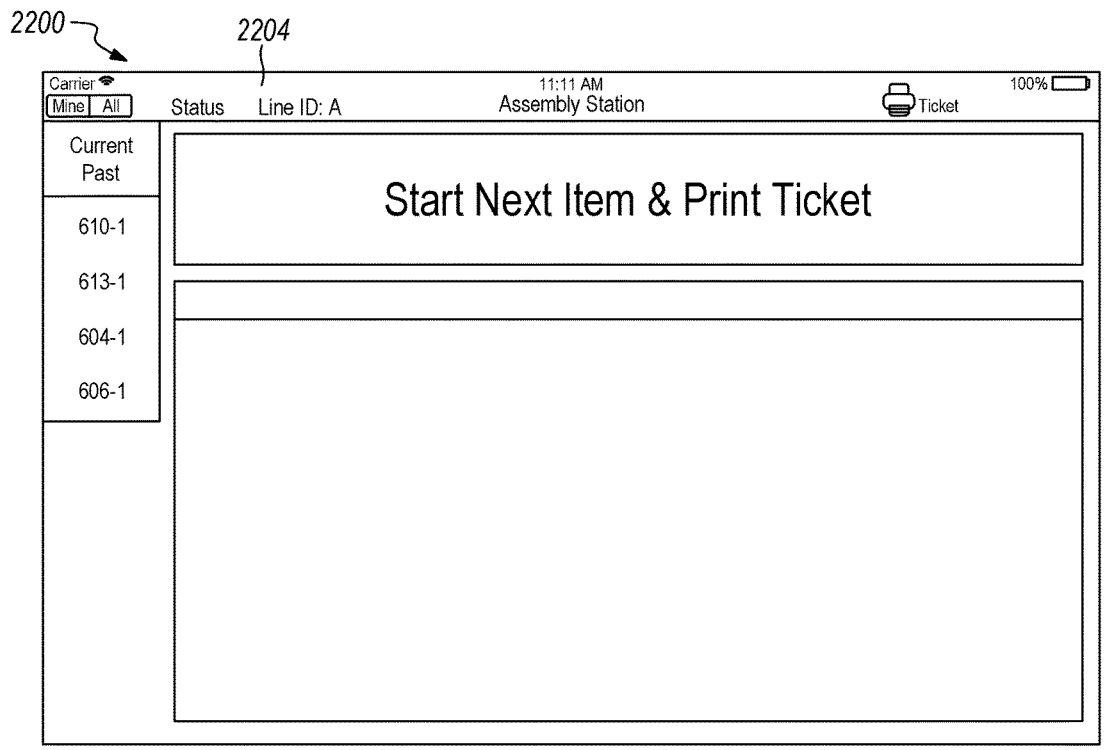
Figure 22C:
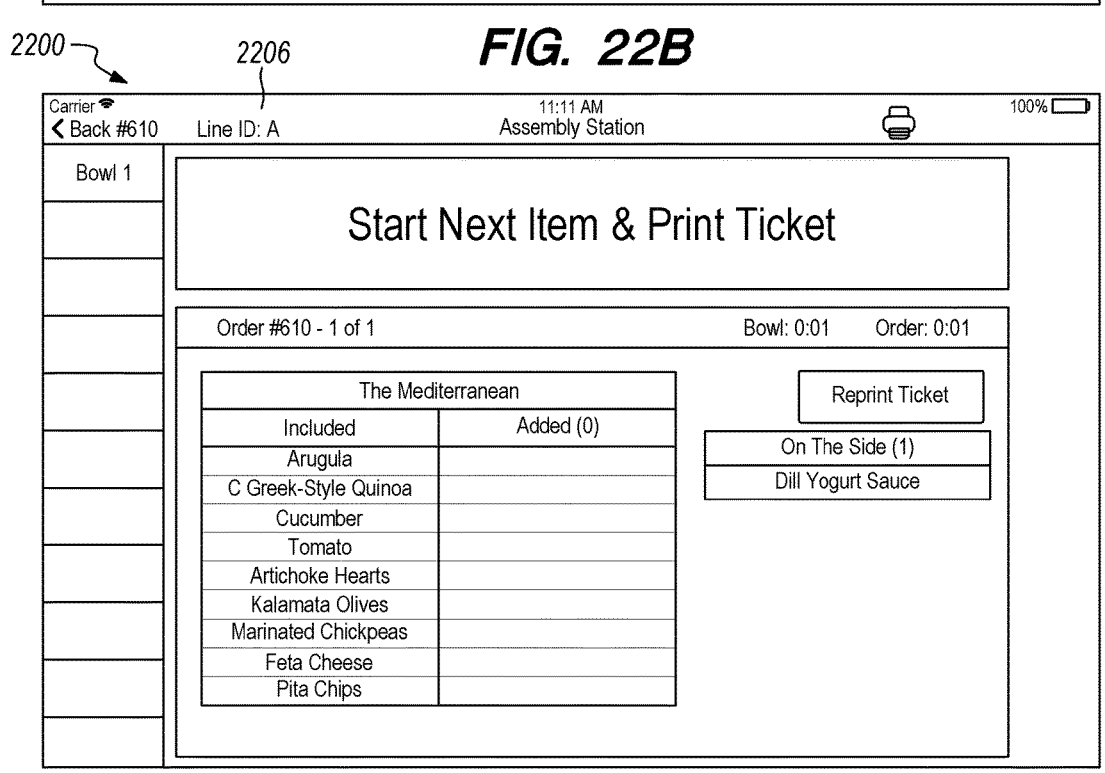
Figure 22F:
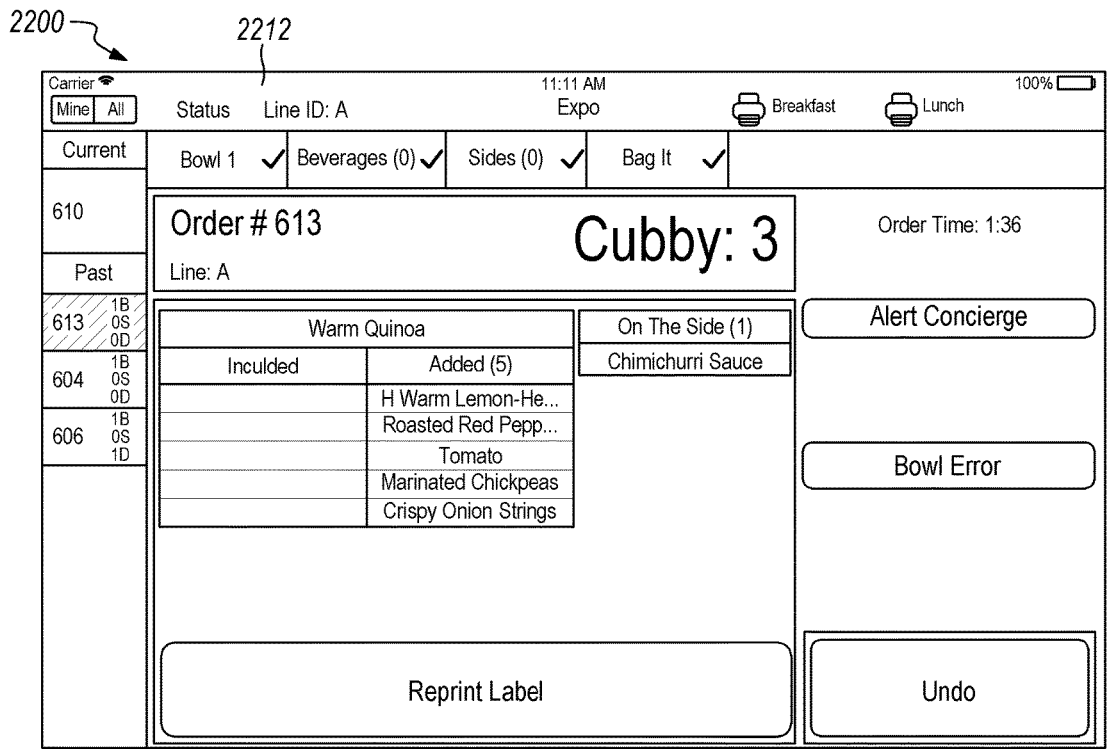
Figure 22G:
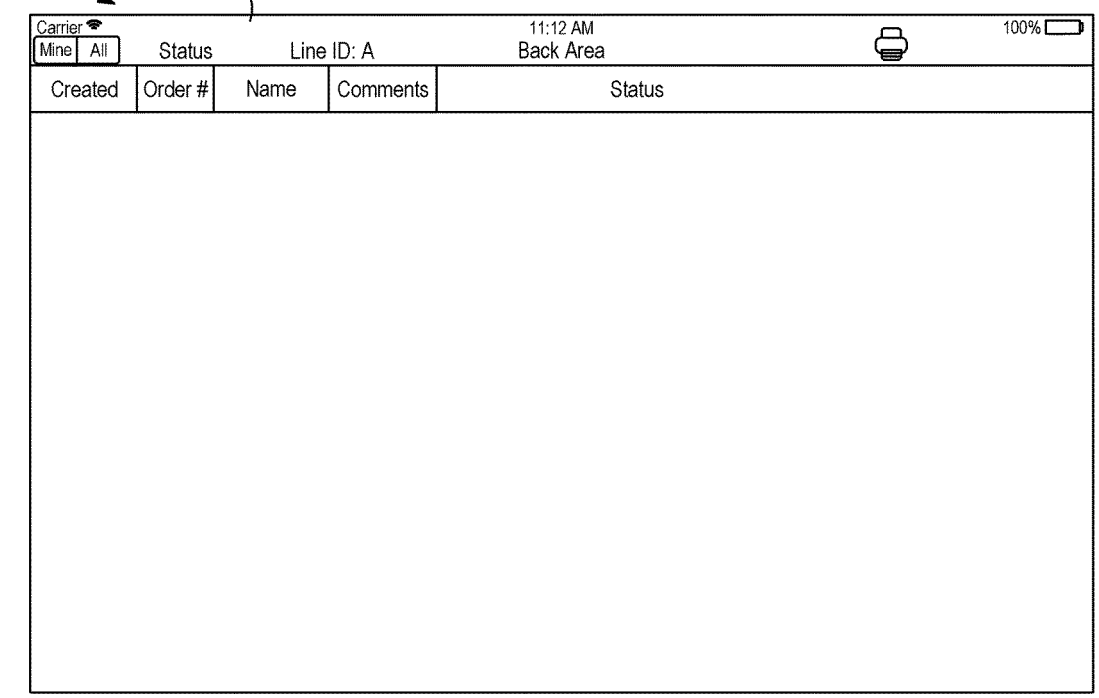
Figures 22H, 22I:
Figure 23A:
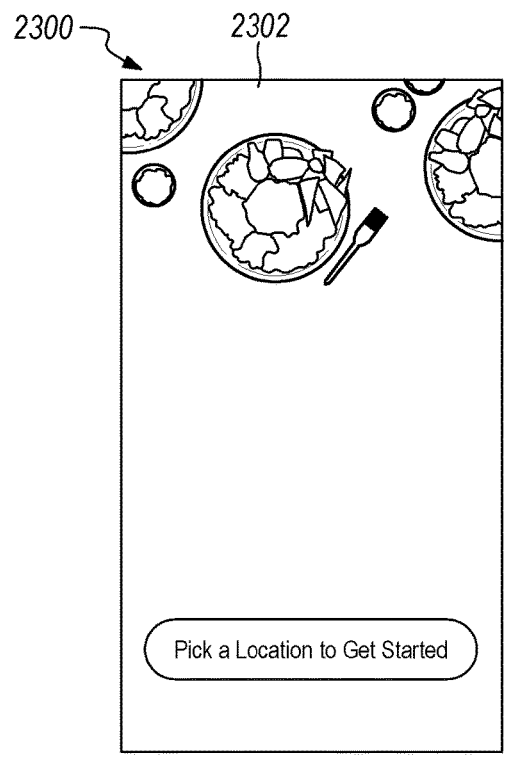
FIG. 23A, FIG. 23B, FIG. 23C, FIG. 23D, FIG. 23E, FIG. 23F, FIG. 23G, FIG. 23H, FIG. 23I, FIG. 23J, FIG. 23K, FIG. 23L, FIG. 23M, FIG. 23N, FIG. 23O illustrates an example sequence of computer display screen images that may be generated and displayed at a kiosk computer under program control as part of a graphical user interface for a consumer using a mobile computing device.
Figure 23B:
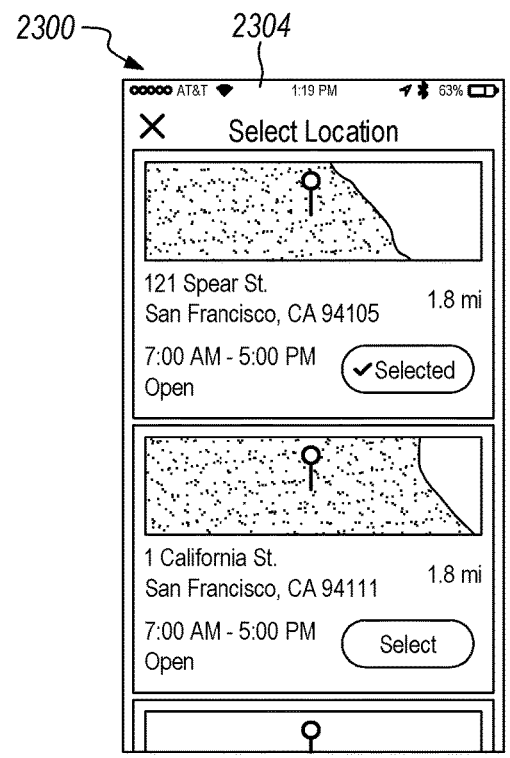
Figure 23C:
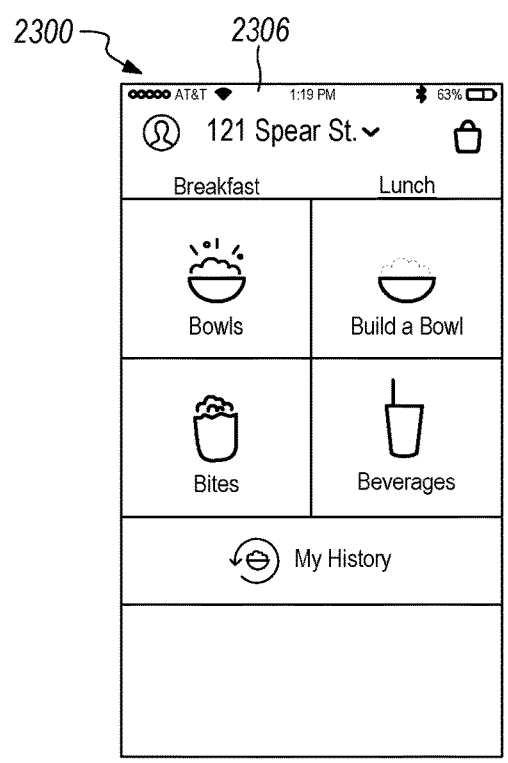
Figure 23D:
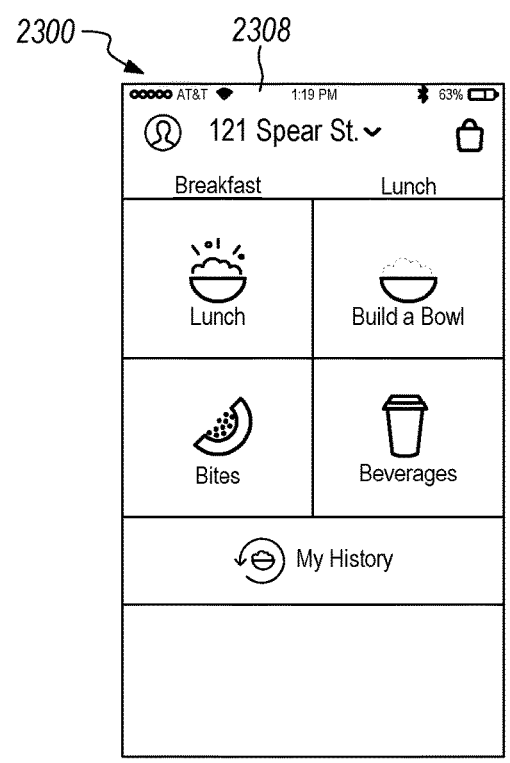
Figure 23E:
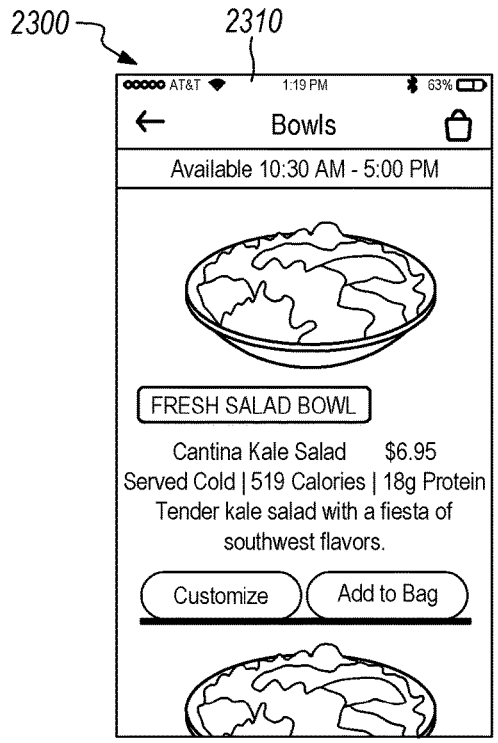
Figure 23F:
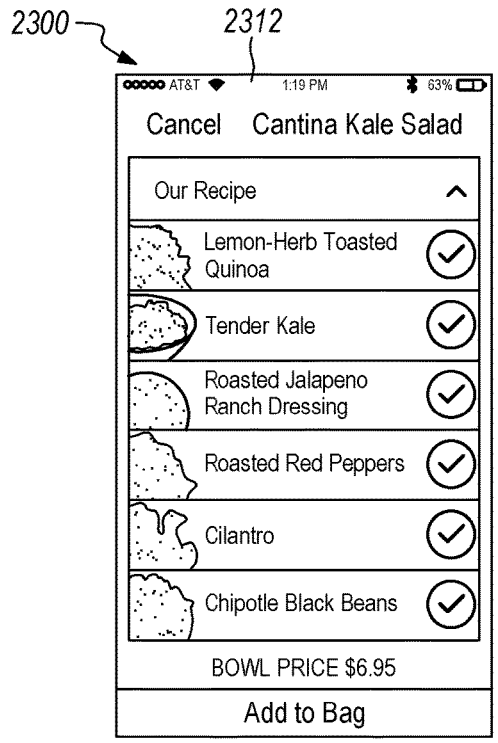
Figure 23G:
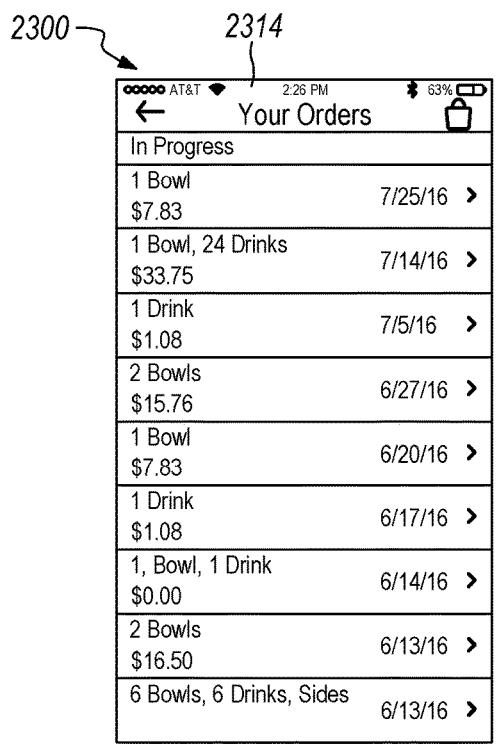
Figure 23H:
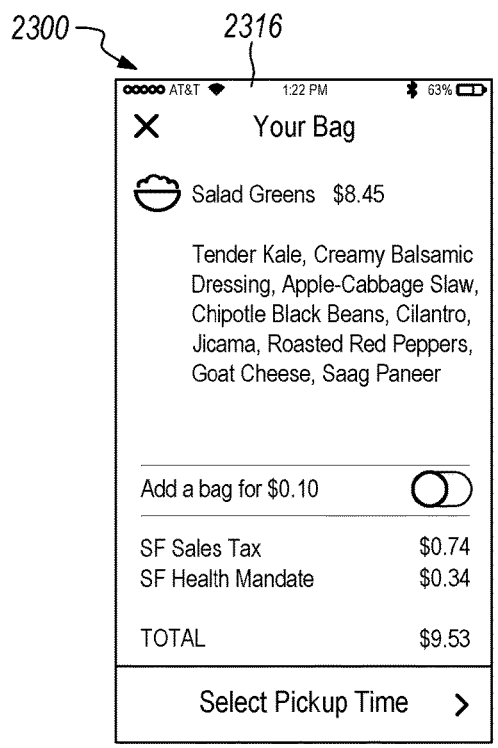
Figure 23I:
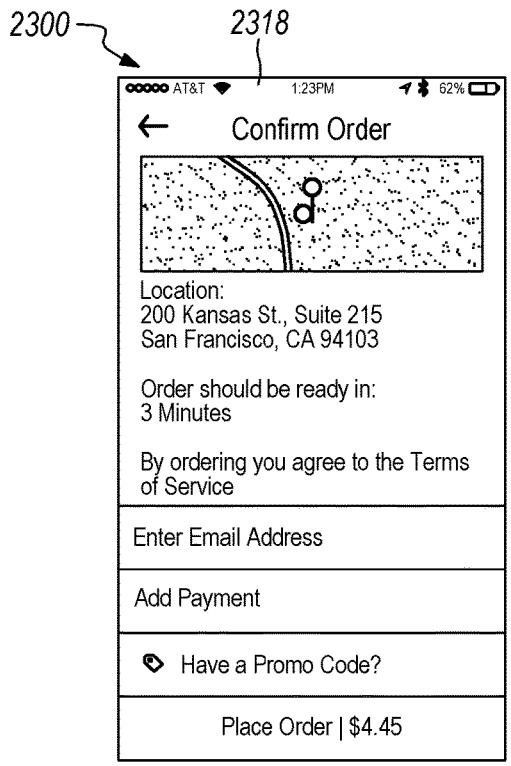
Figure 23J:
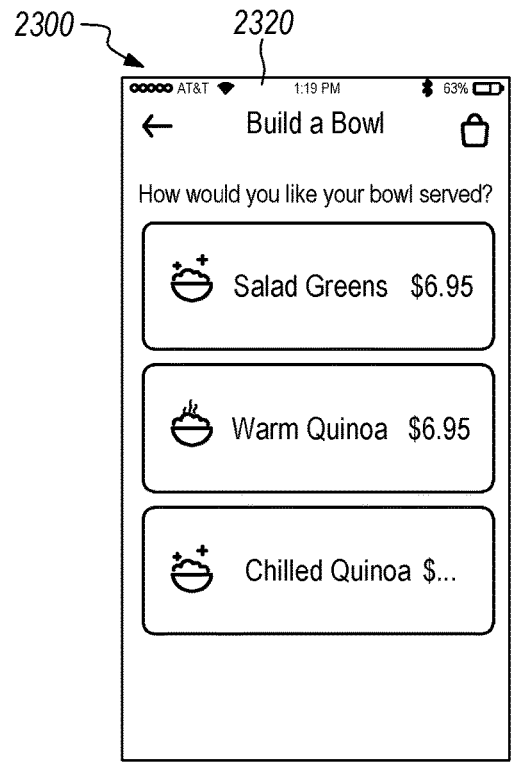
Figure 23K:
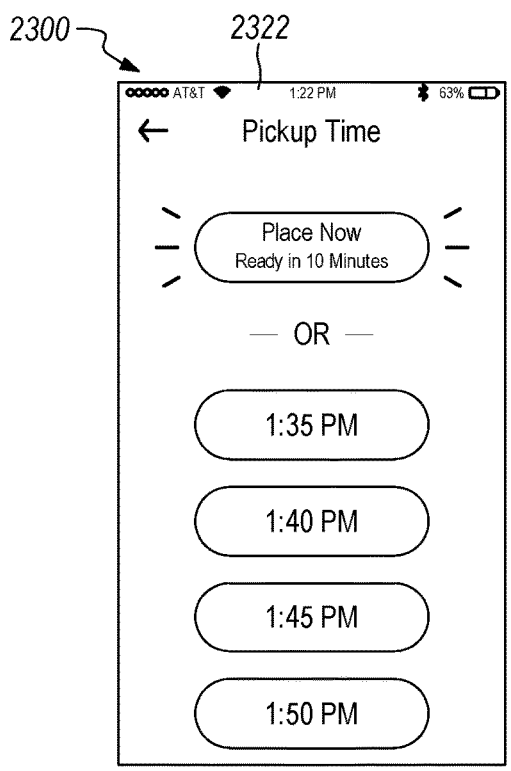
Figure 23L:
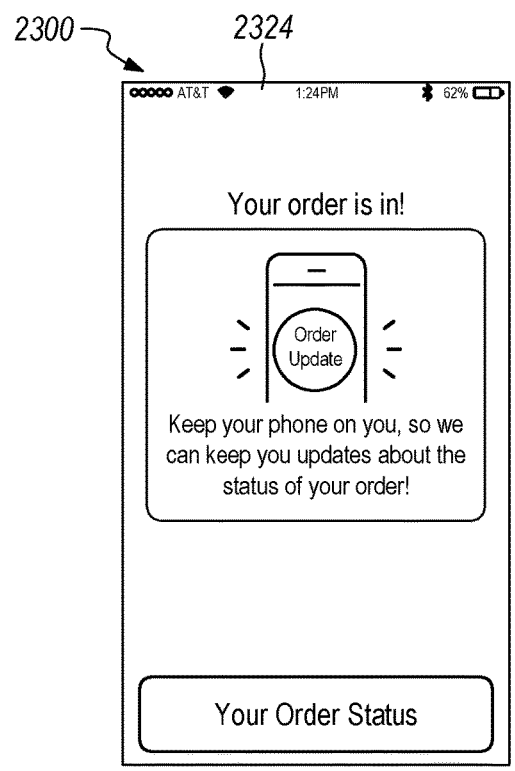
Figure 23M:
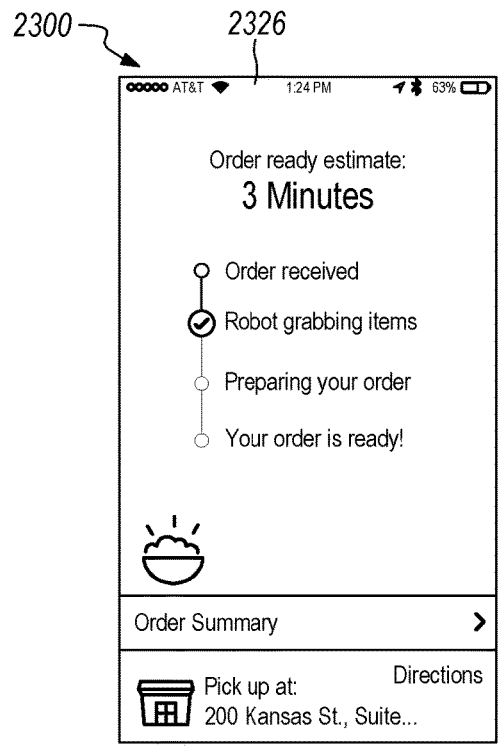
Figure 23N:
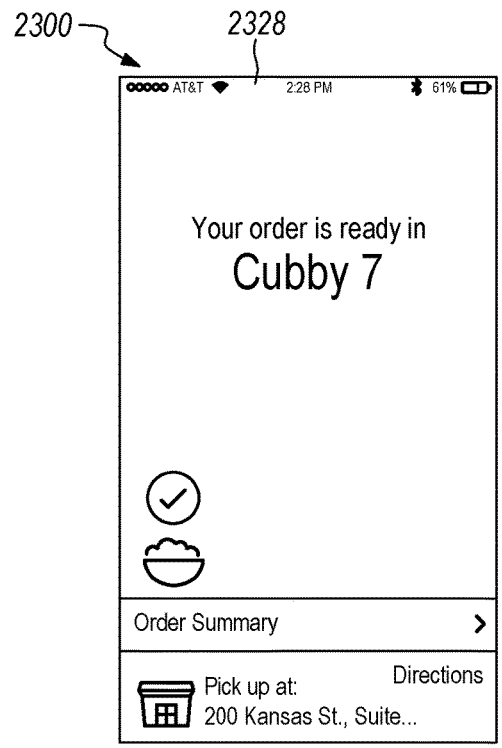
Figure 23O:
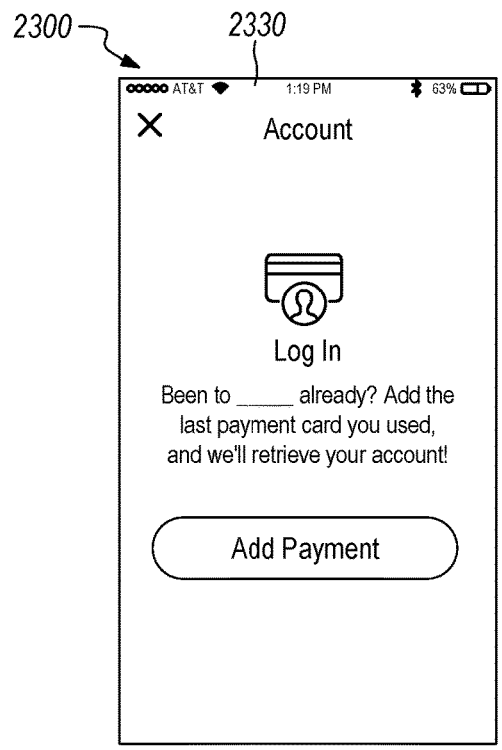

In an embodiment, as in FIG. 20C, a cooling system of the thermal control system and apparatus 2000 comprises a refrigeration unit 2014 having inlets 2024 arranged at an upper part of the thermal storage apparatus 500, 600 at which warmer air can be expected because of convection. Thus, warmer air is provided as input at the top, and the refrigeration unit 2014 discharges cooled air for emission via outlets 2020 at the bottom of the thermal storage apparatus 500, 600. In an embodiment, two or more blowers 2016 provide directional circulation to direct the cooler air from the refrigeration unit 2014 into duct 2022, out the top inlets 2024 and into one or more thermal zones 502 of the thermal storage apparatus 500, 600. The blowers 2016 also provide directional circulation to direct the warmer air from the thermal storage apparatus 500, 600 out the bottom outlets 2020, into duct 2018 and into the refrigeration unit 2014 for cooling.

Ambient or room temperature may be similarly maintained by receiving ambient room air via an air filter 2026 and transferring the filtered air into a blower 2016, which then forces the filtered room air down into a thermal zone 502 of the thermal storage apparatus 500, 600 via top inlets 2030. The air within the thermal storage apparatus 500 may then be allowed to escape through bottom outlets 2034 of a duct 2032 that has an open exhaust such that the air is not recirculated. With this embodiment, maximum thermal efficiency in view of convection may be obtained if warm ingredients are loaded with magazines 104 positioned in top rows of the thermal storage apparatus 500, 600 while cold ingredients are loaded in bottom rows.

In an embodiment, more than one hot temperature and more than one cold temperature may be maintained in various thermal zones 502. Moreover, in another embodiment, methods of predictive heating, cooling, and temperature maintenance may be implemented. For example, the thermal control system and apparatus 2000 may follow a plan, under program control, for applying temperature over time.

2.2 Ingredient Storage

Figure 7A:
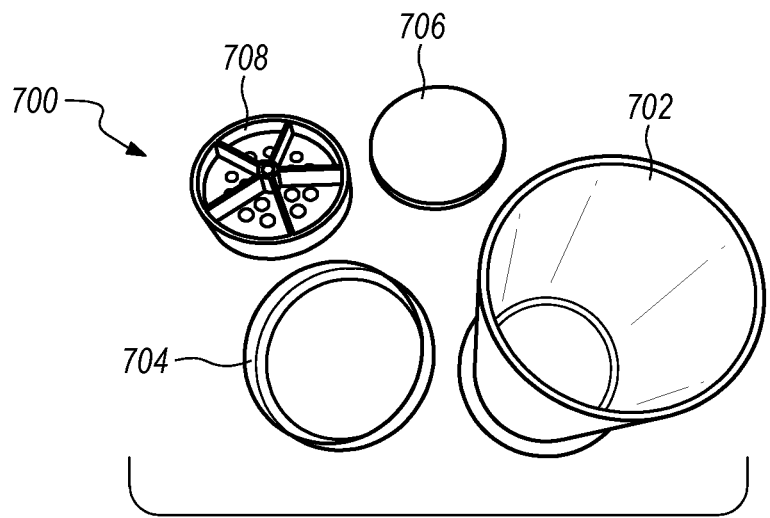
FIG. 7A is a top plan view of canister components, in one embodiment.

FIG. 7A is a top plan view of canister component(s) 700, in one embodiment. In the example of FIG. 7A, a canister comprises a generally cylindrical canister body 702 having an upstanding circumferential lip around a first or distal end of the body 702. The distal end of the canister comprises a movable plunger 706 that is generally circular and fitted within an interior of the canister body and held tightly but movably in position via a second seal. The plunger 706 may be made of a material that ensures food safety, such as a polycarbonate or silicone. Food ingredients may occupy an interior space of the body 702, but for clarity no such ingredients are shown in FIG. 7A. A proximal end of the body 702 is closed via a retaining ring 704 and lid 708, which is sealed via a first seal. The lid 708 may have a plastic substrate featuring ridges extending radially outward for rigidity and stability. The example of FIG. 7A illustrates five ridges extending radially from the center of the lid, but any number of ridges may be used.

Figure 7B:
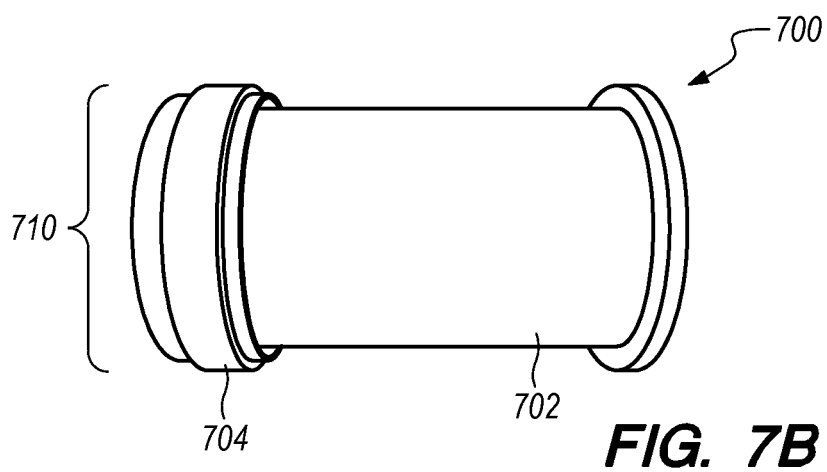
FIG. 7B is a side view of an assembled canister, in one embodiment.

FIG. 7B is a side view of canister component(s) 700, in one embodiment. Specifically, an assembled canister 710 is illustrated with the retaining ring 704 and canister body 702 visible. Canister(s) 710 serve as a base storage unit for all ingredients whether hot, cold, or room temperature. In an embodiment, canisters 710 are filled at a commissary, placed into magazines 104, refrigerated using a mobile thermal storage apparatus 816, transported to a store, cooked and heated by the thermal storage apparatus, if necessary, before being placed into the storage rack 102. Transport, heating, and/or refrigeration may occur while canisters 710 are stored in magazines 104.

During food dispensing from the canister 710, a lid 708 is removed from a canister via pneumatic grippers of a de-lidding arm on an IDM 116, using the retaining ring 704 and lid 708 as an attachment interface. The plunger 706 of a canister 710 is then pushed through the canister body 702 to dispense food out of the far side of the canister 710, after which the plunger 706 is sitting approximately where the lid was before dispensing. In an embodiment, the lid 708 is retained for subsequent resealing to maintain cleanliness.

Figure 7C:
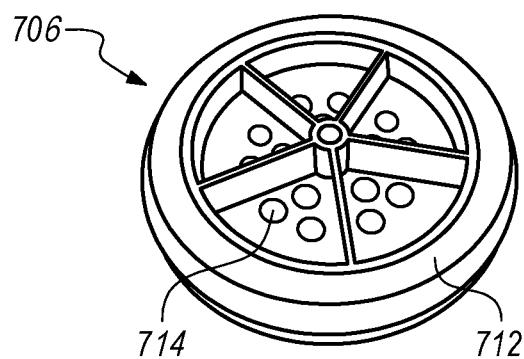
FIG. 7C is a side perspective view of a canister plunger, in one embodiment.

FIG. 7C is a perspective view of a canister plunger 706 with a seal 712 and a substrate 714, in one embodiment. The perspective view of FIG. 7C is a view of the opposite side of the plunger 706 of FIG. 7A. The plunger 706 may have a plastic substrate 714 featuring ridges extending radially outward for rigidity and stability. The example of FIG. 7C illustrates five ridges extending radially from the center of the plunger, but any number of ridges may be used. The plunger 706 may also feature holes through which the seal 712 is physically compressed such that removal of the seal 12 from the plunger is prevented. The seal(s) 712 may be a thermoplastic polyurethane or silicone that is chemically or mechanically bonded to the substrate 714, for example.

With the arrangement above, in operation, the lid 708 may be removed automatically by machine under program control, followed by actuating the plunger 706 linearly through the canister body 702, with the effect of pushing ingredients from within the canister body 702 outward and onto or into a bowl, plate, or another meal receptacle. Seals 712 may be over-molded into rigid plastic lids and plungers 706. Canister body 702 may be anodized aluminum in one embodiment, which has the benefit of improving heat transfer and reduces weight. Other embodiments may use other metals such as stainless or non-stainless steel, other alloys, or plastics. Canisters 710 are typically made and supplied in large quantities. For example, to run the automatic food assembly apparatus 100, 200, 300, 400 herein at maximum throughput for one hour, approximately 5,000 canisters 710 may be needed, depending on recipe requirements.

Figure 26:
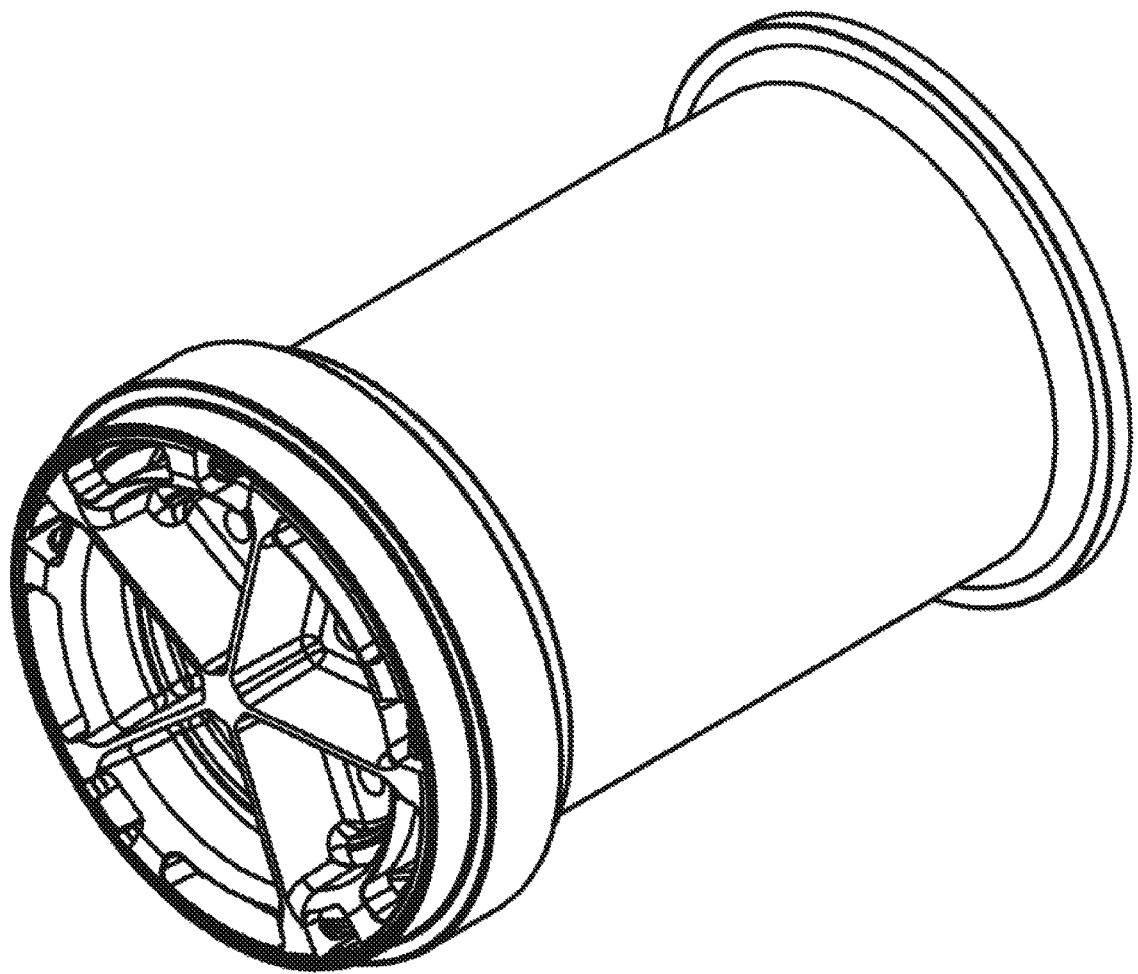
FIG. 26 is a perspective view of the ornamental design of a canister, in one embodiment.
Figure 27:
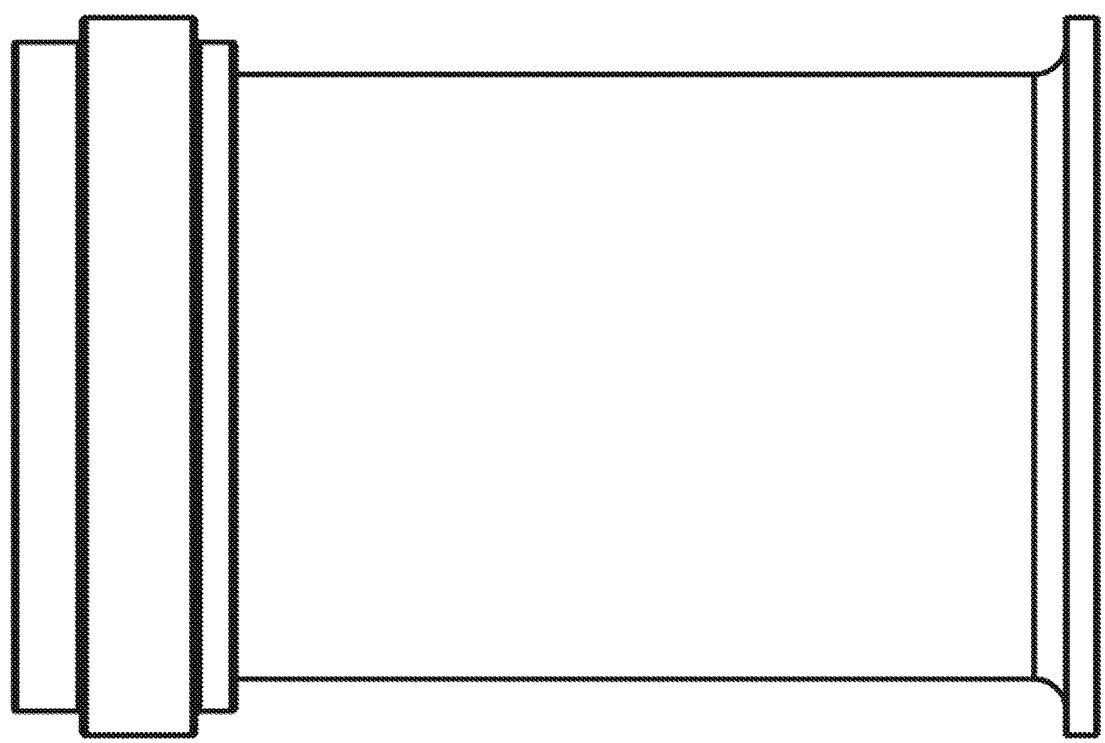
FIG. 27 is a first side elevation view of the canister of FIG. 26.
Figure 28:
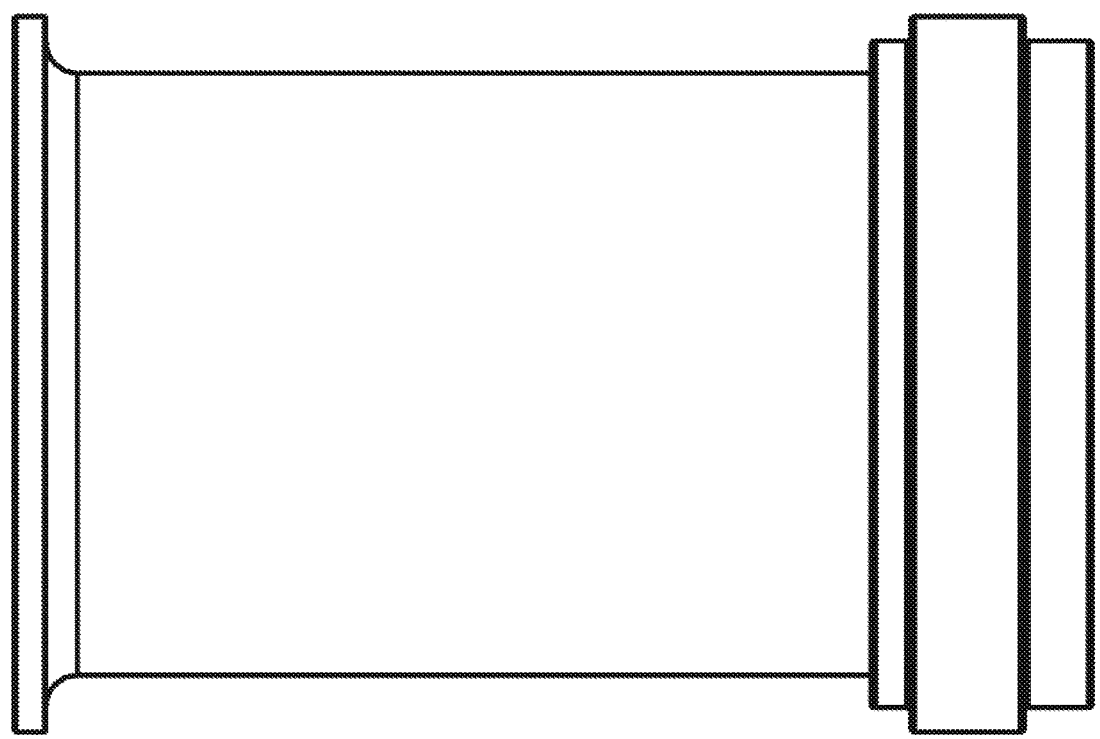
FIG. 28 is a second side elevation view of the canister of FIG. 26.
Figure 29:
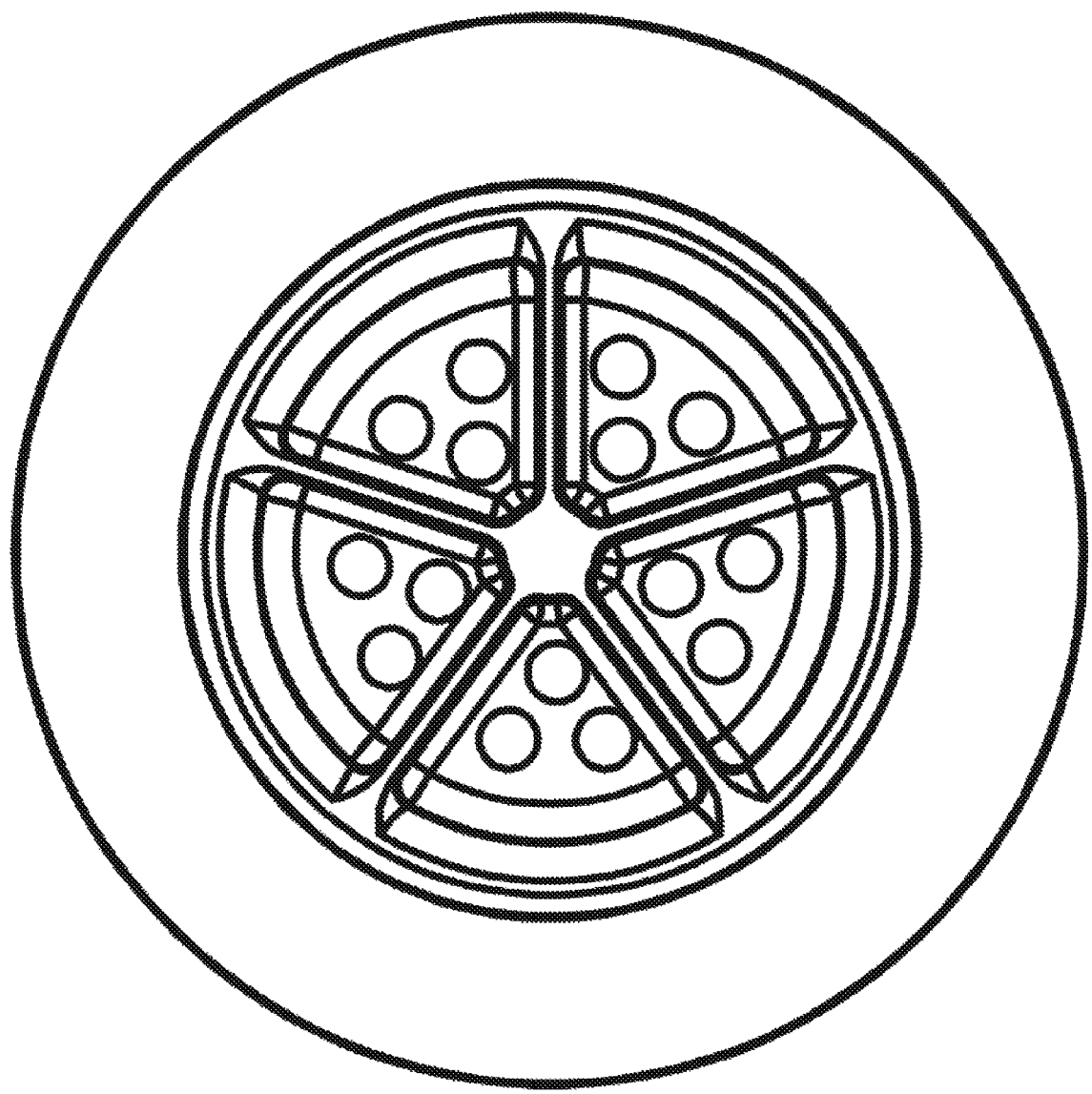
FIG. 29 is a first end elevation view of the canister of FIG. 26.
Figure 30:
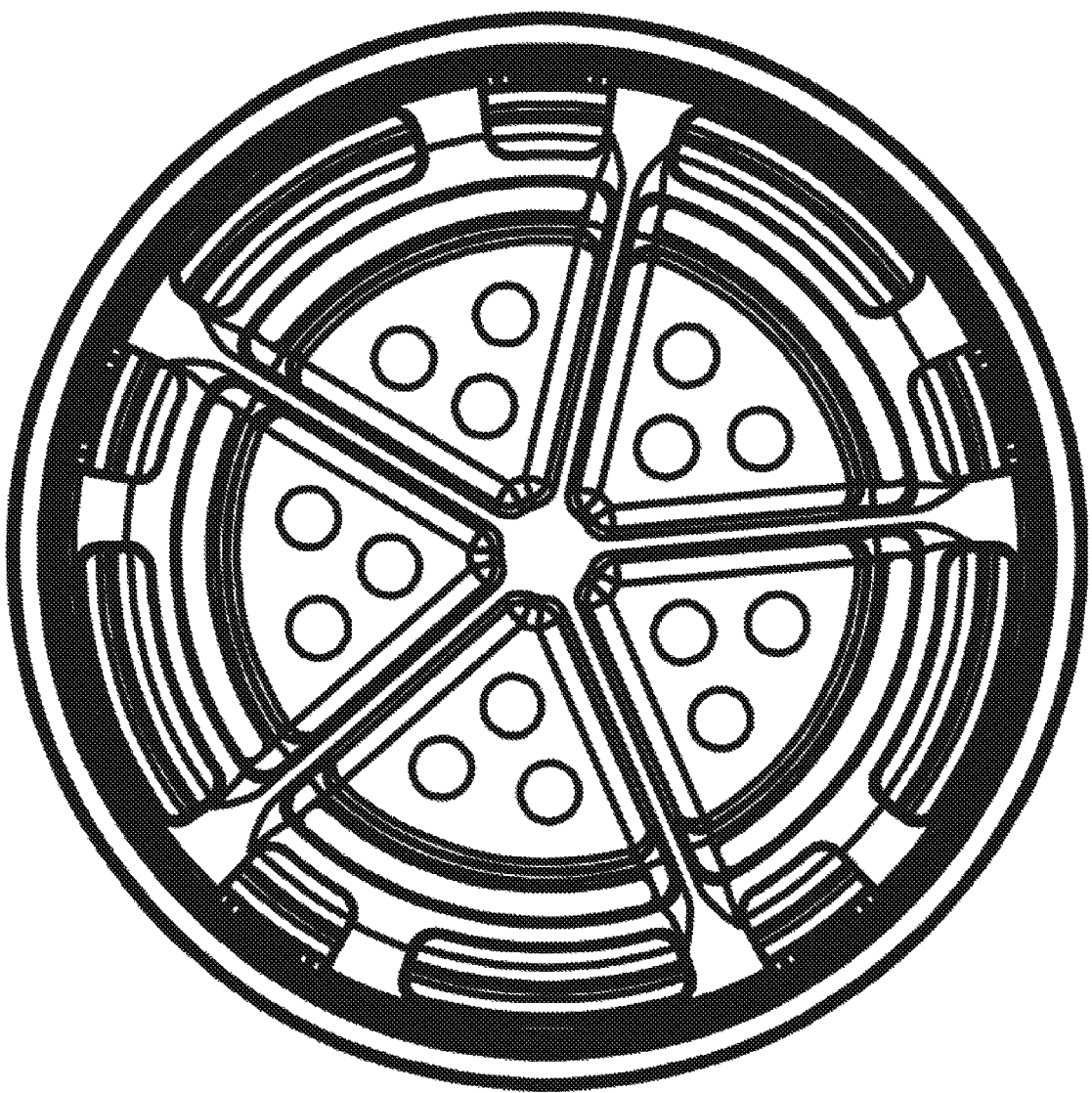
FIG. 30 is a second end elevation view of the canister of FIG. 26.

In an embodiment, a canister may feature an ornamental design. FIG. 26 is a perspective view of the ornamental design of a canister, in one embodiment. FIG. 27 is a first side elevation view of the canister of FIG. 26. FIG. 28 is a second side elevation view of the canister of FIG. 26. FIG. 29 is a first end elevation view of the canister of FIG. 26. FIG. 30 is a second end elevation view of the canister of FIG. 26.

Figure 8A:
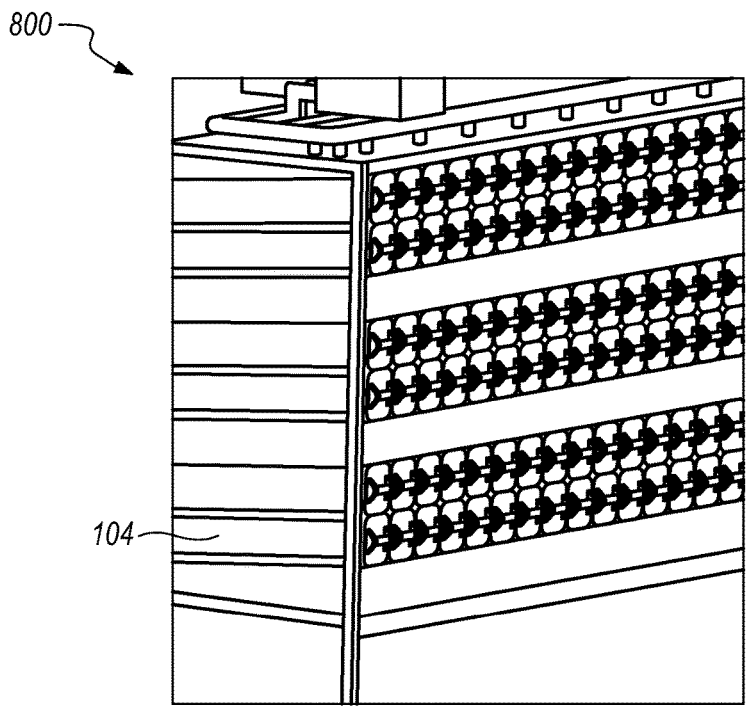
FIG. 8A is a side perspective view a portion of the thermal storage apparatus of FIG. 5 and FIG. 6, showing example magazines features, in one embodiment.
Figure 8B:
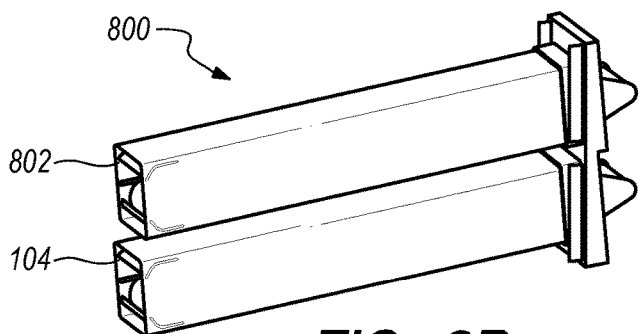
FIG. 8B is a perspective side view of magazine features compatible with the thermal storage apparatus of FIG. 8A.
Figure 8C:
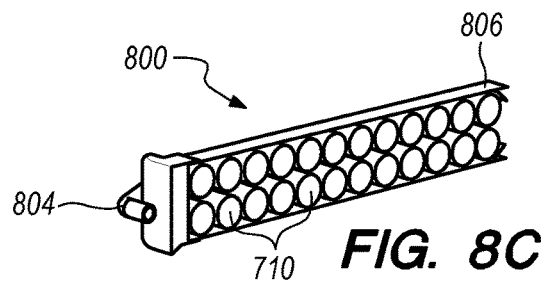
FIG. 8C is a perspective section view of the magazine features of FIG. 8A and FIG. 8B, showing a plurality of canisters of FIG. 7A, FIG. 7B, FIG. 7C.

FIG. 8A is a side elevation view of magazine features 800 of a magazine 104 in the thermal storage apparatus 500, 600 of FIG. 5 and FIG. 6, in one embodiment. FIG. 8B is a side elevation view of magazine features 800 of the magazine 104 of FIG. 8A. FIG. 8C is a sectional view of the magazine features 800 of the magazine 104 of FIG. 8A and FIG. 8B, featuring the canister 710 of FIG. 7B. Magazines 104 hold ingredients in canisters 710 from the commissary, through transport, during reheating if needed, and are used to insert canisters 710 into the thermal storage apparatus 500, 600.

Referring first to FIG. 8A, in an embodiment, each magazine 104 is inserted into the thermal storage apparatus 500, 600 manually by an operator. In an embodiment, magazines 104, 800 are inserted into bays of the thermal storage apparatus 500, 600 and locked into place. The thermal storage apparatus 500, 600 is configured to store the magazines 104 at an angle such that canisters 710 in the magazines 104 roll toward a distal end of the magazine 104. Gaskets seal thermal zones 502 against loss of hot or cold air.

As seen in FIG. 8B, each magazine 104 comprises an elongated square cylinder, which may be formed of metals, plastics or other materials. In one approach, aluminum is used with sheet, extruded, or cast fabrication. A material with good thermal conductivity and mechanical rigidity is suggested. Spring-loaded doors 802 in the rear or distal end of each magazine 104 are retracted to release canisters 710, and re-lock when a magazine 710 is removed, allowing removal of up to most canisters. Removal of a magazine 104 may occur when a magazine is empty or at another convenient time, such as during a switch from breakfast to lunch service, for example. The proximal ends of a pair of magazines 104 may be affixed to a face plate 804 having one or more handles, as seen at the right side of FIG. 8B and the left side of FIG. 8C. In some embodiments, paired magazines as seen in FIG. 8B carry identical ingredients in all cylinders of both magazines to facilitate hot swapping.

As seen in FIG. 8C, a plurality of canisters 710 is carried in each of the magazines 104 and retained in place via passive spring-loaded doors 802 at distal ends of the magazines, as also seen in FIG. 8B. In an embodiment, any number of canisters 710, such as the 24 canisters 710 featured in FIG. 8C, may be loaded perpendicularly within an interior space of each magazine 104. Any number of canisters 710 may be used subject to weight goals including the weight of the magazine 104, if manual movement of magazines is needed. The front plate or panel 804 of the magazine 104 may be insulated and comprise a handle and sealing gasket. The use of insulation in or with the front plate or front panel contributes to thermal stability of the magazine 104 and promotes operator safety to prevent operator hands from gripping hot or cold magazines.

FIG. 8C suggests a linear dimension of 34 inches for a magazine 104 but this dimension represents one example and other embodiments may use other dimensions. Further, while certain embodiments use three row pairs or six rows of ingredients, 20 columns wide, thus supporting 60 discrete ingredients, the number of columns or rows could be altered in other embodiments or to configure the thermal storage apparatus for a specific restaurant.

Canisters 710 are loaded in the magazine 104 in a single orientation to preserve the orientation from magazine 104, 800, canister ejector 402, and IDM 116. Magazines 104 may be keyed to prevent insertion upside down.

Figure 8D:
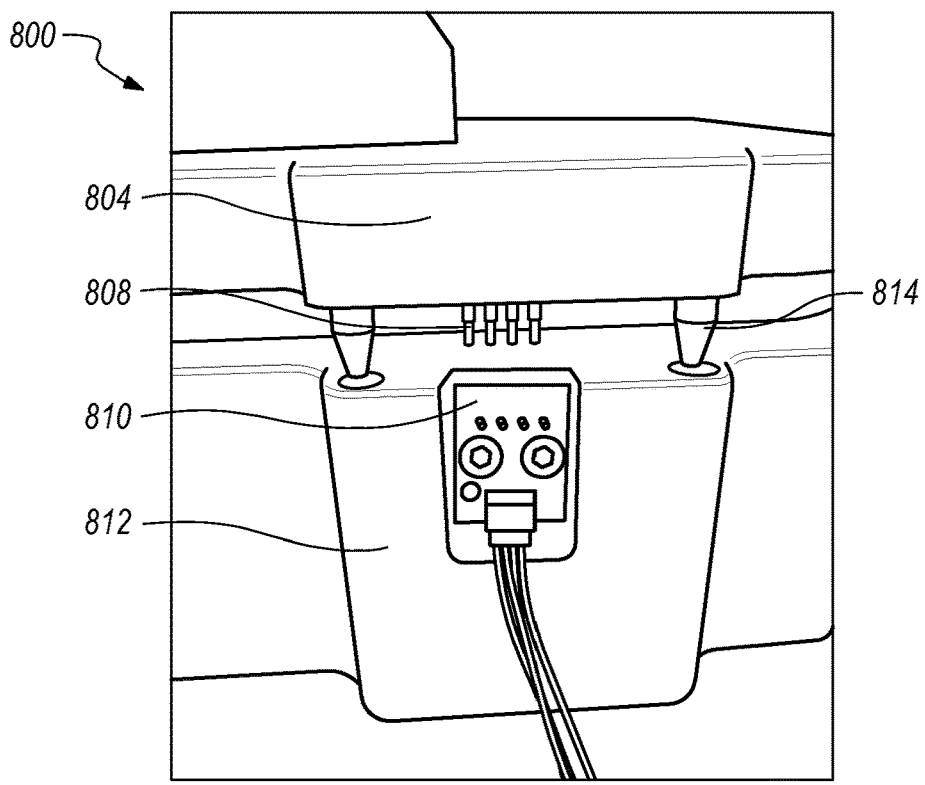
FIG. 8D is a side perspective view of magazine features compatible with the thermal storage apparatus of FIG. 8A.

FIG. 8D illustrates additional magazine features 800, in one embodiment. The magazine may feature a magazine faceplate 804 with an identity (ID) printed circuit board (PCB) and pogo pins 808 that correspond to an ID reader PCB 810 on a thermal control bay face 812. Other embodiments may use other communication technologies such as RFID. The ID may correspond to certain ingredients and be used to identify and track the quantity, location, and temperature of the ingredients in real time such that a time-stamped record may be kept for the life of the ingredient. The faceplate 804 may also feature datuming pins 814 that correspond to the bay face 812 for mechanical alignment. The magazine 104, 800 may also feature a latch or other locking mechanism for locking the magazine to the thermal control bay and forces the electrical connection between the ID PCB and pogo pins 808 and the corresponding ID reader PCB 810. The latch may be held in place by a solenoid pin to ensure that operators cannot open a bay filled with steam and/or hot air.

Figure 8E:
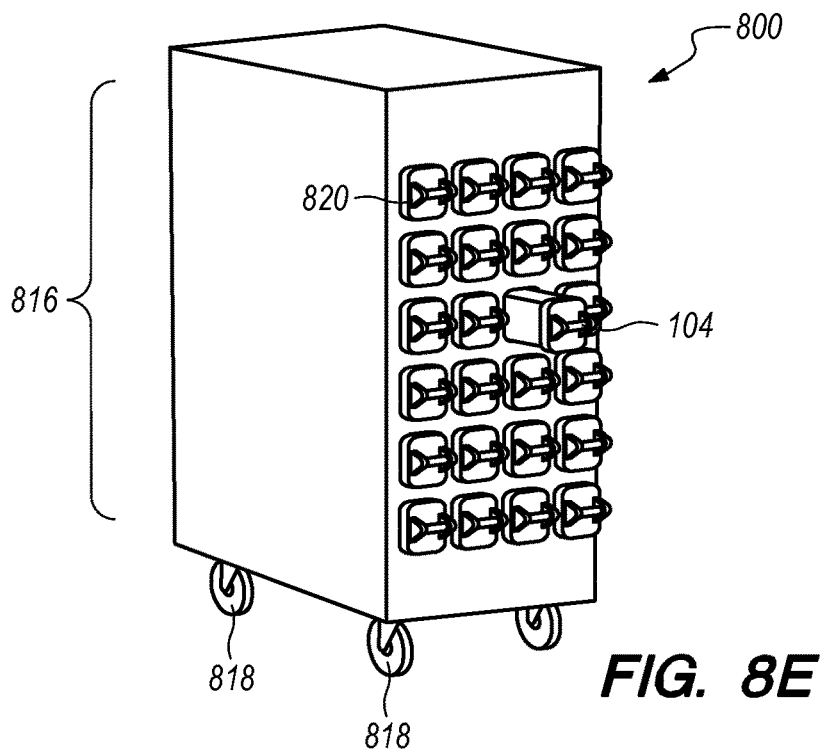
FIG. 8E is a side perspective view of magazine features, including a mobile thermal storage apparatus, in one embodiment.
Figure 8F:
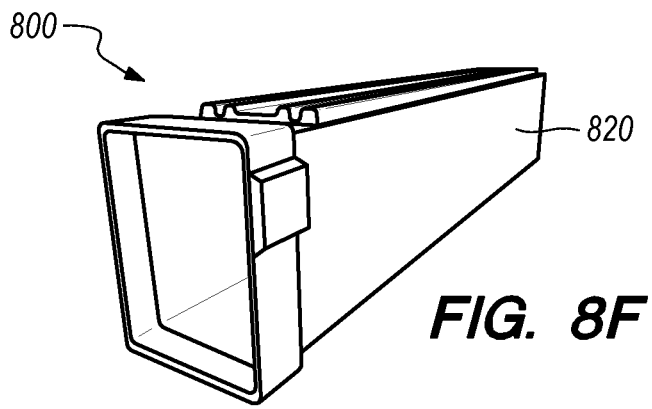
FIG. 8F is a side perspective view of a thermal storage bay with magazine compatible with the mobile thermal storage apparatus of FIG. 8E, in one embodiment.
Figure 8G:
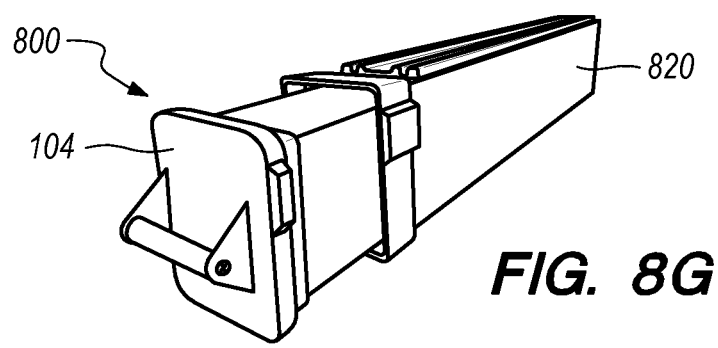
FIG. 8G is a side perspective view of a thermal storage bay with a magazine and a thermal control bay compatible with the mobile thermal storage apparatus of FIG. 8A and FIG. 8E, in one embodiment.

FIG. 8E, FIG. 8F, and FIG. 8G illustrate additional magazine features 800, in an embodiment. Specifically, FIG. 8E is a side perspective view of a mobile thermal storage apparatus 816, in one embodiment. This thermal storage apparatus may use casters 818, wheels, or any other transportation mechanism for mobility. In an embodiment, canisters 710 are filled at a commissary, stored in magazines 104, and placed into mobile thermal storage apparatus(es) 816 for transportation and delivery to store locations. The apparatus 816 of FIG. 8E may be designed with a plug designed to transfer power, data, heat, and/or coolant into the storage rack 102 using one or more connections. Thus, the mobile thermal storage apparatus 816 may be plugged in and monitored without traditional refrigeration. Each magazine 104 may be stored in a thermal control bay 820 featuring an indicator light emitting diode (LED) that indicates the status of the thermal control bay. The color of the LED may direct operators to unload or load magazines 104 into specific bays 820. The apparatus of FIG. 8E is illustrated with 24 bays 820, but any number of bays 820 may be used.

FIG. 8F is a side perspective view of a thermal control bay 820 compatible with the apparatus of FIG. 8E, in one embodiment. Each magazine 104 may be placed in a thermal control bay 820 for temperature control in the mobile thermal storage apparatus 816 during transportation and for storage in the stationary thermal storage apparatus 500, 600 prior to dispensing. In an embodiment, the thermal control bay 820 may be insulated to maintain ingredient temperatures.

FIG. 8G is a side perspective view of a magazine features, including a magazine 104 and a thermal control bay 820 compatible with the apparatus of FIG. 8A and FIG. 8E, in one embodiment. The magazine slides into the thermal control bay 820 such that the ID PCB and pogo pins 808 of the magazine faceplate 804 align and interface with the ID reader PCB 810 of the thermal control bay face 812.

Each thermal storage apparatus 816, 500, 600 may be configured or programmed to cook food in canisters under the control of logistics software. Specifically, data parameters on the amount of time it takes to cook certain ingredients, the temperatures at which certain ingredients should be cooked at, and the speed at which ingredients are being used in each store may be stored in a database. Logistics software may track each of these data parameters and dynamically initiate the cooking process for specific types of ingredients within the thermal storage apparatus 816, 500, 600 in order to accommodate demand for cooked ingredients. For example, the thermal storage apparatus 816, 500, 600 may be configured to automatically change the temperature set point of any bay from refrigeration to cooking and maintain the cooking temperature for the designated amount of time it takes to cook a certain ingredient. After an ingredient is cooked, the thermal storage apparatus 816, 500, 600 may be configured to automatically adjust the temperature down and maintain a heated temperature state until use. This technique eliminates the need for human monitoring, decision making, preparing and cooking at each store. This technique also reduces waste by preventing unintentional overcooking of certain ingredients.

Each thermal storage apparatus 816, 500, 600, whether mobile or stationary, may be outfitted with a thermal section heat exchanger with copper tubing and valves for regulating liquid control, as well as fans for air flow. In one embodiment, the copper tubing is formed in a zigzag but can be constructed in any other shape to regulate temperature. Each thermal section of the thermal storage apparatus 816, 500, 600 may be a hot, cold, or ambient temperature. To maintain cool temperatures, the exchanger may contain chilled glycol at 20 degrees Fahrenheit, for example. To maintain hot temperatures, the exchanger may contain heated steam at 230 degrees Fahrenheit, for example. Heated glycol may be used in other embodiments. The PCB may communicate with a master PCB that samples the temperature in real time using sensors and communicates with a central server. The master PCB may also regulate temperature at a rack level by adjusting valves using proportional-integral-derivative (PID) control. Movable insulation walls may be placed internal to the thermal sections to divide the hot, cold, and ambient sections. The movability of the insulation walls allows for an adjustment in size as well as temperature depending on the ingredients stored.

2.3 Meal Assembly

Figure 9:
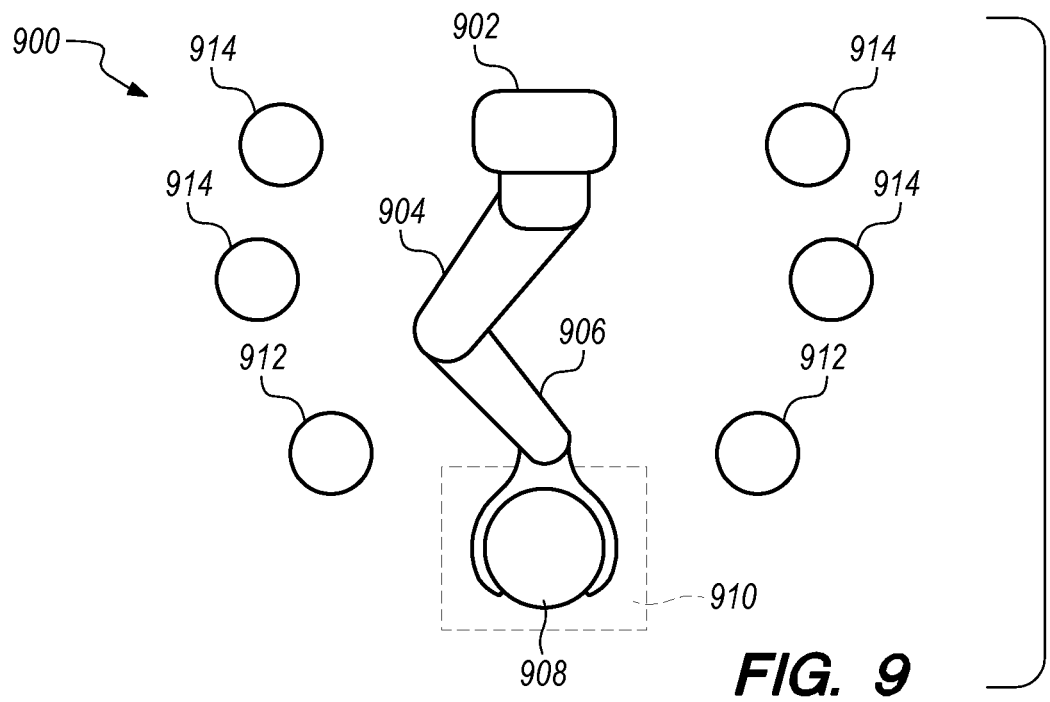
FIG. 9 is a top plan view of a bowl placement component, in one embodiment.

FIG. 9 is a top plan view of a bowl placement component 900, in one embodiment. In this embodiment, a bowl dispenser 110, 112 located at dispensing location 910 may dispense empty bowl(s) 908 to an end effector 906 of a robotic arm 904 that is attached to a base 902. The end effector 906 may move the empty bowl 908 to one of several bowl orientation platforms 914 at ingredient dispensing locations to be filled with food, as further described herein. Once the bowls 908 are filled, the end effector may move the filled bowls 908 to a bowl output pedestal 912. In one embodiment, four bowls 908 may be made in two parallel bowl lines, as depicted in FIG. 9.

Figure 10A:
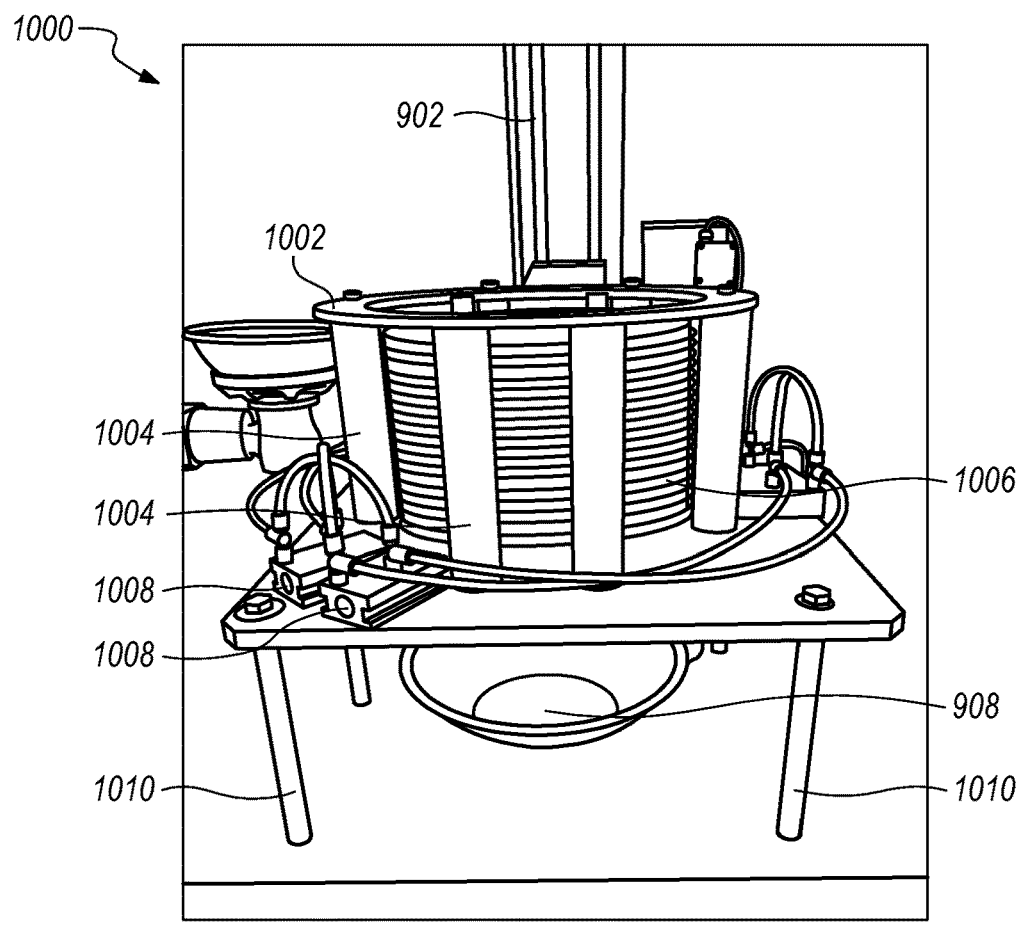
FIG. 10A is a side perspective view of a bowl dispenser, in one embodiment.

FIG. 10A is a side perspective view of a bowl dispenser 110, 112, 1000, in one embodiment. The bowl dispenser 110, 112, 1000 forms one sub-unit of the automatic food preparation apparatus 100, 200, 300, 400, and is seen at the right side of FIG. 1, FIG. 2, FIG. 3. In one embodiment, one or more bowl lines are provided as part of the automatic food preparation apparatus 100, 200, 300, 400. For example, FIG. 2 shows two bowl lines, each of which may be associated with one or more bowl dispensers 110, 112, 1000.

In general, a bowl 908 is metered and dispensed from a vertical stack 1006 into an end effector 906, which positions the bowl 908 underneath each IDM 116 for dispensing of ingredients. In an embodiment, a bowl dispenser 110, 112, 1000 may comprises a bowl dispensing tower 1002 comprised of a vertically elongated rectilinear or circular frame of metal members 1004 structured around the bowls 902. The frame of metal members 1004 serves to support a plurality of empty, clean bowls stacked in a vertical stack 1006 through the bowl dispensing tower 1002. The metal members 1004 may be of any length to accommodate any number of bowls in the vertical stack 1006. The bowl dispenser 110, 112, 1000 is operable under program control to dispense or drop a single empty bowl 908 at a time downwardly by gravity to the end effector 906. A bowl 908 having dropped from the vertical stack 1006 under machine control, is shown in FIG. 10A. The bowl dispenser 110, 112, 1000 may be supported by four or more vertical legs 1010 that suspend the bowl dispenser 110, 112, 1000 above a bowl dispensing location 910 such that an empty bowl 908 may drop downwardly by gravity or vacuum to the end effector 906.

Figure 10B:
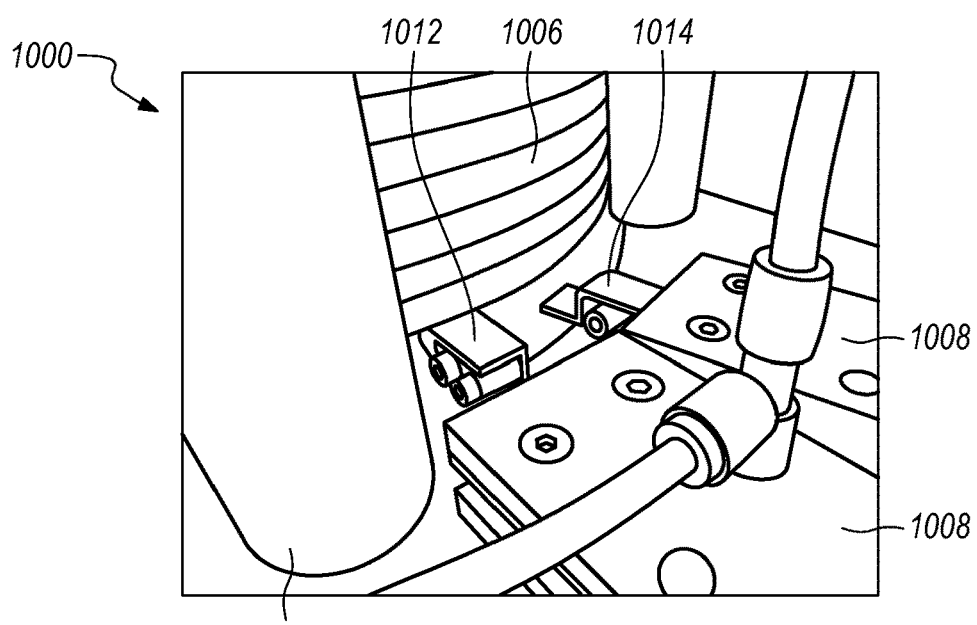
FIG. 10B is a side perspective view of a bowl dispenser, in one embodiment.

FIG. 10B is a side perspective view of a bowl dispenser 110, 112, 1000, in one embodiment. A support finger 1012 located towards the base of the vertical stack 1006 may be programmed to support the vertical stack 1006 while a singulator finger 1014 near the support finger 1012 may be programmed to separate a single clean bowl 908 from the remainder of the vertical stack 1006. The pitch of the singulator finger 1014 may be adjusted to ensure reliable singulation. The clean bowl 908 then drops down to the end effector 906 for placement at one of any of the bowl orientation platforms 914 to receive ingredients. The support finger 1012 and singulator finger 1014 may be pneumatically controlled. Infrared light-emitting diode (LED) light beams and corresponding IR detectors at a base of the tower 1002 may be used to detect that a bowl 908 has dropped under program control and is in position. Thus, the bowl dispenser 110, 112, 1000 may store a plurality of bowls and release a single bowl into the end effector 906 for placement and for filling with ingredients as further described in other sections. In an embodiment, about 250 bowls may be accommodated in the tower 1002 prior to dispensing, but bowl dispenser 110, 112, 1000 may be configured to hold any number of bowls.

Figure 11:
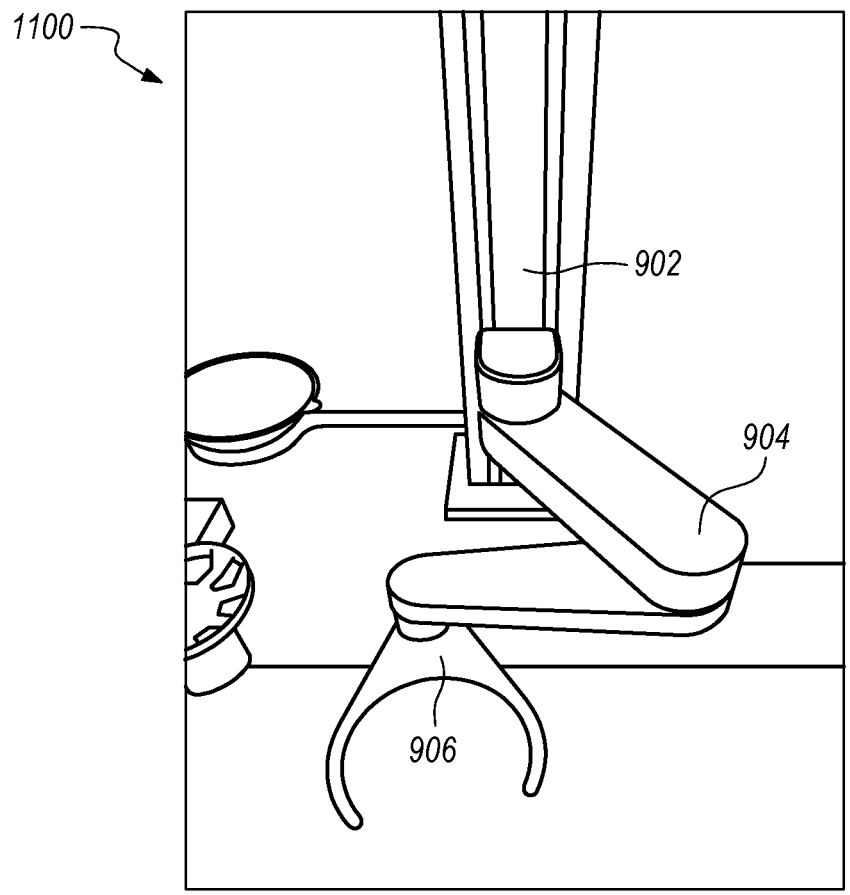
FIG. 11 is a front perspective view of a bowl placement component, in one embodiment.

FIG. 11 is a front perspective view of a bowl placement component 900, 1100, in one embodiment. The bowl placement component 900, 1100 may be a base 902 with an actuating arm 904, such as a Selective Compliance Articulated Robot Arm (SCARA) in an example embodiment. The actuating arm 904 may be configured to move an empty bowl 908 from a dispensing location 910 to a bowl orientation platform 914 for ingredient dispensing, and subsequently move the filled bowl 908 from the bowl orientation platform 914 to an output pedestal. To do so, the bowl placement component 900, 1100 may feature an end effector 906 custom tailored in size and shape to support the bowls 908. FIG. 11 illustrates a circular "C" shaped end effector 906 that corresponds to the circular shape of the bowls 908. In an embodiment, the end effector 906 is shaped such that it can move the bowl 908 using the lip of the bowl 906.

Figure 12:
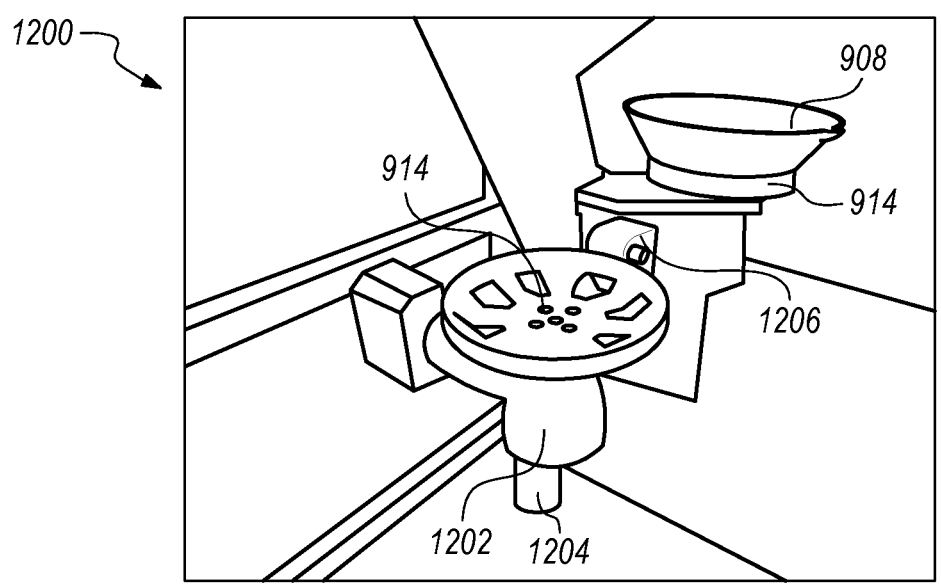
FIG. 12 is a perspective view of dispense points associated with the bowl placement component and the bowl dispenser of FIG. 9, FIG. 10A, FIG. 10B, in one embodiment.

FIG. 12 is a perspective view of dispense point(s) 1200 associated with the bowl placement component 900, 1100 and the bowl dispenser 110, 112, 1000 of FIG. 1, FIG. 9, FIG. 10A, FIG. 10B, in one embodiment. The end effector 906 may place an empty bowl 908 at a dispense point 1200 below an IDM 116 where a rotary bowl orientation platform 914, controlled by an actuator 1202 and pneumatic lift 1204, may allow for rotating and elevating the bowl 908, respectively, as further described herein. The dispense point 1200 may also feature a bowl presence sensor 1206 to detect whether a bowl has been placed on the bowl orientation platform 914 properly.

Figure 13A:
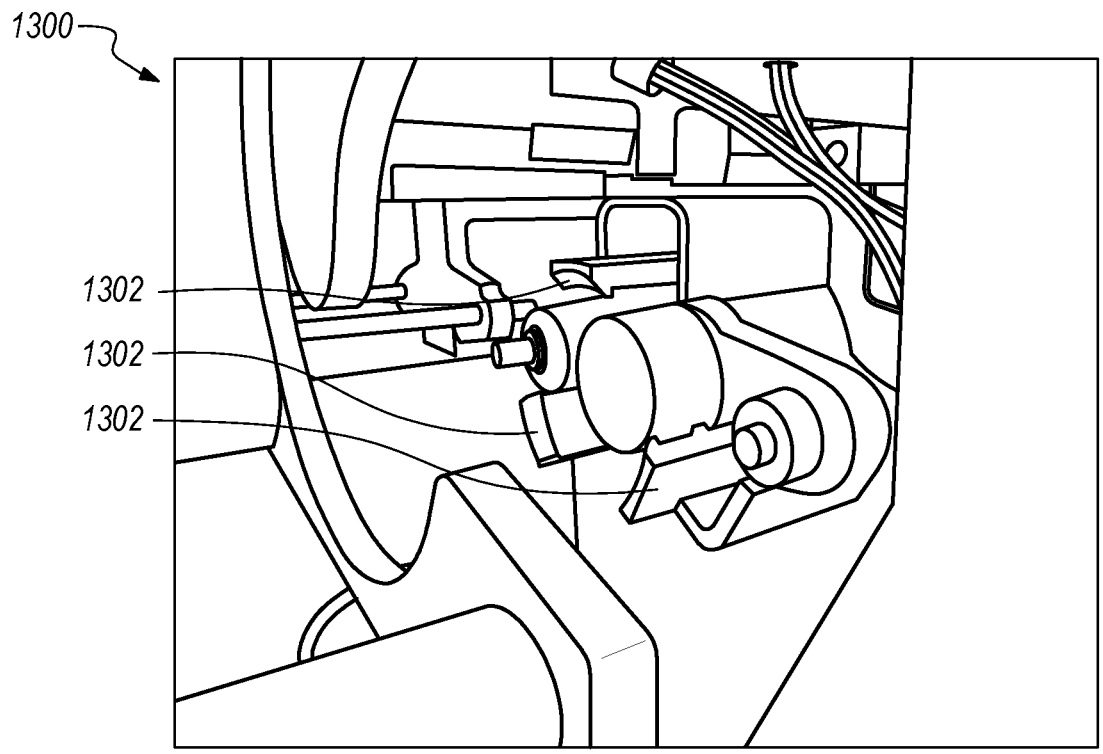
FIG. 13A is a perspective view of a canister processing and food dispensing apparatus, in one embodiment.
Figure 13B:
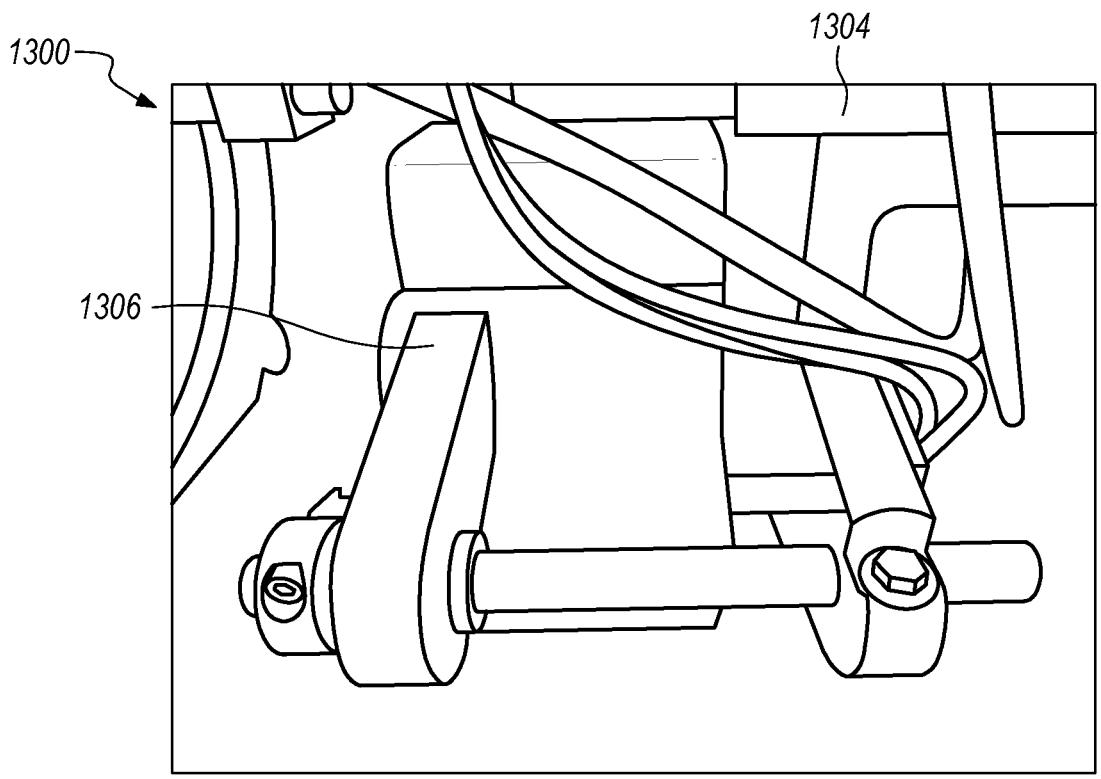
FIG. 13B is a perspective view of a canister processing and food dispensing apparatus, in one embodiment.
Figure 13C:
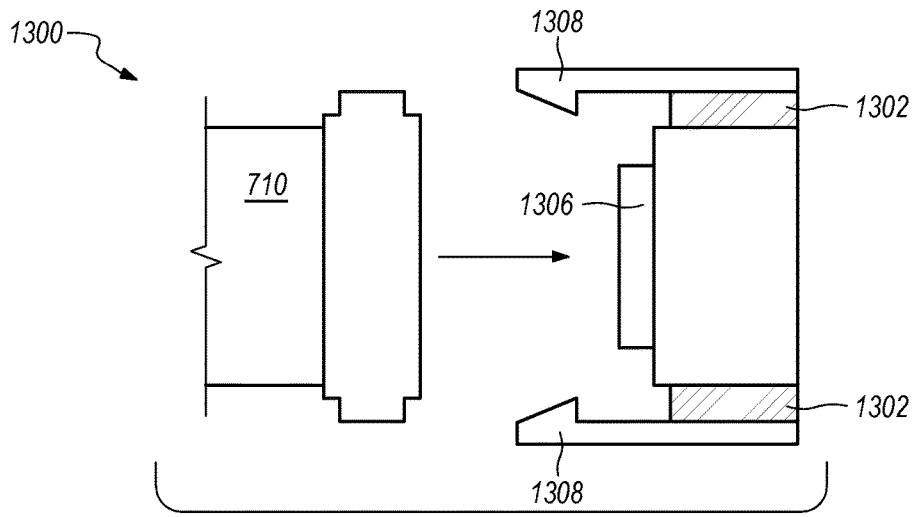
FIG. 13C is a side view of a canister processing and food dispensing apparatus, in one embodiment.

Ingredients are subsequently dispensed from canisters 710 above the placed bowl 908 using a canister processing and IDM 1300, as shown in FIG. 13A, FIG. 13B, and FIG. 13C, in one embodiment. The apparatus 1300 of FIG. 13A, FIG. 13B, and FIG. 13C may comprise a compression pad 1306 surrounded by pneumatic grippers 1302 with interfacing fingers 1308 that latch on to the edge of the canister's retaining ring 704 and lid 708. The compression pad 1306 may be circular, with a circular clearance area between the pad 1306 and the interfacing fingers 1308, in an embodiment, so the retaining ring 704 and lid 708 may fit within the canister processing and food dispensing apparatus 1300 for removal. While the apparatus 1300 of FIG. 13A, FIG. 13B, and FIG. 13C features three pneumatic grippers 1302, any number of grippers 1302 may be used. The apparatus 1300 automatically removes the retaining ring 704 and lid 708 under program control to permit dispensing ingredients from the canister 710 to a plate or bowl 908. Specifically, the apparatus 1300 is attached to a linear pneumatic actuator that slides horizontally towards the canister lid 708. The apparatus 1300 may extend the grippers 1302 and interfacing fingers 1308 toward the canister 710 and latch the interfacing fingers 1308 onto the retaining ring 704 and lid 708. The pneumatic slide may then retract to remove the retaining ring 704 and lid 708.

Subsequently, the plunger 706 may be activated by an actuator in the IDM 116 to push the contents of the canister 710 out and into the bowl 908. In various embodiments, the actuator may comprise a horizontal plunger actuator, a pneumatic actuator, a linear motor or other mechanism. In an embodiment, after dispensing the contents of the canister 710, the pneumatic slide may extend toward the canisters and place the lid 708 and/or retaining ring 704 back onto the empty canister 710. During this process, the compression pad 1306 may push the lid back in place before the grippers 1302 place the retaining ring 704 back on and retract. Placing the lid 708 back on allows for maintaining the cleanliness of the system and maintaining the stability and integrity of the canisters 710 to extend the life of their use.

There may be a plurality of discrete dispensing operations. For example, separate dispensing operations may dispense or deposit into the bowl: quinoa, vegetables, a protein and sauces or toppings. After each discrete dispensing operation, optionally under program control and according to a recipe, the bowl orientation platform 914 upon which the bowl 908 sits may actuate to cause the bowl 908 to translate in one, two, or three dimensions with respect to the IDM 116, while the IDM 116 remains fixed and dispensing points 1200 remain fixed. In an embodiment, the actuator 1202 may move the bowl 908 around the x-, y-, and/or z-axis during dispensing such that different ingredients are dispensed in different locations and angles in the bowl 908. The lift 1204 may lift the bowl orientation platform 914 along the z-axis to bring the bowl 908 closer to or further away from the IDM 116, in an embodiment.

Therefore, the bowl orientation platform 914 can cause the bowl 908 to move to different positions and angles to permit depositing different ingredients in different relative locations and angles around the bowl 908, which permits creating a bowl or plate of ingredients that is aesthetically attractive and functionally useful. For example, vegetables and proteins can be deposited on opposite sides of the bowl, and a sauce can be placed atop only one or the other. In this manner, compatible or related ingredients may be dispensed close to one another, and ingredients that are supposed to be separate, based on the recipe, are kept apart.

Figure 14A:
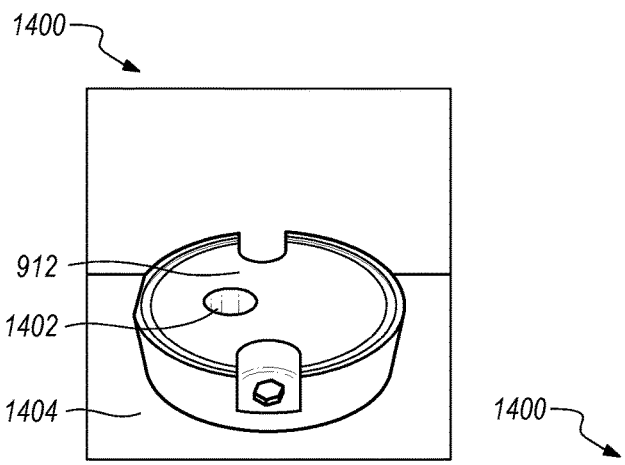
FIG. 14A is a side perspective view of a bowl pedestal, in one embodiment.
Figure 14B:
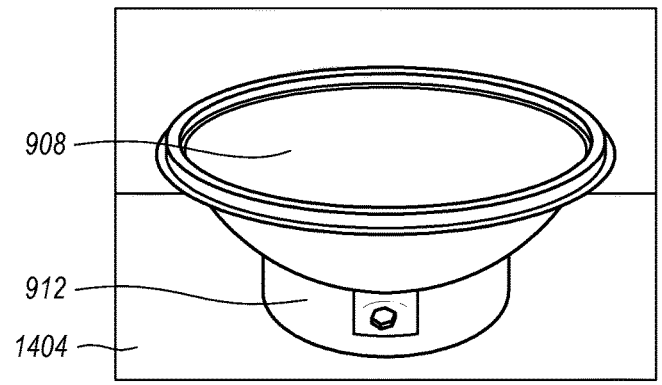
FIG. 14B is a side perspective view of a bowl on a bowl pedestal, in one embodiment.

FIG. 14A is a side perspective view of a bowl pedestal 912, in one embodiment. Once a bowl 908 is filled with ingredients, the bowl placement component 900, 1100 of FIG. 9 and FIG. 11 may move the filled bowl 908 to a bowl pedestal 912 located on an operator workspace 1404. FIG. 14B is a side perspective view of a bowl 908 on a bowl pedestal 912, in one embodiment. The bowl pedestal 912 may feature a bowl presence sensor 1402 to detect whether the bowl 908 has been placed on the pedestal 912 properly and/or if the bowl has been removed by an operator. An operator may make any additional adjustments to the food bowl by hand. Alternatively, operator workspace 1404 may include a bowl inspection sensor and adjustment component that automatically makes additional adjustments to the food bowl. The bowl inspection sensor and adjustment component may be implemented prior to being placed on bowl pedestal 912.

FIG. 15 is a perspective view of a stationary thermal storage apparatus 500, 600, otherwise referred to as the storage rack 102, with a canister transport mechanism 1500, or sequencer 404, in one embodiment. The view of FIG. 15 represents the opposite side of the thermal storage apparatus 500, 600 of FIG. 1, as compared to FIG. 2. Thus, taken together FIG. 2 and FIG. 15 show both sides of the apparatus of FIG. 1, in an embodiment. The sequencer 404, 1500 is responsible, under program control, for selecting canisters 710 and delivering a sequence of canisters 710 to the IDM 116, in an order that may be based at least in part upon a recipe. The sequencer 404, 1500 transfers canisters 710 from storage to the bowl line for dispensing. Canisters 710 are transferred under program control in the correct succession for dispensing into a bowl 908 before they reach the bowl line, in part based upon a recipe or instructions specifying ingredient order.

The sequencer 404, 1500 comprises an electromechanical apparatus, operable under program control, that is structured to release a single canister 710 from a magazine 104 to transport the canister 710 linearly along the thermal storage apparatus 500, 600 to the IDM 116. In an embodiment, a sequencer 404, 1500 is mounted to the thermal storage apparatus 500, 600 in a position adjacent one end of each of the magazines 104. The magazines 104 are mounted at an angle in the thermal storage apparatus 500, 600 to facilitate dispensing canisters by gravity.

In an embodiment, as indicated by reference numeral 1 in FIG. 15, at step 1502, under program control, the spring-loaded doors 802 of a magazine 104 is individually actuated to open and close the doors 802 in response to loading or unloading of the magazine. In an embodiment, canister ejector(s) 402 are individually actuated and control an entire row of canisters, to eject one canister at a time out of the row onto the belt, thereby causing a single canister 710 to roll downwardly rearwardly out of the magazine 104. At step 1504 (reference numeral 2), the canister 710 drops to horizontal belt(s) 1506 corresponding to a row pair of magazines 104, as further described herein. In the example of FIG. 15, there are three horizontal belts 1506, each corresponding to each of the three rows of sequencers; however, any number of horizontal belts 1506 corresponding to any number of rows of sequencers may be implemented.

At step 1508, or reference numeral 3, under program control, the appropriate horizontal belt 1506 moves continuously to cause linearly transporting the canister to an end of the thermal storage apparatus 500, 600 and into contact with a kicker which stops the canister and pushes the canister into a bucket of continuously moving vertical elevator belt(s) 1510. Upon entering the bucket, the canister is lifted automatically by the elevator belt 1510 upward and inward to fall into the IDM 116, as further described herein. In an embodiment, the sequencer 404, 1500 may feature two vertical belts 1510, one for each bowl line, as depicted in FIG. 15. However, any number of vertical belts 1510 may be used.

In an embodiment, the horizontal belts 1506 move continuously at approximately 3 feet/second. Closed-loop control with feedback may be used to pace introduction of canisters 710 to the horizontal belts 1506, and to time transfer between horizontal and vertical belts. For a throughput of 700 bowls per hour, about 7% of the horizontal belt 1506 will hold a canister 710 filled with an ingredient in any given time for the embodiment of FIG. 1. Therefore, higher throughput can be achieved without different belts or sequencer design.

When canisters 710 are placed on the vertical belt 1510 for a bowl line, they must be in the correct sequence for dispensing into a bowl 908, accounting for bias of each horizontal belt 1506. Bias, in this context, means that if two horizontal belts 1506 transfer two different canisters 710 to the same vertical belt 1510 at the same time, the canister 710 from the horizontal belt 1506 that is physically higher in the thermal storage apparatus 500, 600 will end up earlier in the sequence compared to the one below. Therefore, program instructions specify which ingredient is located physically and how it relates to a received order for a bowl.

FIG. 16A is a perspective view of the canister transport mechanism components 1600, or sequencer components, in one embodiment. FIG. 16B is a side view of canister transport mechanism components 1600, in one embodiment, including the sequencer(s) 404, 1500 and a canister 710. When a canister 710 is selected by the canister ejector(s) 402, the canister 710 rolls out of a magazine 104 and drops to the base or distal end of the canister ejector(s) 402, where spring-loaded doors 1612 and a pusher block 1610 are situated to momentarily stop the canister from hitting the horizontal belt 1506, 1606. The canister ejector(s) 402 may be physically spaced apart such that the placement of the canister 710 on the horizontal belt 1506, 1606 may be measured and tracked. The pusher block 1610 may push on the spring-loaded doors 1612 and extend the springs 1604 such that the doors 1612 open and the canister 710 drops out of the canister ejector(s) 402 and onto the horizontal belt 1506, 1606 with minimal impact. The pusher block 1610 may then retract, causing the springs 1604 to close the doors 1612 and prevent any additional canisters 710 from dropping out. Thus, the canister ejector(s) 402 may drop each canister 710 in sequence, under program control. The horizontal belt 1506, 1606 may be cleatless and may feature a guide rail 1608 that prevents the canister 710 from rolling off. The horizontal belt 1506, 1606 may then move the canister 710 toward the vertical belt 1510 for placement in the IDM 116.

FIG. 16C is a top view of canister transport mechanism components 1600, or sequencer and kicker components, in one embodiment. In an embodiment, sequencer 404, 1500 that features kicker(s) 1616, pusher block(s) 1620, and bucket(s) 1622 attached to the vertical belt 1510, 1624, all of which, under program control, move the canister 710 from the horizontal belt 1505, 1606 into the IDM 116.

The sequencer 404, 1500 may feature a series of presence sensors 1614 that register the presence of an incoming canisters 710, indicates that a canister 710 has arrived, and detects the proper orientation of the canister 710 to trigger the kicker 1616 and pusher blocks 1620. When a first presence sensor 1614 detects an incoming canister 710 moving along the horizontal belt 1506, 1606, it may trigger a first pneumatic slide that positions the kicker 1616 in place to stop the canister 710 from continuing its horizontal movement, even while the horizontal belt 1506, 1606 continues to move. A second presence sensor 1614 detects when the canister 710 has been stopped and if the stopped canister is properly orientated and activates a second pneumatic slide that moves the pusher block 1620 into the canister 710 using a single y-axis movement, thereby forcing the canister 710 into the bucket 1622. The push blocker 1620 constrains the orientation of the canister so that the canister 710 can only move towards the bucket 1622. A third presence sensor 1614 detects the positioning and orientation of the canister 710 within the bucket 1622.

FIG. 16D and FIG. 16E are front perspective views of canister transport mechanism components 1600, or sequencer components, such as the bucket 1622, in one embodiment. The bucket 1622 may comprise two curved flanges as the base to support the bottom of the canister 710 along both ends and prevent movement along a y-axis. The two curved flanges leave a medial gap where no bottom support for the canister exists. The bucket 1622 may also have guides 1626 near both ends of the canister 710 to prevent movement along an x-axis. Thus, bucket 1622 inhibits movement of the canister along an x-axis and a y-axis but allows movements along a z-axis using the vertical belt 1510, 1624. The vertical belt 1510, 1624 then moves the canister 710 upwards toward a canister guide and transfer lip that feeds the canister 710 into the IDM 116.

Figure 16F:
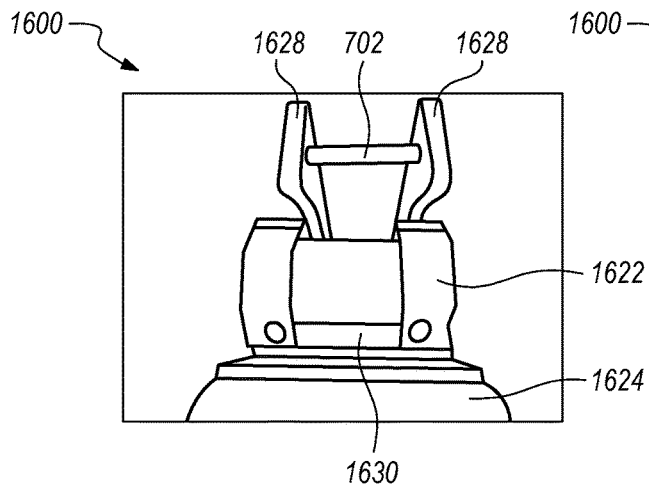
FIG. 16F is a bottom perspective view of the canister bucket of FIG. 16D, FIG. 16E and vertical can transfer apparatus, in one embodiment.
Figure 16G:
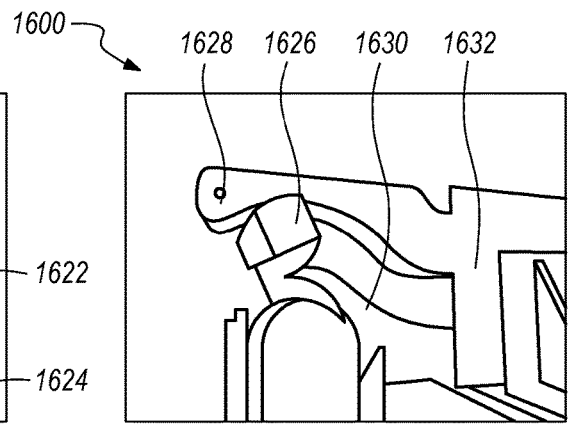
FIG. 16G is a side perspective view of the canister bucket apparatus of FIG. 16D, FIG. 16E, FIG. 16F and vertical canister transfer apparatus, in one embodiment.

FIG. 16F is a bottom perspective view of canister transport mechanism components 1600, or sequencer components, such as the bucket 1622 of FIG. 16D, FIG. 16E, in one embodiment. FIG. 16G is a side perspective view of canister transport mechanism components 1600, such as the bucket 1622 of FIG. 16D, FIG. 16E, FIG. 16F, in one embodiment. At this stage, the vertical belt 1510, 1624 has moved the bucket 1622 containing the canister 710 to curved guide(s) 1628 that directs the canister toward the IDM 116. In an embodiment, the curved guides 1628 comprise two prongs situated perpendicularly to the canister 710 in the bucket 710. Once the bucket 1622 reaches the top of the vertical belt 1510, 1624, the curvature of the belt 1510, 1624 loop rotates the bucket 1622 and situates the canister 710 between a set of curved guides 1628 above and a curved transfer lip 1630 below.

The curved guides 1628 provide a ceiling that directs the top of the canister 710 while the curved transfer lip 1630 provides a floor that directs the bottom of the canister 710. The transfer lip 1630 may have a width and height that fits within the medial gap between the two curved flanges of the bucket 1622. As the bucket 1622 rotates from a vertical position to a horizontal position, the transfer lip 1630 passes through the medial gap of the bucket to engage with the canister 710 and direct the canister's path. The canister then rolls between the curved guides 1628 and the curved transfer lip 1630 into the IDM 116 using gravity. The third presence sensor 1614 associated with the bucket 1622 may detect movement of the canister out of the bucket 1622. The top portion of the IDM 116 may feature walls 1632 that guide the canister 710 into an IDM opening.

Figure 17:
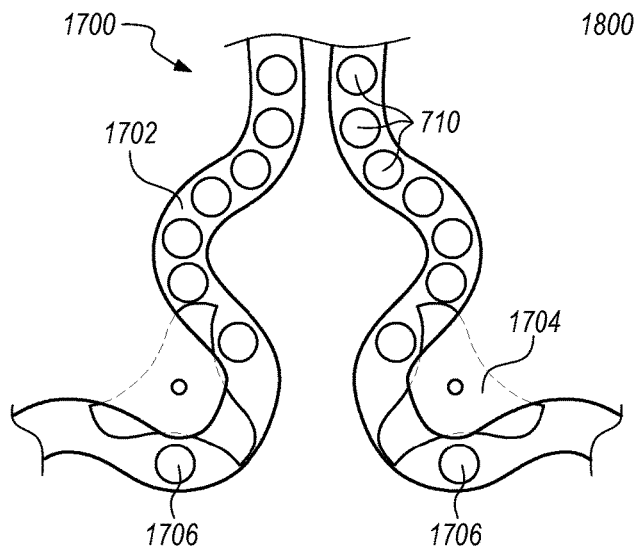
FIG. 17 is a section view of an ingredient dispensing module apparatus, in one embodiment.

FIG. 17 is a section view of an ingredient dispensing module apparatus 116, 1700, in one embodiment. The IDM apparatus 116, 1700 has queue(s) 1702 for lining up sequential canisters 710. The sequence of canisters 710 may contain all the ingredients for a particular bowl. The queues 1702 may be hollow tube portions or tunnels of the IDM 116, 1700 that uses gravity to facilitate downward movement of the canisters 710 so that the canisters reach IDM singulator(s) 1704, or rotating canister wheels, as further described herein. While the ingredient dispensing module apparatus 116, 1700 of FIG. 17 illustrates two queues 1702, any number of queues 1702 may be used. The two queues 1702 correspond to the two bowl lines that may run parallel.

The shape of the queues 1702 may be determined by how many sequential canisters 710 are desired for preparing a single bowl. For example, if a single bowl 908 may contain up to eight ingredients, up to eight canisters 710 filled with various ingredients may fit in a single queue 1702. On average, a bowl 908 contains seven ingredients. To ensure that the correct number of canisters 710 fits into each queue 1702 of the IDM 116, 1700, the shape of the tunnel may curve. The section view of FIG. 17 illustrates queues 1702 that curve outward along an x-axis before curving inward where the singulator 1704 separates each canister 710 and positions the canister 710 at a dispensing location. A v-groove (not depicted) at the dispensing location may be implemented to ensure precise placement of the canister at the dispensing location.

The singulators 1704 of FIG. 17 are rotating canister wheels that, in an embodiment, each contain three curved teeth, although any number of teeth may be used. In the example of FIG. 17, each queue 1702 has one singulator 1704. The left wheel illustrated in FIG. 17 rotates clockwise while the right wheel rotates counter-clockwise. Each tooth is curved in the direction of the rotation so that each tooth may rotate against an outer surface of the canisters 710 to separate and move each canister 710 through a bottom curvature of the queue 1702 and into the dispensing location. While a tooth is singulating a canister 710 from the remaining canisters, the convexed curvature of the tooth holds the remaining canisters 710 in place. The size and shape of the teeth may be determined by the desired singulating effect and the desired positioning of each canister 710 as it travels through the bottom curvature of the queue 1702. Specifically, each tooth of the singulator 1704 should be shaped to enable singulation while properly constraining against the canisters 710 to facilitate movement.

Once a canister 710 is positioned at the dispensing location by the rotating canister wheel, the canister processing and food dispensing apparatus 1300 of FIG. 13A, FIG. 13B, and FIG. 13C may remove the lid 708 and retaining ring 704 from the canister 710. An actuating ingredient dispenser 1706 may then push the plunger 706 of the canister 710 and dispense the ingredient into a bowl 908. After the ingredient is dispensed and the canister processing and food dispensing apparatus 1300 reinstalls the lid 708, the rotating canister wheels my rotate so that the empty canister 710 is pushed laterally out of the IDM 116, 1700 and into a discard chute.

2.4 Canister Removal

Figure 18:
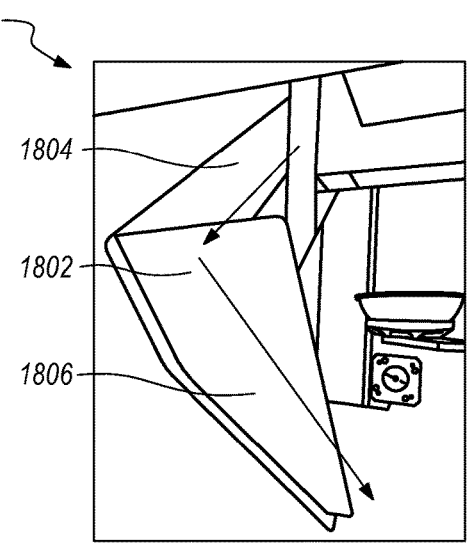
FIG. 18 is a perspective view of a canister discarding apparatus, in one embodiment.

FIG. 18 is a perspective view of a canister discarding apparatus 1800 comprising the canister discard chute 1802, in one embodiment. Once the canister 710 exits the IDM 116, 1700, it is removed by allowing it to roll down a discard chute 1802 using gravity. In an embodiment, the discard chute 1802 may be stainless steel to resist tarnishing. In an embodiment, a discard path along the chute may zig-zag in a triangle waveform, as illustrated in FIG. 18; however, the discard path may follow any shape. In the example of FIG. 18, the empty canister 710 may, at step 1804, roll down a first segment of the chute 1802 along a first segment of a discard path (reference numeral 1) using gravity or actuators. Subsequently, at step 1806, the empty canister 710 may roll in the opposite direction down a second segment of the chute 1802 along a second segment of the discard path (reference numeral 2). The canister 710 may then fall into a canister collection bin 114 positioned below the discard chute 1802.

Figure 19A:
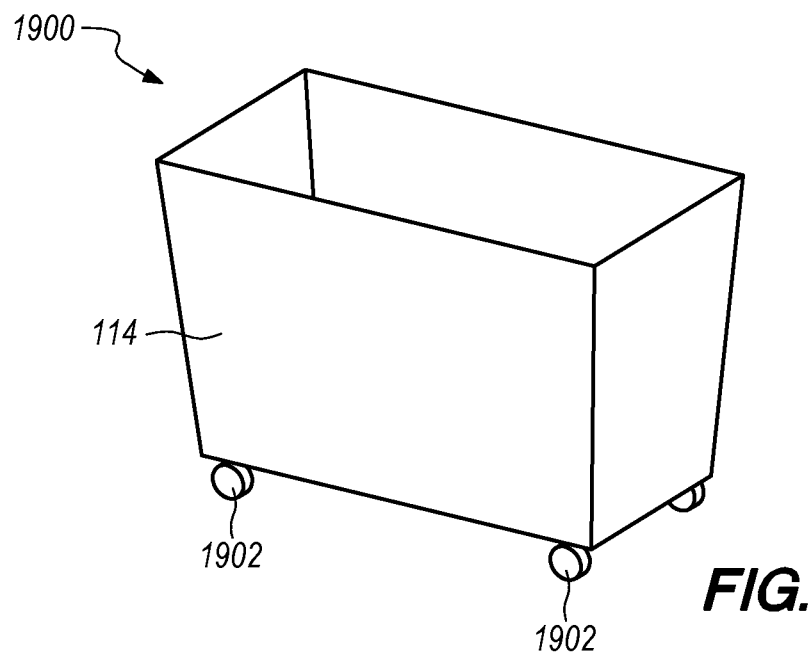
FIG. 19A illustrates a canister collection apparatus, in one embodiment.

FIG. 19A illustrates a canister collection apparatus 1900, otherwise referred to as bin(s) 114, in one embodiment. An open bin 114, 1900 having the example dimensions of FIG. 19A may be mounted on casters 1902 or wheels for movable positioning below the IDM 116, 1700. In a single store unit, for example, a plurality of canister collection apparatuses 114, 1900 may be maintained so that a full bin 114, 1900 can be swapped out for an empty one rapidly without interrupting meal preparation.

The volume of the bin 114, 1900 may be constrained by the size of other systems and machine footprint requirements but benefits from being as large as allowable. In an embodiment, a bin 114, 1900 holds approximately 1600 canisters 710, which is enough for the assembly of over 200 food bowls 908. At throughput of 700 bowls per hour, a bin 114, 1900 requires replacement every 20 minutes.

Figure 19B:
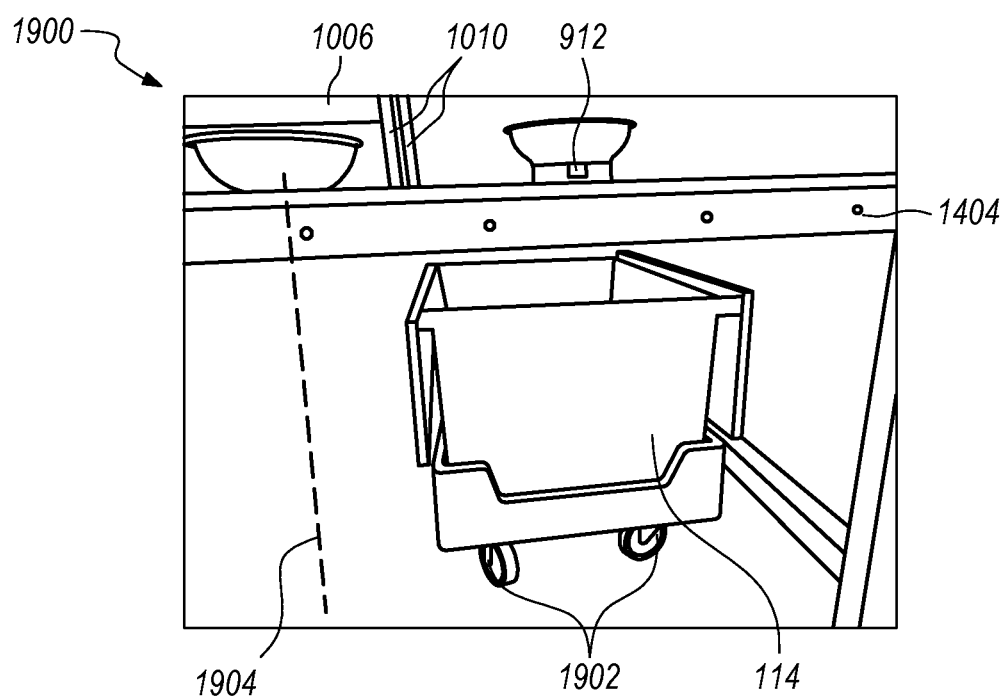
FIG. 19B illustrates the canister collection apparatus of FIG. 19A, in one embodiment.

FIG. 19B illustrates the canister collection apparatus 114, 1900 of FIG. 19A, in one embodiment. One bin 114, 1900 may be used for each bowl line. For example, the bin 114, 1900 of FIG. 19B may be one of two bins 114, 1900; the second bin 114, 1900 (not depicted) is located to the left of a bowl line delineator 1904 where a second bowl line operates. Having two or more bins 114, 1900 may enabled continued production in one bowl line even while replacing a full bin 114, 1900 in the second bowl line. Sensors may be used to detect placement of the bins to avoid spillage. The number of canisters 710 used may be counted to determine when a bin 114, 1900 is full and needs replacing. The bowl dispenser 110, 112, 1000 of FIG. 10A and FIG. 10B may be placed along the bowl line delineator 1904 so that it is equidistant from each bowl line, in an embodiment. For example, the two of the four vertical legs 1010 of the bowl dispenser 110, 112, 1000, as well as the bottom of the vertical stack 1006 is visible in FIG. 19B along the bowl line delineator 1904. The bowl pedestal 912 of FIG. 14A and FIG. 14B for output may be located on an operator workstation 1404 located above and adjacent to the bin 114, 1900.

Once a bin 114, 1900 is full of used canisters 710, the bin may be removed and replaced with an empty bin. In an embodiment, the bin 114, 1900 may have lids that allow the bin 114, 1900 to be closed while transporting canisters 710. The used canisters 710 may subsequently be cleaned and reused for storing additional ingredients.

2.5 Meal Ordering

The automatic food assembly apparatus 100, 200, 300, 400 may assemble ingredients into a meal in accordance with a customer order that is placed. Approaches for automating meal ordering under computer control are described in application Ser. No. 15/247,511, filed Aug. 25, 2016, the entire contents of which is hereby incorporated by reference as if fully disclosed herein. The customer may place the order at a kiosk computer located at the restaurant, at any client device through a website, or through an application installed on a client device. Any computing devices may enable user interaction through graphical user interface (GUI) screens. A server computer may store the order data and subsequently signal the automatic food preparation apparatus 100, 200, 300, 400 to prepare the meal. The server computer may manage and display a variety of different back-end order screens to kitchen managers or operators that supervise the preparation of various portions of each meal.

FIG. 21A, FIG. 21B, FIG. 21C, FIG. 21D, FIG. 21E, FIG. 21F, FIG. 21G, FIG. 21H, FIG. 21I, FIG. 21J, FIG. 21K, FIG. 21L, FIG. 21M illustrate an example sequence of computer display screen images 2100 that may be generated and displayed at a kiosk computer under program control as part of a graphical user interface (GUI) for a consumer. GUI screen 2102 may be an opening display screen for greeting customers. GUI screen 2102 may display instructions for how to begin the ordering process. For example, the opening display screen may instruct customers to swipe a credit card to begin the ordering process. GUI screen 2104 may be a welcome screen that appears once the customer initiates the ordering process. GUI screen 2104 may request that the customer input a name for displaying on a cubby door for food retrieval once the meal has been assembled.

GUI screen 2106 may be a meal selection screen that displays a menu of meal options. The menu on the left allows a customer to select pre-determined ingredient bowls, custom build a bowl, select sides, select beverages, review the customer's order history, and check out. The primary portion of the screen may display specific options associated with the menu options. For example, GUI screen 2106 with the pre-determined ingredient bowls option selected from the menu on the left may display images, prices, names, and descriptions of the pre-determined bowls on the right.

Upon selection of a pre-determined bowl, GUI screen 2108 may display a detailed view of the selected pre-determined bowl. In an embodiment, GUI screen 2108 may feature an option to view nutritional information about the selected pre-determined bowl, which may be displayed in example GUI screen 2110. A customizing screen, such as GUI screen 2112, may be also displayed to allow customer to customize a pre-determined bowl. GUI screen 2112 may show an ingredients menu along the left of the screen that allows a customer to select a variety of additional ingredients to put in a bowl. Selection of any options in the ingredients menu may display specific ingredient options in the middle screen portion of GUI screen 2112. The right of the screen may display a summary of selected ingredients and a total cost, in an example embodiment. GUI screen 2114 shows an example display for cheese and other toppings to add to the pre-determined bowl.

If a customer selects the menu option to custom build a bowl, GUI screen 2116 may display customization options, starting with a base such as salad, warm quinoa, or cold quinoa, in an example embodiment. GUI screen 2112 and GUI screen 2114 may subsequently follow to display ingredients for customizing the bowl, in an example embodiment.

If a customer selects the menu option for sides, a sides screen such as GUI screen 2118 may be displayed to give customers the option of selecting any available sides. Similarly, if a customer selects the menu option for beverages, a beverages screen such as GUI screen 2120 may be displayed to enable customer to select any available beverages.

If a customer selects the menu option for checkout, GUI screen 2122 may appear to display an order summary page that summarizes the selected items, as well as the total cost of the order. Upon confirming the order summary, an order placement screen such as GUI screen 2124 may appear. Once a customer selects the order placement option in GUI screen 2124, GUI screen 2126 may display instructions for retrieving an order from a cubby, in an example embodiment.

FIG. 22A, FIG. 22B, FIG. 22C, FIG. 22D, FIG. 22E, FIG. 22F, FIG. 22G, FIG. 22H, FIG. 22I illustrates an example sequence of computer display screen images 2200 that may be generated and displayed at a computer under program control as part of a graphical user interface (GUI) for a kitchen manager or operator at a single store unit. In an embodiment, different GUI screen may be available to different operators located in different areas or assigned to specific duties during the bowl assembly process.

For example, GUI screen 2202 displays a current orders screen that may be available to operators focused on concierge services. The current orders screen may list the order creation data and time, an order number, a name associated with the order, the contents of the order, and a cubby that will be used to allow a customer to retrieve the order. In an embodiment, the cubby may be automatically assigned based on tracked availability. GUI screen 2208 displays a detailed view of the current orders screen shown in GUI screen 2202. For example, upon selection of a particular order featured in GUI screen 2202, a details view of GUI screen 2208 may appear and display a variety of options, such as holding the order, emailing a receipt, seeing an attendant, refunding an order, canceling an order, reordering, etc.

GUI screen 2204 displays an assembly station ticketing system screen that allows an assembly operator to view specific ingredients in any particular order and/or print a ticket associated with that order. Upon selecting an option to start the next item, the assembly station ticketing system screen may display details of a specific order, such as the details shown in GUI screen 2206. The details may include, for example, an order number, a sequence of the order out of a total number of orders for assembly, a timer for assessing assembly of the bowl, a timer for assessing an assembly of the order as a whole, the order details, and an option for reprinting a ticket.

GUI screen 2210 displays beverage orders for an operator designated to preparing drinks and sides, in an example embodiment. The GUI screen 2210 may feature an order number and the item name, for example. GUI screen 2212 displays a label summary screen that summarized a customer order and enables printing or reprinting of labels that may be attached to a particular bowl or order.

GUI screen 2214 displays a back area screen for addressing specialized orders, in an example embodiment. GUI screen 2216 displays a cubby organization screen for cubby operators that may allow the cubby operators to organize, track, and automatically assign a cubby to a completed order. GUI screen 2218 displays a feedback screen for providing any operator feedback for improving functionality and efficiency of the process.

FIG. 23A, FIG. 23B, FIG. 23C, FIG. 23D, FIG. 23E, FIG. 23F, FIG. 23G, FIG. 23H, FIG. 23I, FIG. 23J, FIG. 23K, FIG. 23L, FIG. 23M, FIG. 23N, FIG. 23O illustrate an example sequence of computer display screen images 2300 that may be generated and displayed at a kiosk computer under program control as part of a graphical user interface (GUI) for a consumer using a mobile computing device.

In an embodiment, GUI screen 2302 displays an opening display screen for greeting customers. GUI screen 2302 may display instructions for how to begin the ordering process. For example, the opening display screen may instruct customers to select a restaurant location to begin the ordering process. GUI screen 2304 may be a location selection screen that appears once the customer initiates the ordering process. GUI screen 2304 may offer a plurality of restaurant locations to choose from. Each location option may include, for example, an address, a map visualization, and a selection control.

Once a location is selected, GUI screen 2306 may display order options, such as a breakfast menu or lunch menu with specific food options. GUI screen 2306 may display a lunch menu featuring a pre-determined bowl option, a custom build a bowl option, a bites option, a beverages option, and an order history option that is specific to each customer. GUI screen 2308 displays a breakfast menu featuring a pre-determined bowl option, a custom build a bowl option, a bites option, a beverages option, and an order history option that is specific to each customer.

In an embodiment, if a customer selects the pre-determined bowl option, the GUI screen 2310 may display a list of images, prices, names, and descriptions of the pre-determined bowls. GUI screen 2310 may display options to customize a bowl or add the order to a digital checkout bag. In an embodiment, if a customer selects the customize option, a list of ingredients for the pre-determined bowl may appear, such as those featured in GUI screen 2312. A customer my scroll down to see additional ingredients that may be added, and subsequently select an option to view the digital checkout bag.

In an embodiment, GUI screen 2320 displays a custom build bowl screen that may appear upon customer selection of the custom build a bowl option featured in GUI screen 2306 and GUI screen 2308. The custom build bowls screen may feature sequential options for building the bowl, starting with a base such as salad, warm quinoa, or cold quinoa, in an example embodiment.

GUI screen 2314 displays an order history screen following selection of the order history option of GUI screen 2306 and GUI screen 2308. The order history screen may feature a list of a customer-specific order history, by date, in an example embodiment. Each historical order may be selected to view a details view of each order.

A checkout summary screen, such as GUI screen 2316, may be displayed upon selection of a digital checkout bag featured in the top right corner of GUI screen 2306, 2308, 2310, 2314. The summary screen may display a summary of the checkout items, and prices associated with the checkout items. The summary screen may also feature an option to select a pick-up time at the previously selected restaurant location. Upon selection of the option to select a pickup time, GUI screen 2322 displays a pickup time screen featuring options for pickup at the cubby. For example, a customer may select an option to place the order now and have the order available for pickup in ten minutes or select any available time for pickup.

GUI screen 2318 displays an order summary screen featuring the restaurant location, an estimated time that an order will be prepared by, an option to place the order, and other optional features such as inputting an associated customer email address or preferred payment option. Once an order is placed, GUI screen 2324 displays a confirmation screen to confirm that the order has been placed. The confirmation may also display instructions for receiving updates about the status of the order and/or an option to track the order status. Selection of the option to track the order status may cause displaying GUI screen 2326, which shows an order status timeline. Once an order is ready for pickup, GUI screen 2328 may display a cubby number that holds the order. In an embodiment, a customer may login to an account and add payment options through GUI screen 2328, for example, for repeated use.

In an embodiment, the kiosk ordering process illustrated herein with FIG. 23A, FIG. 23B, FIG. 23C, FIG. 23D, FIG. 23E, FIG. 23F, FIG. 23G, FIG. 23H, FIG. 23I, FIG. 23J, FIG. 23K, FIG. 23L, FIG. 23M, FIG. 23N, FIG. 23O may be modified to use user recognition technologies under program control, for example, based on an approach of a customer to the proximity of a kiosk. Layered recognition signals may be used. For example, sensors for consumer proximity, body detection, facial recognition, voice detection and others may be used to detect the presence of a consumer, identify the consumer in a database based upon past interactions or orders, and suggest menu items to the consumer at the kiosk.

In an embodiment, a store ambient experience managing computer may automatically control screen brightness and availability, lighting brightness, audio sound selections or levels based on which customers are present or a total number of customers present. In an embodiment, the cubby door may comprise a touch screen that changes from transparent to translucent when a prepared order is arriving at the cubby for customer pickup. In an embodiment, the transparent touch screen may be associated with cameras and computers executing facial recognition programs that recognize the faces of a customer and only open upon facial recognition of the customer. In another embodiment, a customer-designated image, such as a photograph, may be associated with a customer's user account and displayed on the cubby screen with the customer's name when the order is ready for pickup.

In an embodiment, flavor profiling may be used to recommend various dishes to customers based on a customer's order history. For example, ingredients within each type of dish may be associated with 11 or more variables that dominate scent perception for food. A customer's order history may feature ingredients with particular scents, which may be organized into a flavor profile. Panels of similar scents may be used as reference scents for the purpose of predicting food preferences based on consumer flavor profiles and generating recommendations. In an embodiment, one order option that may be presented to customers may be an option to auto-generate a customized bowl based on a customer's flavor profile. In an embodiment, these flavor profiles may also be used to generate new pre-determined bowls based on the popularity of certain scents and combinations.

3.0 Procedural Overview

FIG. 24 depicts a method or algorithm 2400 for using the automatic food preparation apparatus 100, 200, 300, 400 and its various components to automatically assemble meals, under program control. FIG. 24 is described at the same level of detail that is ordinarily used, by persons of skill in the art to which this disclosure pertains, to communicate among themselves about algorithms, plans, or specifications for other programs in the same technical field. While the algorithm or method of FIG. 24 shows a plurality of steps for automatically assembly of meals, the algorithm or method described herein may be performed using any combination of one or more steps of FIG. 24 in any order, unless otherwise specified.

In an embodiment, the method or algorithm 2400 begins with step 2402. At step 2402, an automatic food preparation and serving apparatus may release, from one or more magazines in a storage apparatus, a plurality of food canisters, each loaded with a different ingredient of a human consumable dish or meal, onto a canister transportation mechanism under program control by one or more digital electronic processors. In an embodiment, a customer order that is received through any of the GUI screens featured in section 2.5 MEAL ORDERING may be sent to one or more server computers for processing and storage in a database. The server computers may feature one or more digital processors that process or execute a series of instructions, based on the customer order, that directs the automatic assembly of the food order using the automatic food preparation apparatus 100, 200, 300, 400.

Specifically, canisters 710 filled with ingredients may be stored in magazines 104, which in turned are stored in the storage rack 102, otherwise known as the thermal storage apparatus 500, 600. The thermal storage apparatus 500, 600 is configured with a thermal control system 106 that regulates hot, cold, and ambient temperatures of various thermal zones 502 of the thermal storage apparatus 500, 600. In an embodiment, the method or algorithm 2400 may comprises regulating at least two different temperatures of two or more of these various thermal zones 502 of the thermal storage apparatus 500, 600 using the thermal control system 106, which comprising a heating element, a cooling element, and a room-temperature element.

In an embodiment, magazines 104 are transported to the thermal storage apparatus 500, 600 using a mobile magazine transportation apparatus comprising wheels and a temperature control system. For example, canisters 710 are filled at a commissary, placed into magazines 104, and refrigerated and/or heated in thermal bays of 820 of a mobile thermal storage apparatus 816. The mobile thermal storage apparatus may be transported to a store where the magazines 104 may be placed into the storage rack 102. In an embodiment, ingredients in each magazine 104 may be tracked using a Printed Circuit Board (PCB) and pogo pins 808 located in a magazine faceplate 804, and a PCB identification reader 810 located in the thermal control bay 820 that is configured to insulate the one or more magazines. The stationary thermal storage apparatus 500, 600 may also feature thermal control bays 820 with PCB identification readers 810 for tracking which magazines 104 are placed into the thermal storage apparatus 500, 600.

When a server computer receives an order, the sequencer 404, 1500 of FIG. 4, FIG. 6, FIG. 15, FIG. 16A, FIG. 16B may be used to implement a correct sequence of canister and ingredient for assembling a specific meal. The doors 802 of certain magazines 104 containing certain ingredients may be opened and canister ejector(s) 402 may be actuated in a particular order ensure that the canisters with correct ingredients are transported in the correct order.

At step 2404, the automatic food preparation and serving apparatus may transport, using the canister transportation mechanism, the plurality of food canisters to a food dispensing mechanism under program control of the one or more processors. In an embodiment, transporting the plurality of food canisters to the food dispensing mechanism using may first comprise releasing the plurality of food canisters using the sequencer 404, 1500 that sequences an order of ingredients under program control of the one or more processors. For example, the ejector(s) 402 may release the canisters 710 from the magazines and drop the canisters 710 onto a movable belt 1506 with a first horizontal belt end adjacent to the storage rack 102. The horizontal belt 1506 may comprise a controller and a drive motor configured to drive the horizontal belt and transport canisters horizontally along an x-axis to a second horizontal belt end that is adjacent to a vertical belt 1510, under program control of the one or more processors.

Transporting the canisters 710 using the sequencer 404, 1500 may also comprise registering a position of the canisters 710 along the x-axis, using one or more presence sensors 1614, and stopping the x-axis movement of each food canister 710 using a kicker 1616, in an example embodiment, under program control of the one or more processors and pushing the canister 710 along a y-axis into a bucket 1622 attached to the vertical belt 1510, under program control of the one or more processors. Transporting the canisters 710 using the sequencer 404, 1500 may also comprise transporting the canisters 710 along a z-axis using the vertical belt 1510, to the food dispensing mechanism, or IDM 116, 1700. In an embodiment, transporting the canisters 710 using the sequencer 404, 1500 may also comprise using the canister guides 1628 and transfer lip 1630 to guide the canisters 710 into the IDM 116, 1700.

At step 2406, the automatic food preparation and serving apparatus may retrieve, using a servo operated bowl positioning arm of a bowl placement apparatus, a bowl from a bowl dispensing apparatus and placing the bowl on a bowl orientation mechanism below the food dispensing mechanism under program control of the one or more processors. Step 2406 may execute in parallel with steps 2402 and 2404, in some embodiments.

Specifically, the servo operated bowl positioning arm may be an actuating arm 904 configured to move along an x-y axis. In an embodiment, the method or algorithm 2400 may comprise using the actuating arm 904 to move the empty bowl 908 from a dispensing location 910 to a bowl orientation platform 914 for ingredient dispensing, and subsequently move the filled bowl 908 from the bowl orientation platform 914 to the output pedestal 912, under program control. The actuating arm 904 may feature an end effector 906 custom tailored in size and shape to support the bowls 908. The method or algorithm 2400 may also comprises using the bowl orientation mechanism to rotate the bowl 908 around a z-axis and move the bowl along the z-axis to dispense ingredients from different canisters 710 in different locations in the bowl 908.

At step 2408, the automatic food preparation and serving apparatus may dispense, using the food dispensing mechanism, the ingredient of the human consumable dish or meal serially from the plurality of food canisters into the bowl under program control of the one or more processors. The food dispensing mechanism may be, for example, the IDM 116, 1700 and pneumatic grippers 1302 working in conjunction to separate and position canisters 710 for lid removal and ingredient dispensing.

Specifically, the method or algorithm 2400 may comprise rotating a singulator 1704 under program control to separate canisters 710 and place them at a dispensing location adjacent to the ingredient dispenser 1706. In an embodiment, the step of dispensing may comprise using a lid removing apparatus, such as the pneumatic grippers 1302, to remove a canister lid 708 from an anterior end of a canister 710 under program control of the one or more processors. The method or algorithm 2400 may also comprise using the ingredient dispenser 1706 of the IDM 116, 1700 to push a plunger 706 from a posterior end of the canister 710 to the anterior end of the canister and dispense the ingredient contained within the canister 710 under program control of the one or more processors.

At step 2410, the automatic food preparation and serving apparatus may remove the plurality of food canisters using a canister removing apparatus into a bin using gravity. For example, method or algorithm 2400 may comprise rotating the singulator 1704 such that an empty canister 710 moves out of the IDM 116, 1700 and into a discard chute 1802 where the canister 710 rolls along a discard path using gravity and into a bin 114.

4.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 25:
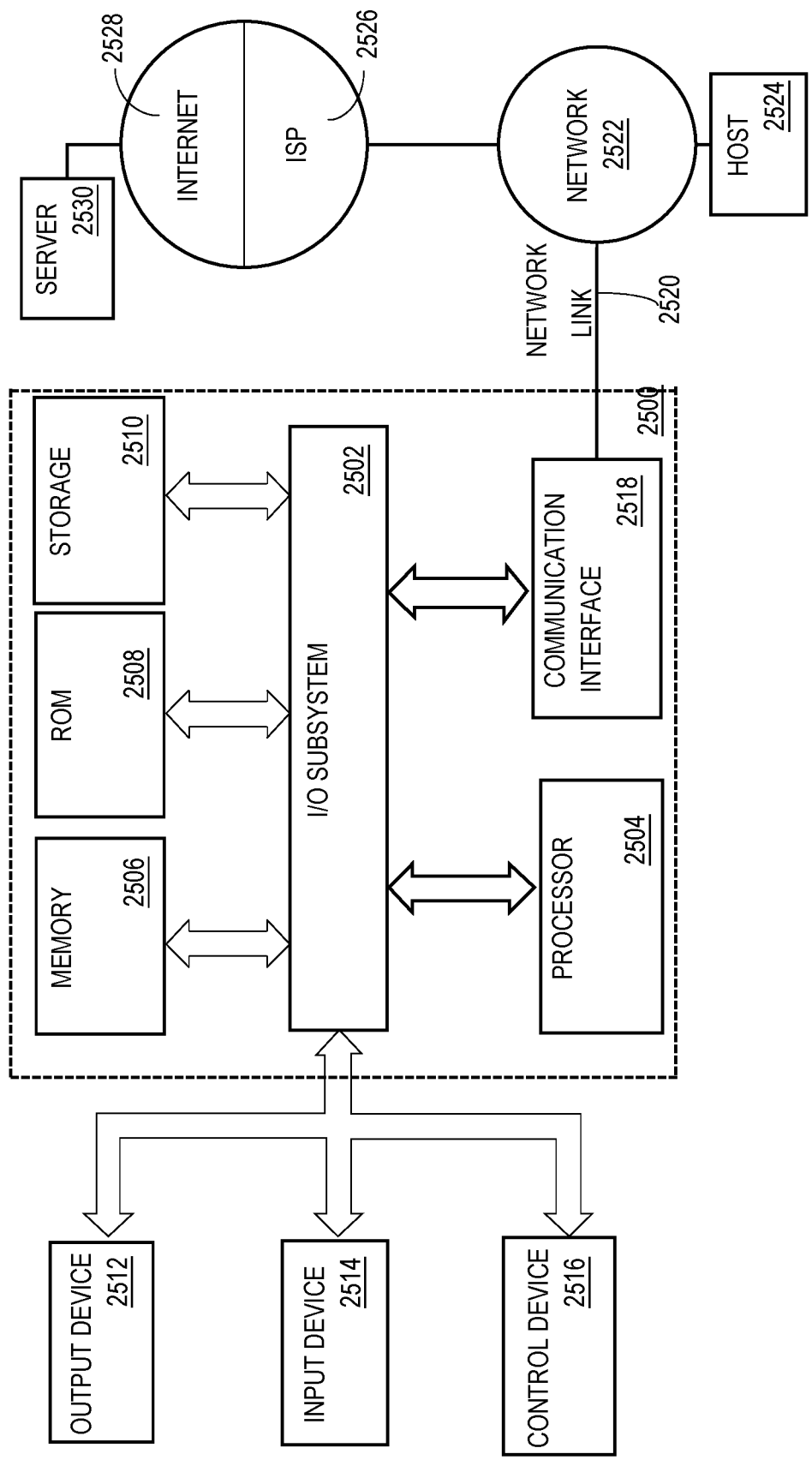
FIG. 25 illustrates a computer system with which aspects of certain embodiments may be implemented.

FIG. 25 is a block diagram that illustrates an example computer system with which an embodiment may be implemented. In the example of FIG. 25, a computer system 2500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 2500 includes an input/output (I/O) subsystem 2502 which may include a bus and/or other communication mechanism(s) for communicating information and/or instructions between the components of the computer system 2500 over electronic signal paths. The I/O subsystem 2502 may include an I/O controller, a memory controller and at least one I/O port. The electronic signal paths are represented schematically in the drawings, for example as lines, unidirectional arrows, or bidirectional arrows.

At least one hardware processor 2504 is coupled to I/O subsystem 2502 for processing information and instructions. Hardware processor 2504 may include, for example, a general-purpose microprocessor or microcontroller and/or a special-purpose microprocessor such as an embedded system or a graphics processing unit (GPU) or a digital signal processor or ARM processor. Processor 2504 may comprise an integrated arithmetic logic unit (ALU) or may be coupled to a separate ALU.

Computer system 2500 includes one or more units of memory 2506, such as a main memory, which is coupled to I/O subsystem 2502 for electronically digitally storing data and instructions to be executed by processor 2504. Memory 2506 may include volatile memory such as various forms of random-access memory (RAM) or other dynamic storage device. Memory 2506 also may be used for storing temporary variables or other intermediate information during execution of instructions to be executed by processor 2504. Such instructions, when stored in non-transitory computer-readable storage media accessible to processor 2504, can render computer system 2500 into a special-purpose machine that is customized to perform the operations specified in the instructions.

Computer system 2500 further includes non-volatile memory such as read only memory (ROM) 2508 or other static storage device coupled to I/O subsystem 2502 for storing information and instructions for processor 2504. The ROM 2508 may include various forms of programmable ROM (PROM) such as erasable PROM (EPROM) or electrically erasable PROM (EEPROM). A unit of persistent storage 2510 may include various forms of non-volatile RAM (NVRAM), such as FLASH memory, or solid-state storage, magnetic disk or optical disk such as CD-ROM or DVD-ROM and may be coupled to I/O subsystem 2502 for storing information and instructions. Storage 2510 is an example of a non-transitory computer-readable medium that may be used to store instructions and data which when executed by the processor 2504 cause performing computer-implemented methods to execute the techniques herein.

The instructions in memory 2506, ROM 2508 or storage 2510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 2500 may be coupled via I/O subsystem 2502 to at least one output device 2512. In one embodiment, output device 2512 is a digital computer display. Examples of a display that may be used in various embodiments include a touch screen display or a light-emitting diode (LED) display or a liquid crystal display (LCD) or an e-paper display. Computer system 2500 may include other type(s) of output devices 2512, alternatively or in addition to a display device. Examples of other output devices 2512 include printers, ticket printers, plotters, projectors, sound cards or video cards, speakers, buzzers or piezoelectric devices or other audible devices, lamps or LED or LCD indicators, haptic devices, actuators or servos.

At least one input device 2514 is coupled to I/O subsystem 2502 for communicating signals, data, command selections or gestures to processor 2504. Examples of input devices 2514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 2516, which may perform cursor control or other automated control functions such as navigation in a graphical interface on a display screen, alternatively or in addition to input functions. Control device 2516 may be a touchpad, a mouse, a trackball, or cursor direction keys for communicating direction information and command selections to processor 2504 and for controlling cursor movement on display 2512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 2514 may include a combination of multiple different input devices, such as a video camera and a depth sensor.

In another embodiment, computer system 2500 may comprise an internet of things (IoT) device in which one or more of the output device 2512, input device 2514, and control device 2516 are omitted. Or, in such an embodiment, the input device 2514 may comprise one or more cameras, motion detectors, thermometers, microphones, seismic detectors, other sensors or detectors, measurement devices or encoders and the output device 2512 may comprise a special-purpose display such as a single-line LED or LCD display, one or more indicators, a display panel, a meter, a valve, a solenoid, an actuator or a servo.

When computer system 2500 is a mobile computing device, input device 2514 may comprise a global positioning system (GPS) receiver coupled to a GPS module that is capable of triangulating to a plurality of GPS satellites, determining and generating geo-location or position data such as latitude-longitude values for a geophysical location of the computer system 2500. Output device 2512 may include hardware, software, firmware and interfaces for generating position reporting packets, notifications, pulse or heartbeat signals, or other recurring data transmissions that specify a position of the computer system 2500, alone or in combination with other application-specific data, directed toward host 2524 or server 2530.

Computer system 2500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 2500 in response to processor 2504 executing at least one sequence of at least one instruction contained in main memory 2506. Such instructions may be read into main memory 2506 from another storage medium, such as storage 2510. Execution of the sequences of instructions contained in main memory 2506 causes processor 2504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 2510. Volatile media includes dynamic memory, such as memory 2506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 2502. Transmission media can also take the form of acoustic or light waves, such as those generated during radio-wave and infra-red data communications.

Various forms of media may be involved in carrying at least one sequence of at least one instruction to processor 2504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 2500 can receive the data on the communication link and convert the data to a format that can be read by computer system 2500. For instance, a receiver such as a radio frequency antenna or an infrared detector can receive the data carried in a wireless or optical signal and appropriate circuitry can provide the data to I/O subsystem 2502 such as place the data on a bus. I/O subsystem 2502 carries the data to memory 2506, from which processor 2504 retrieves and executes the instructions. The instructions received by memory 2506 may optionally be stored on storage 2510 either before or after execution by processor 2504.

Computer system 2500 also includes a communication interface 2518 coupled to bus 2502. Communication interface 2518 provides a two-way data communication coupling to network link(s) 2520 that are directly or indirectly connected to at least one communication networks, such as a network 2522 or a public or private cloud on the Internet. For example, communication interface 2518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 2522 broadly represents a local area network (LAN), wide-area network (WAN), campus network, internetwork or any combination thereof. Communication interface 2518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 2518 sends and receives electrical, electromagnetic or optical signals over signal paths that carry digital data streams representing various types of information.

Network link 2520 typically provides electrical, electromagnetic, or optical data communication directly or through at least one network to other data devices, using, for example, satellite, cellular, Wi-Fi, or BLUETOOTH technology. For example, network link 2520 may provide a connection through a network 2522 to a host computer 2524.

Furthermore, network link 2520 may provide a connection through network 2522 or to other computing devices via internetworking devices and/or computers that are operated by an Internet Service Provider (ISP) 2526. ISP 2526 provides data communication services through a world-wide packet data communication network represented as internet 2528. A server computer 2530 may be coupled to internet 2528. Server 2530 broadly represents any computer, data center, virtual machine or virtual computing instance with or without a hypervisor, or computer executing a containerized program system such as DOCKER or KUBERNETES. Server 2530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 2500 and server 2530 may form elements of a distributed computing system that includes other computers, a processing cluster, server farm or other organization of computers that cooperate to perform tasks or execute applications or services. Server 2530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 2530 may comprise a web application server that hosts a presentation layer, application layer and data storage layer such as a relational database system using structured query language (SQL) or no SQL, an object store, a graph database, a flat file system or other data storage.

Computer system 2500 can send messages and receive data and instructions, including program code, through the network(s), network link 2520 and communication interface 2518. In the Internet example, a server 2530 might transmit a requested code for an application program through Internet 2528, ISP 2526, local network 2522 and communication interface 2518. The received code may be executed by processor 2504 as it is received, and/or stored in storage 2510, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 2504. While each processor 2504 or core of the processor executes a single task at a time, computer system 2500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. An automatic food preparation and serving apparatus, comprising:
   a storage apparatus configured to hold one or more magazines, each of the one or more magazines configured to store a plurality of food canisters each loaded with an ingredient of a human consumable dish or meal, the storage apparatus having a digital electronic storage controller configured to dispense a particular food canister under program control by one or more digital electronic processors;
   a canister transport mechanism to transport the plurality of food canisters away from the storage apparatus and to a food dispensing mechanism under program control of the one or more processors;
   a bowl placement apparatus configured to retrieve a bowl from a bowl dispensing apparatus and to place the bowl in a bowl orientation mechanism below the food dispensing mechanism, under program control of the one or more processors;
   the food dispensing mechanism configured to dispense the ingredient from the plurality of food canisters into the bowl, under program control of the one or more processors;
   a canister removing apparatus configured to remove the plurality of food canisters into a bin using gravity;
   a non-transitory computer-readable data storage medium communicatively coupled to the one or more processors and storing one or more sequences of instructions which, when processed using the one or more processors, cause receiving order input for the dish or meal and causing the storage apparatus, the canister transport mechanism, the bowl placement apparatus, the food dispensing mechanism, and the canister discarding apparatus to automatically dispense the dish or meal in accordance with the order input.

2. The apparatus of claim 1, wherein the storage apparatus comprises one or more temperature-control regions, and wherein the automatic food preparation and serving apparatus further comprises a thermal control system with a heating element or a cooling element configured to regulate food temperature in the one or more temperature-control regions using at least two different temperatures in two different regions.

3. The apparatus of claim 1, each of the one or more magazines comprising an anterior insulated panel with a handle, four walls connected to the anterior insulated panel, and a posterior spring-loaded canister release mechanism connected to at least two of the four walls.

4. The apparatus of claim 3, wherein the anterior insulated panel comprises a Printed Circuit Board (PCB) configured to identify food and configured to interface with a thermal control bay.

5. The apparatus of claim 1, further comprising:
   one or more thermal control bays operatively connected to the storage apparatus and configured to hold the one or more magazines, wherein each of the one or more thermal control bays comprises a top insulated wall, a bottom insulated wall, two side insulated walls, a posterior insulated wall, and a PCB identification reader.

6. The apparatus of claim 1, further comprising:
   a mobile magazine transportation apparatus comprising wheels and a temperature control system;
   one or more thermal control bays operatively connected to the storage apparatus and configured to hold the one or more magazines, wherein each of the one or more thermal control bays comprises a top insulated wall, a bottom insulated wall, two side insulated walls, a posterior insulated wall, and a PCB identification reader.

7. The apparatus of claim 1, further comprising:
   a canister ejector apparatus adjacent to the one or more magazines and configured to eject canisters, the canister ejector apparatus comprising a spring-loaded door distally located from the one or more magazines, and a movement block adjacent to the spring-loaded door configured to move the spring-loaded door and drop the plurality of food canisters onto the first movable belt under program control of the one or more processors.

8. The apparatus of claim 1, wherein the canister transport mechanism comprises a first movable belt, having a first belt end adjacent to the storage apparatus and positioned to receive the plurality of food canisters deposited onto the first movable belt and comprising a first canister controller and a first drive motor configured to drive the first movable belt, and wherein the canister transport mechanism further comprises a second movable belt adjacent to a second belt end of the first movable belt comprising a second canister control and a second drive motor configured to drive the second movable belt to transport the plurality of food canisters away from the first movable belt and to the food dispensing mechanism under program control of the one or more processors.

9. The apparatus of claim 8, wherein the canister transport mechanism further comprises a sensor connected to the first movable belt and configured to register a location of the plurality of food canisters, a canister escapement connected to the first movable belt and configured to inhibit movement of the plurality of food canisters along an x-axis, a pusher block configured to push the plurality of food canisters along a y-axis into a bucket attached to a second movable belt under program control of the one or more processors, the second movable belt comprising a second canister controller and a second drive motor configured to drive the second movable belt to transport the plurality of food canisters away from the first movable belt and to the food dispensing mechanism under program control of the one or more processors, and a canister guiding apparatus connected to the food dispensing mechanism configured to guide the plurality of food canisters into the food dispensing mechanism.

10. The apparatus of claim 1, wherein the bowl orientation mechanism comprises a concave circular platform configured to hold the bowl, a rotary control for rotating the platform around a z-axis, and a pneumatic lift for moving the platform along the z-axis.

11. The apparatus of claim 1, wherein the food dispensing mechanism comprises at least two curved passages configured to queue the plurality of food canisters, at least two rotating singulators, each located below a bend of each curved passage and configured to separate and position the plurality of food canisters in series for opening, and at least two canister exits, each for ejecting the plurality of food canisters from the food dispensing mechanism.

12. The apparatus of claim 1, wherein the food dispensing mechanism comprises at least three pneumatic grippers with interfacing fingers configured to remove a canister lid from an anterior end of the particular food canister, and a pneumatic dispenser configured to push a plunger from a posterior end of the particular food canister to the anterior end of the particular food canister and dispense the ingredient into the bowl.

13. The apparatus of claim 1 wherein the bowl placement apparatus comprises a servo operated bowl positioning arm.

14. An automatic food preparation and serving method, comprising:
  releasing, from one or more magazines in a storage apparatus, a plurality of food canisters, each loaded with a different ingredient of a human consumable dish or meal, onto a canister transportation mechanism under program control by one or more digital electronic processors;
  transporting, using the canister transportation mechanism, the plurality of food canisters to a food dispensing mechanism under program control of the one or more processors;
  retrieving, using bowl placement apparatus, a bowl from a bowl dispensing apparatus and placing the bowl on a bowl orientation mechanism below the food dispensing mechanism under program control of the one or more processors;
  dispensing, using the food dispensing mechanism, the ingredient of the human consumable dish or meal from the plurality of food canisters into the bowl under program control of the one or more processors;
  removing the plurality of food canisters using a canister removing apparatus into a bin using gravity.

15. The method of claim 14, wherein transporting the plurality of food canisters to the food dispensing mechanism further comprises:
  releasing the plurality of food canisters into a canister sequencing apparatus that sequences an order of ingredients under program control of the one or more processors;
  dropping the plurality of food canisters from a canister ejector apparatus onto a first movable belt comprising a first canister controller and a first drive motor configured to drive the first movable belt, the first movable belt having a first belt end adjacent to the storage apparatus, and transporting the plurality of food canisters along an x-axis to a second belt end adjacent to a second movable belt under program control of the one or more processors;
  transporting the plurality of food canisters along a z-axis, using the second movable belt, to the food dispensing mechanism.

16. The method of claim 15, wherein transporting the plurality of food canisters to the food dispensing mechanism further comprises:
  registering a position of the plurality of food canisters along the x-axis using a sensor and stopping movement of the plurality of food canisters along the x-axis under program control of the one or more processors;
  pushing the plurality of food canisters along a y-axis into a bucket attached to the second movable belt using a pusher block under program control of the one or more processors.

17. The method of claim 14, further comprising:
  regulating at least two different temperatures of two or more temperature-control regions of the storage apparatus using a thermal control system comprising a heating element or a cooling element.

18. The method of claim 14, further comprising:
  tracking canister ingredients in the one or more magazines using a Printed Circuit Board (PCB) located in a magazine faceplate, and a PCB identification reader located in a thermal control bay that is configured to insulate the one or more magazines.

19. The method of claim 14, further comprising:
  transporting the one or more magazines to the storage apparatus using a mobile magazine transportation apparatus comprising wheels and a temperature control system.

20. The method of claim 19, wherein the mobile magazine transportation apparatus is configured to cook or rethermalize ingredients in the plurality of food canisters stored in the one or more magazines.

21. The method of claim 14, further comprising:
  using the bowl orientation mechanism, rotating the bowl around a z-axis and moving the bowl along an x-axis, a y-axis, or the z-axis to dispense ingredients from different canisters in different locations in the bowl.

22. The method of claim 14, wherein dispensing, using the food dispensing mechanism, the ingredient of the human consumable dish or meal from the plurality of food canisters into the bowl further comprises:
  using a lid removing apparatus, removing a canister lid from an anterior end of the particular canister of the plurality of food canisters under program control of the one or more processors;
  using a dispenser, pushing a plunger from a posterior end of the particular canister to the anterior end of the particular canister to dispense the ingredient under program control of the one or more processors.

23. The method of claim 14, wherein the bowl placement apparatus comprises a servo operated bowl positioning arm.

24. An automatic food preparation and serving system, comprising:
one or more digital electronic processors;
a non-transitory computer-readable data storage medium storing one or more sequences of instructions which, when processed using the one or more processors, cause:
releasing, from one or more magazines in a storage apparatus, a plurality of food canisters, each loaded with a different ingredient of a human consumable dish or meal, onto a canister transportation mechanism;
transporting, using the canister transportation mechanism, the plurality of food canisters to a food dispensing mechanism;
retrieving, using a bowl placement apparatus, a bowl from a bowl dispensing apparatus and placing the bowl on a bowl orientation mechanism below the food dispensing mechanism;
dispensing, using the food dispensing mechanism, the ingredient of the human consumable dish or meal from the plurality of food canisters into the bowl;
removing the plurality of food canisters using a canister removing apparatus into a bin using gravity.

25. The system of claim 24, wherein transporting the plurality of food canisters to the food dispensing mechanism further comprises:
releasing the plurality of food canisters into a canister sequencing apparatus that sequences an order of ingredients under program control of the one or more processors;
dropping the plurality of food canisters from a canister ejector apparatus onto a first movable belt comprising a first canister controller and a first drive motor configured to drive the first movable belt, the first movable belt having a first belt end adjacent to the storage apparatus and transporting the plurality of food canisters along an x-axis to a second belt end adjacent to a second movable belt under program control of the one or more processors;
transporting the plurality of food canisters along a z-axis, using the second movable belt, to the food dispensing mechanism.

26. The system of claim 25, wherein transporting the plurality of food canisters to the food dispensing mechanism further comprises:
registering a position of the plurality of food canisters along the x-axis using a sensor and stopping movement of the plurality of food canisters along the x-axis;
pushing the plurality of food canisters along a y-axis into a bucket attached to the second movable belt using a pusher block.

27. The system of claim 24, further comprising one or more additional sequence of instructions which, when executed by the one or more processors, cause:
regulating at least two different temperatures of two or more temperature-control regions of the storage apparatus using a thermal control system comprising a heating element or a cooling element.

28. The system of claim 24, wherein a mobile magazine transportation apparatus is configured to cook or rethermalize ingredients in the plurality of food canisters stored in the one or more magazines.

29. The system of claim 24, further comprising one or more additional sequence of instructions which, when executed by the one or more processors, cause:
tracking canister ingredients in the one or more magazines using a Printed Circuit Board (PCB) located in a magazine faceplate, and a PCB identification reader located in a thermal control bay that is configured to insulate the one or more magazines.

30. The system of claim 24, further comprising one or more additional sequence of instructions which, when executed by the one or more processors, cause:
transporting the one or more magazines to the storage apparatus using a mobile magazine transportation apparatus comprising wheels and a temperature control system.

31. The system of claim 24, further comprising one or more additional sequence of instructions which, when executed by the one or more processors, cause:
using the bowl orientation mechanism, rotating the bowl around a z-axis and moving the bowl along an x-axis, a y-axis, or the z-axis to dispense ingredients from different canisters in different locations in the bowl.

32. The system of claim 24, wherein dispensing, using the food dispensing mechanism, food ingredients from the plurality of food canisters into the bowl further comprises:
using a lid removing apparatus, removing a canister lid from an anterior end of the particular canister of the plurality of food canisters;
using a dispenser, pushing a plunger from a posterior end of the particular canister to the anterior end of the particular canister to dispense the ingredient.

33. The system of claim 24, wherein the bowl placement apparatus comprises a servo operated bowl positioning arm.

34. An automatic food preparation and serving method, comprising:
releasing, from one or more magazines in a storage apparatus, a plurality of food canisters, each loaded with a different ingredient of a human consumable dish or meal, onto a canister transportation mechanism under program control by one or more digital electronic processors;
transporting, using the canister transportation mechanism, the plurality of food canisters to a food dispensing mechanism under program control of the one or more processors;
retrieving, using a food receptacle placement apparatus, a food receptacle from a food receptacle dispensing apparatus and placing the food receptacle on a food receptacle orientation mechanism below the food dispensing mechanism under program control of the one or more processors;
dispensing, using the food dispensing mechanism, the ingredient of the human consumable dish or meal from the plurality of food canisters into the food receptacle under program control of the one or more processors;
removing the plurality of food canisters using a canister removing apparatus into a bin using gravity.

* * * * *